United States Patent [19]

Hoffmann et al.

[11] 4,255,787

[45] Mar. 10, 1981

[54] SYSTEM AND METHOD FOR CONTROLLING THE POWER GENERATED BY A SYSTEM OF HYDRO-PLANTS AND THERMAL UNITS

[75] Inventors: Arthur G. Hoffmann; Robert P. Guberman; Larry E. Horner, all of Pittsburgh, Pa.

[73] Assignee: Westinghouse Electric Corp., Pittsburgh, Pa.

[21] Appl. No.: 550,029

[22] Filed: Feb. 14, 1975

Related U.S. Application Data

[63] Continuation of Ser. No. 328,194, Jan. 31, 1973, abandoned.

[51] Int. Cl.$^2$ .................. G06F 15/20; G05B 19/00
[52] U.S. Cl. ...................................... 364/494; 364/300
[58] Field of Search .................. 444/1; 340/172.5; 60/368; 235/150; 364/492, 494, 300, 200 MS File, 900 MS File

*Primary Examiner*—Edward J. Wise
*Attorney, Agent, or Firm*—E. F. Possessky

[57] ABSTRACT

A method and apparatus are disclosed for controlling and coordinating the power generated by a combined system of thermal units and hydro plants. In particular, hydro generation is determined for each of the hydro plants of the system as they are distributed in a plurality of groups, each group corresponding to a given river system. Because the amount of water flowing down a river system is dependent upon the amount of water released into the river system, calculation of the power generated by the hydro plants disposed upon a single river is conducted based upon the water flowthrough and power generated by a single plant termed a control plant. Assuming a set of lambdas, for example the lambdas calculated for the previous day, the water allocaion of not only the control plant but the remaining or dependent plants is determined by multiplying the incremental water rate curve of the control plant by an artificial cost variable gamma. By varying gamma, the water allocation for the control plant is met for the assumed lambdas.

38 Claims, 125 Drawing Figures

FIG. IA
FIG. IB
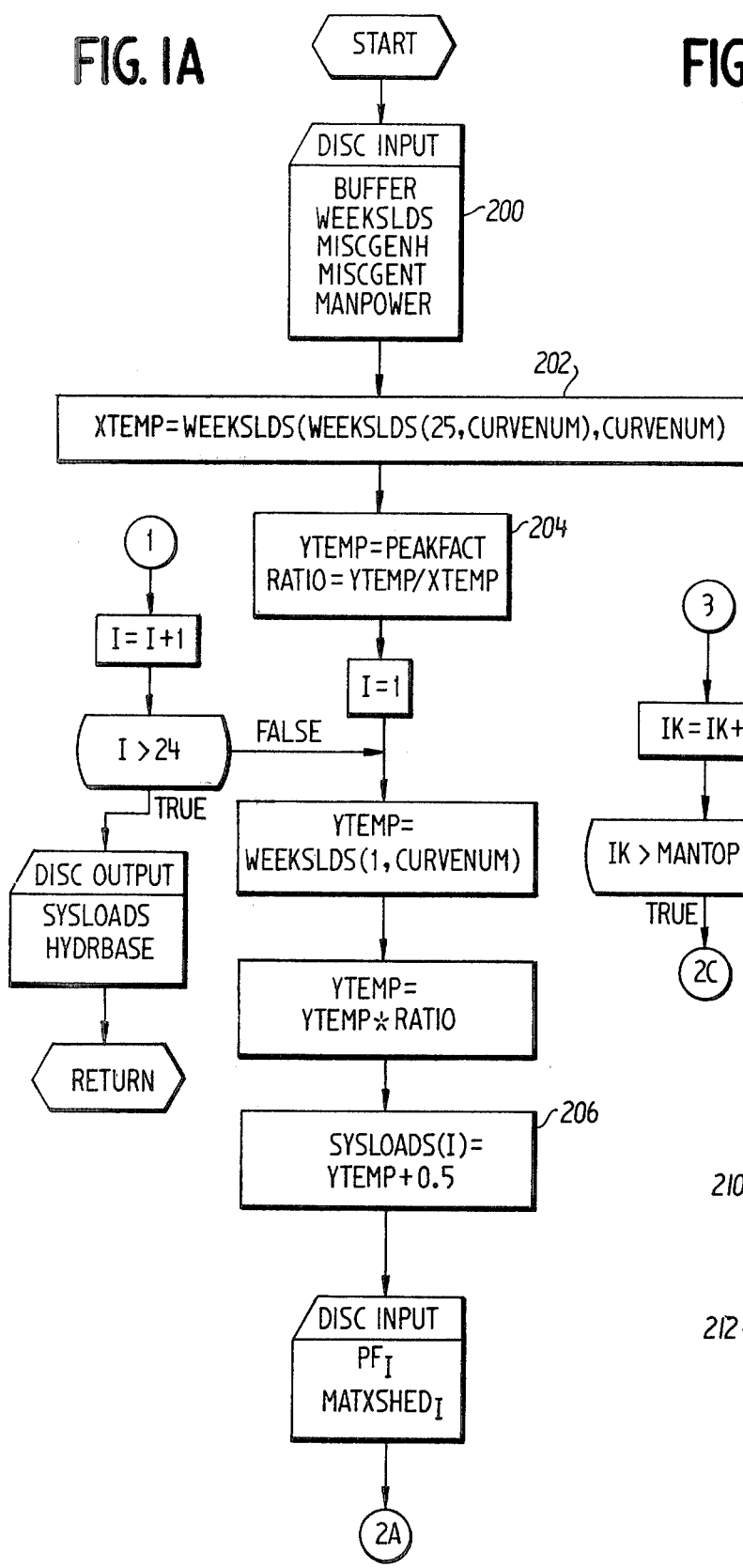
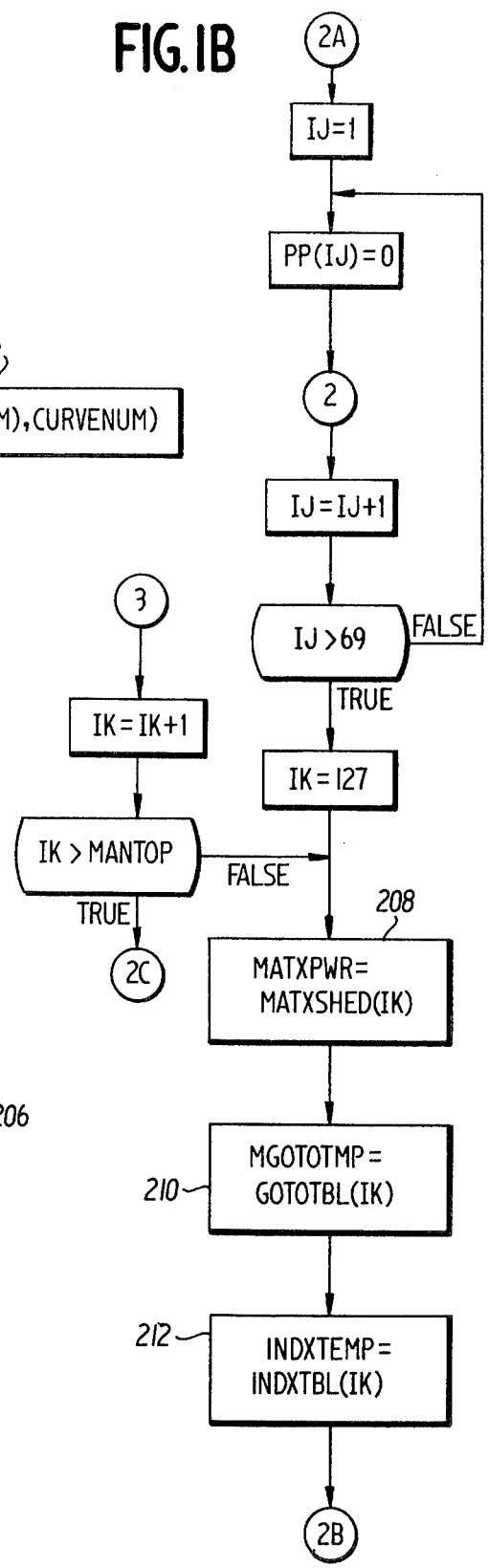

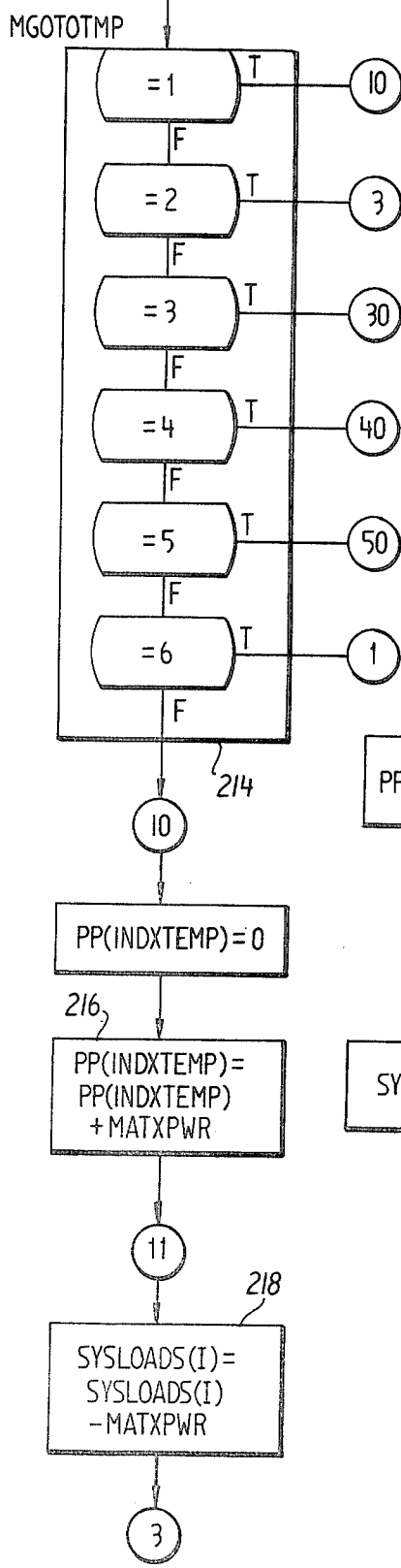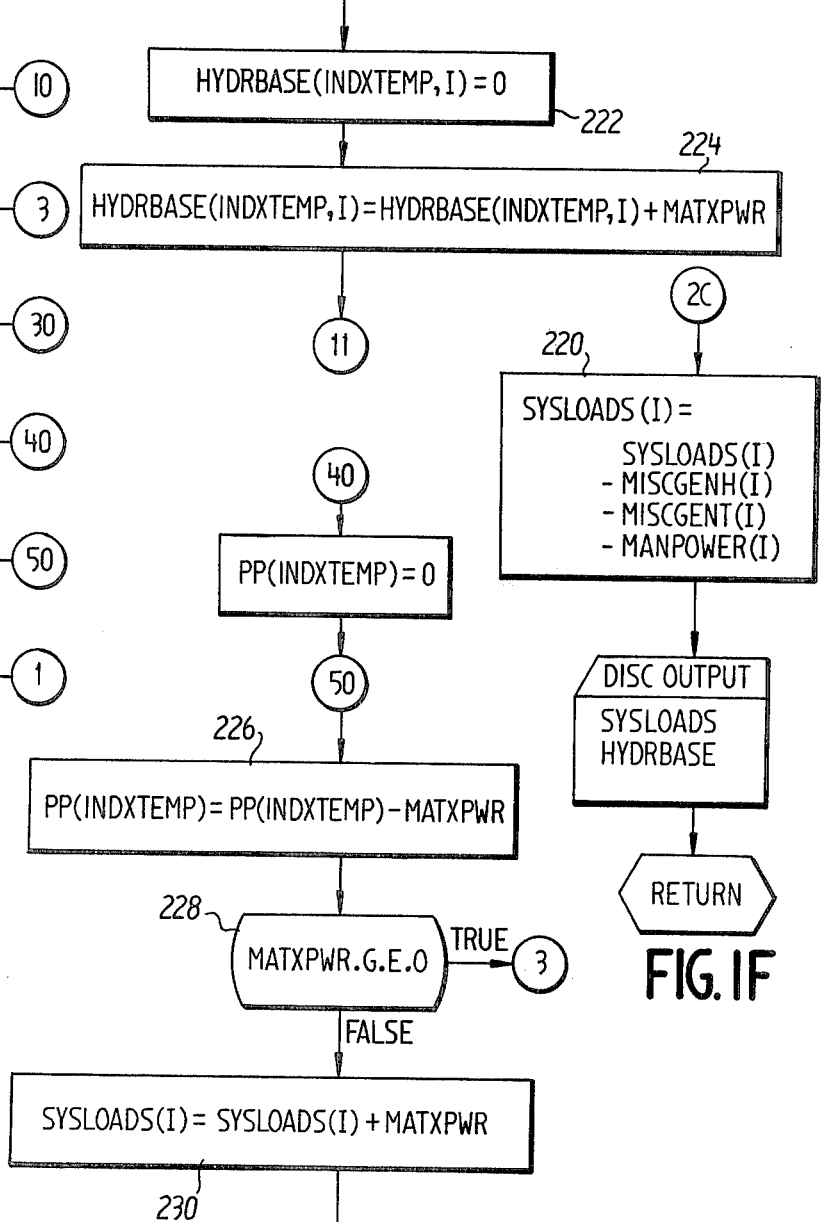

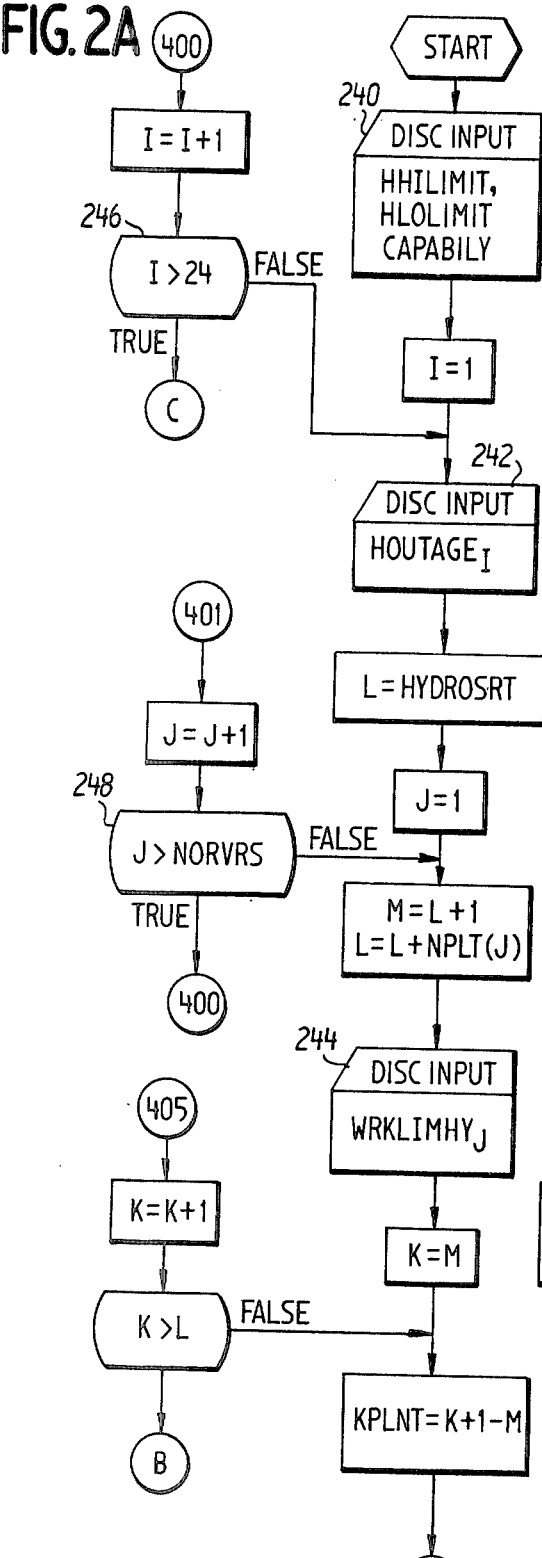
FIG. 2A
FIG. 2C
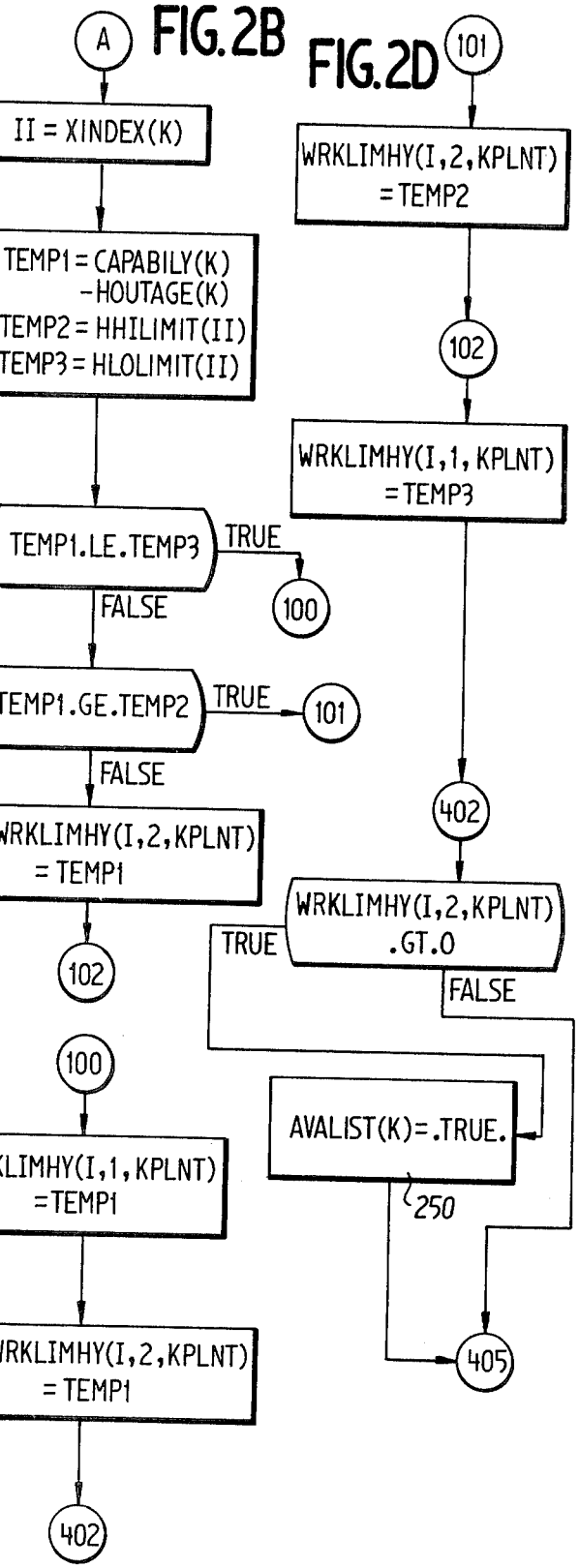
FIG. 2B
FIG. 2D

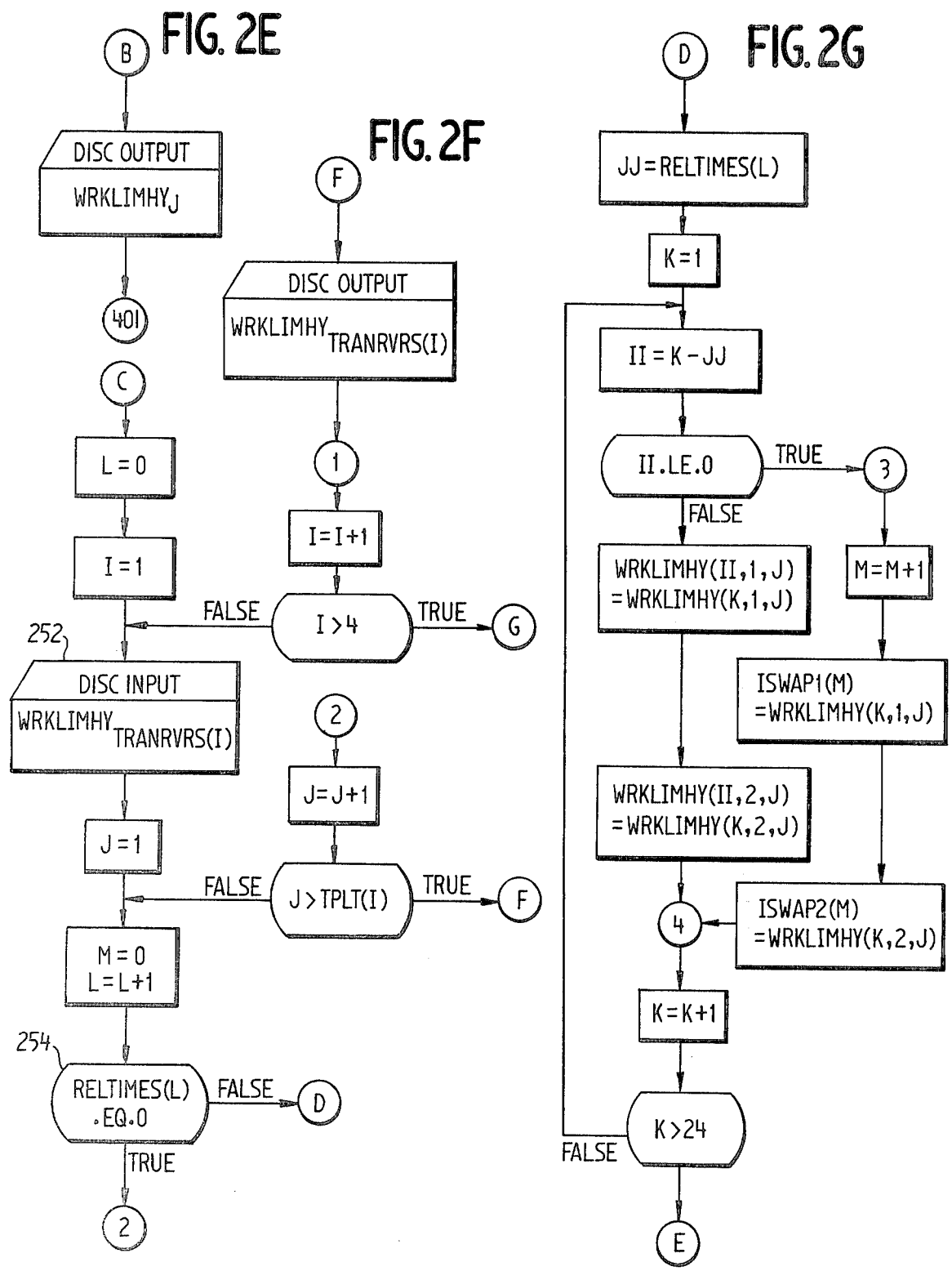

FIG. 3A
FIG. 3B
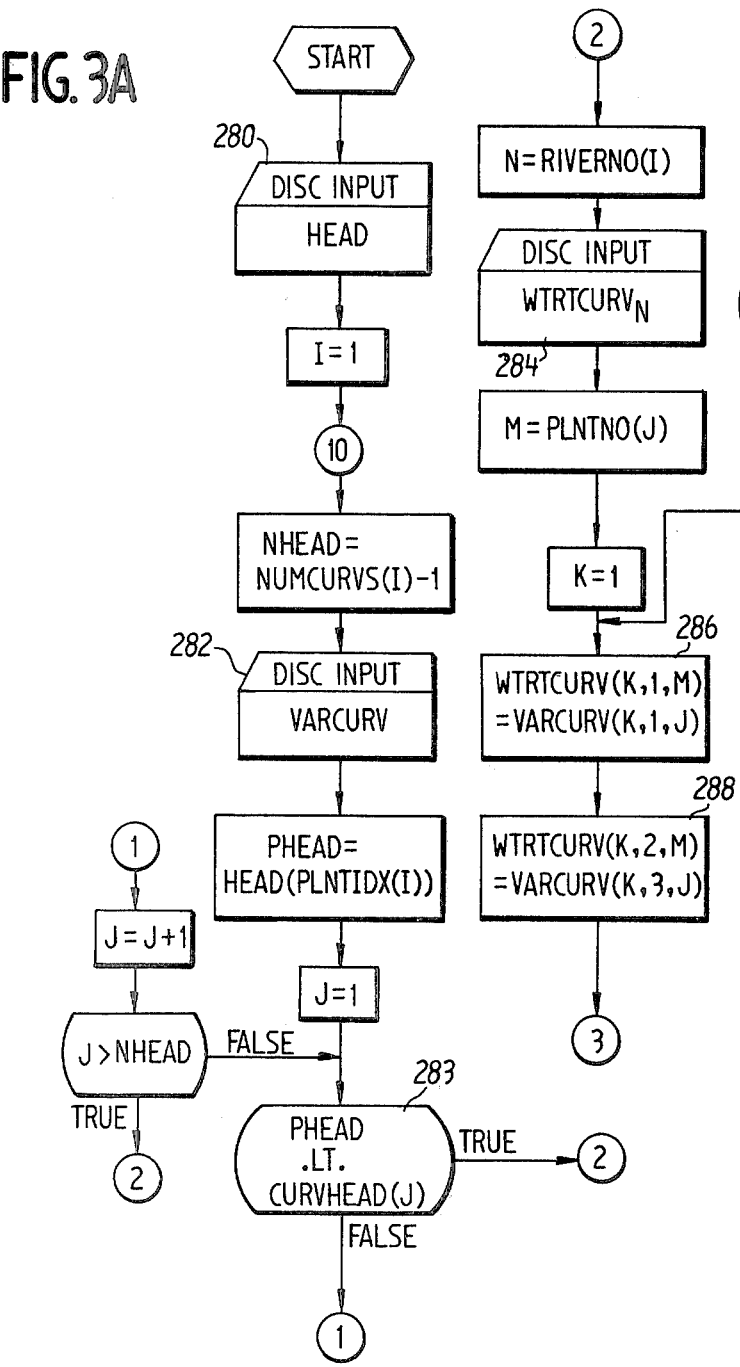
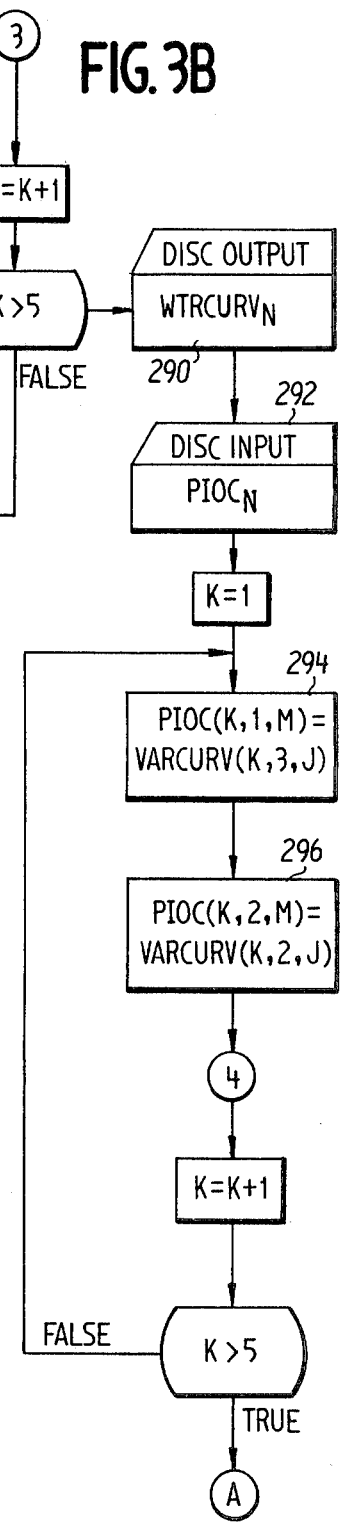

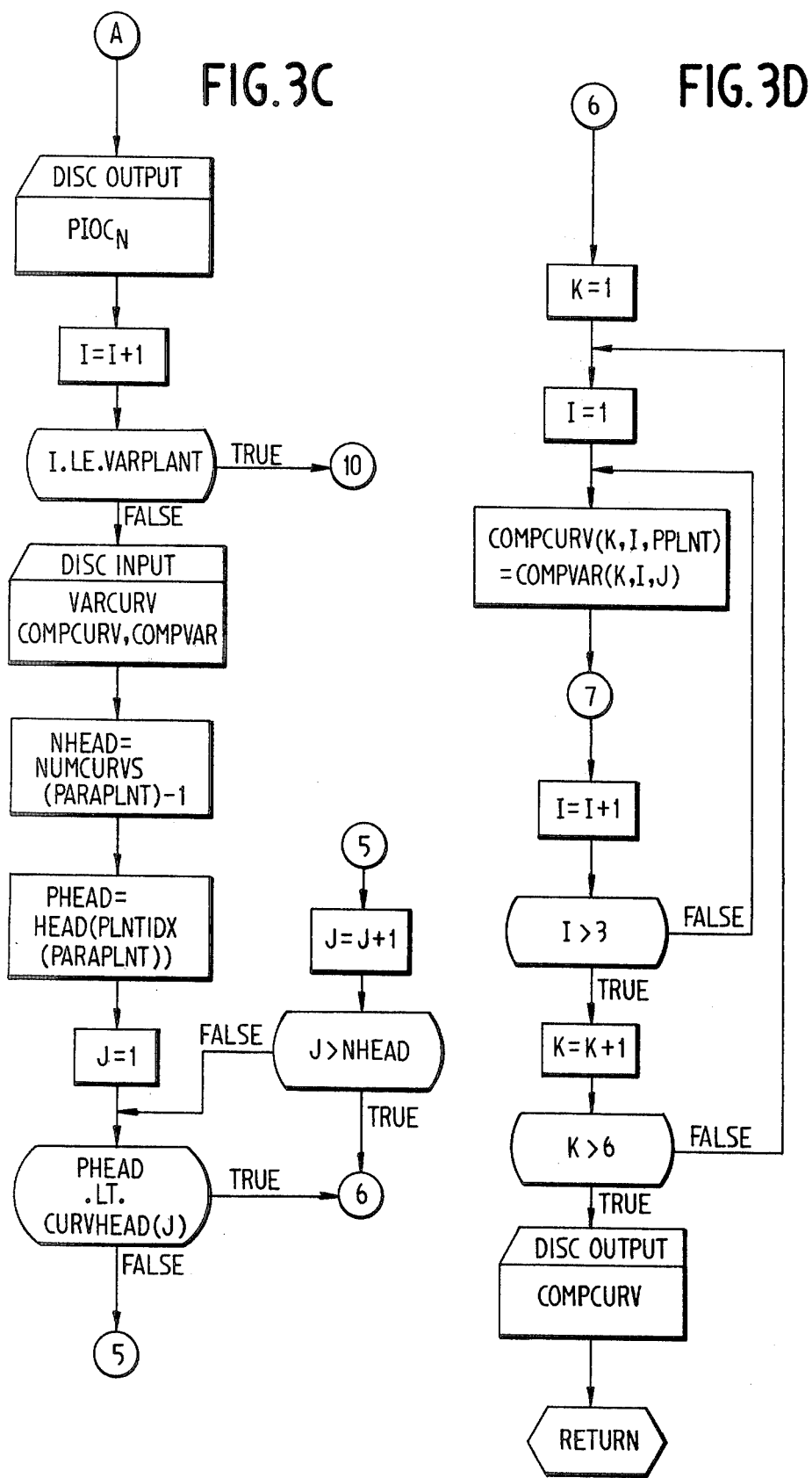

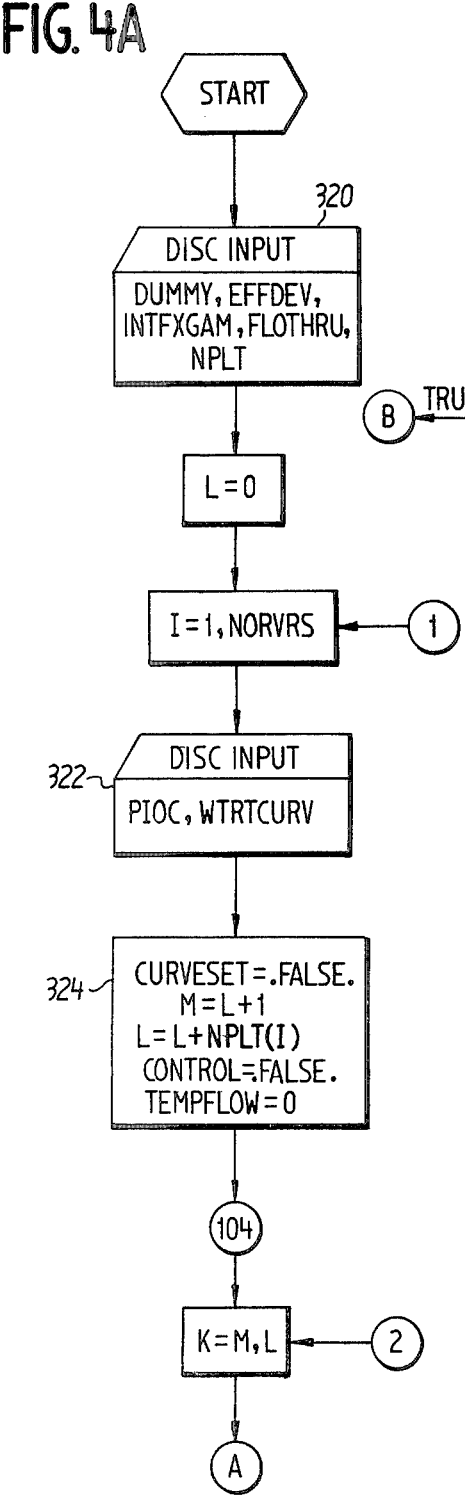
FIG.4A
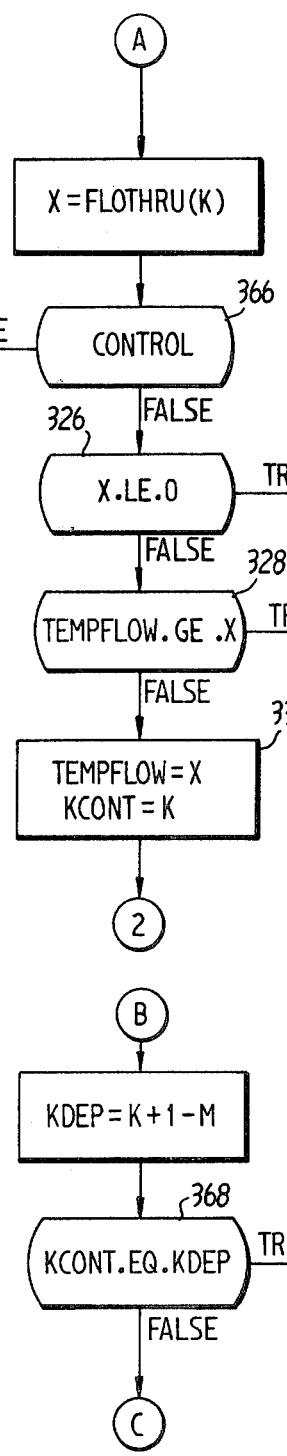
FIG.4B
FIG.4C
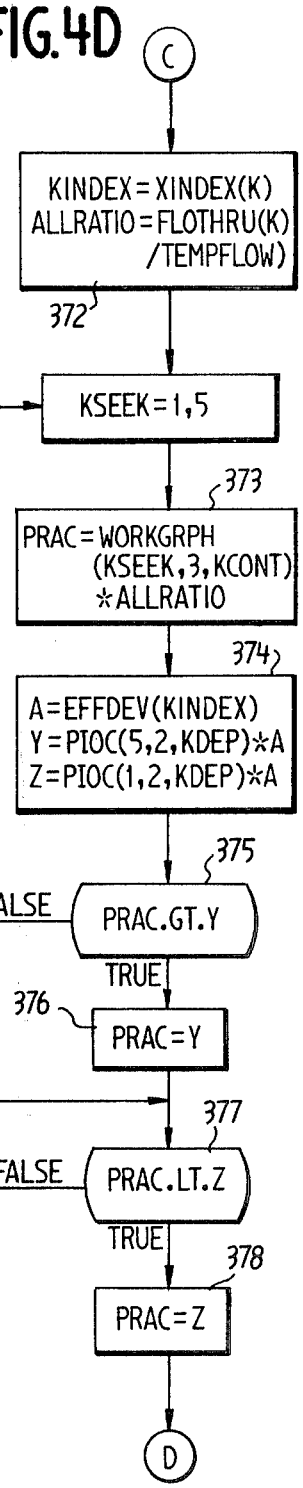
FIG.4D

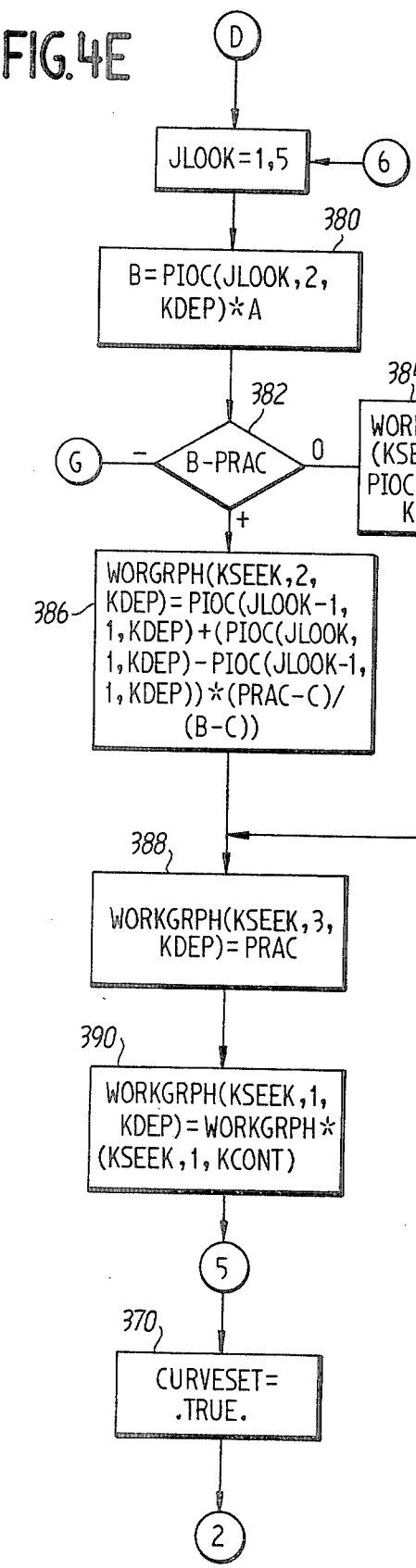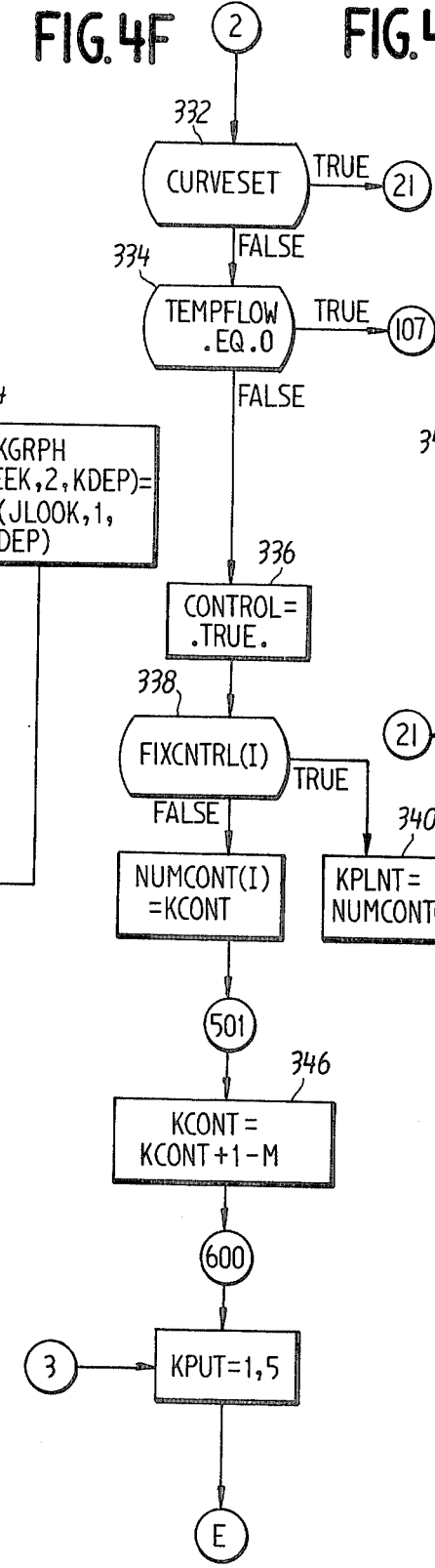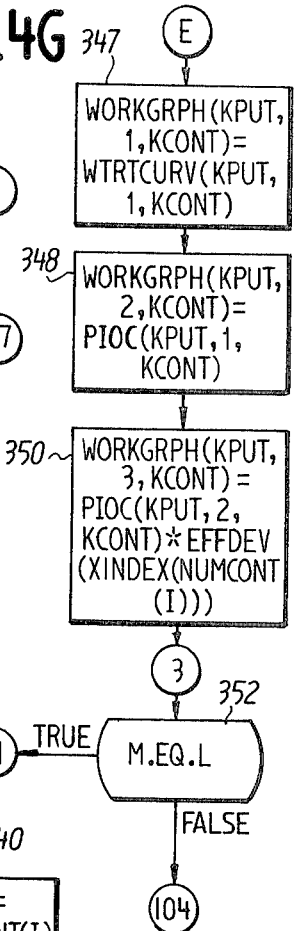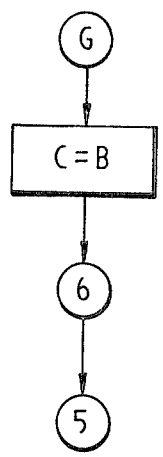

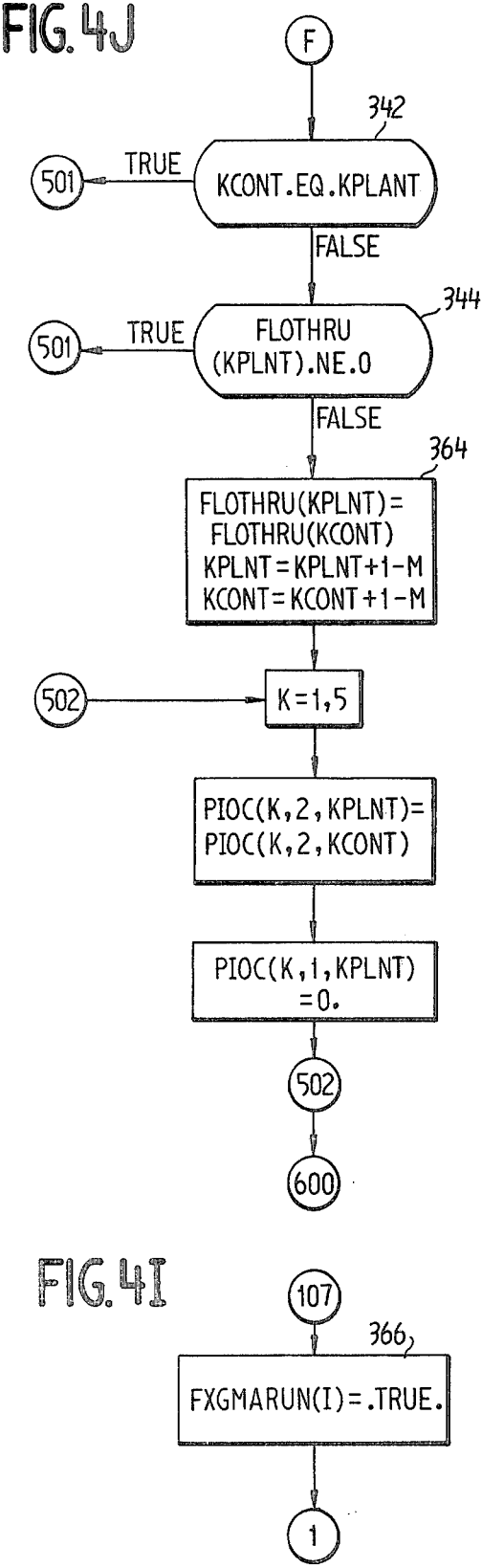
FIG.4J
FIG.4I
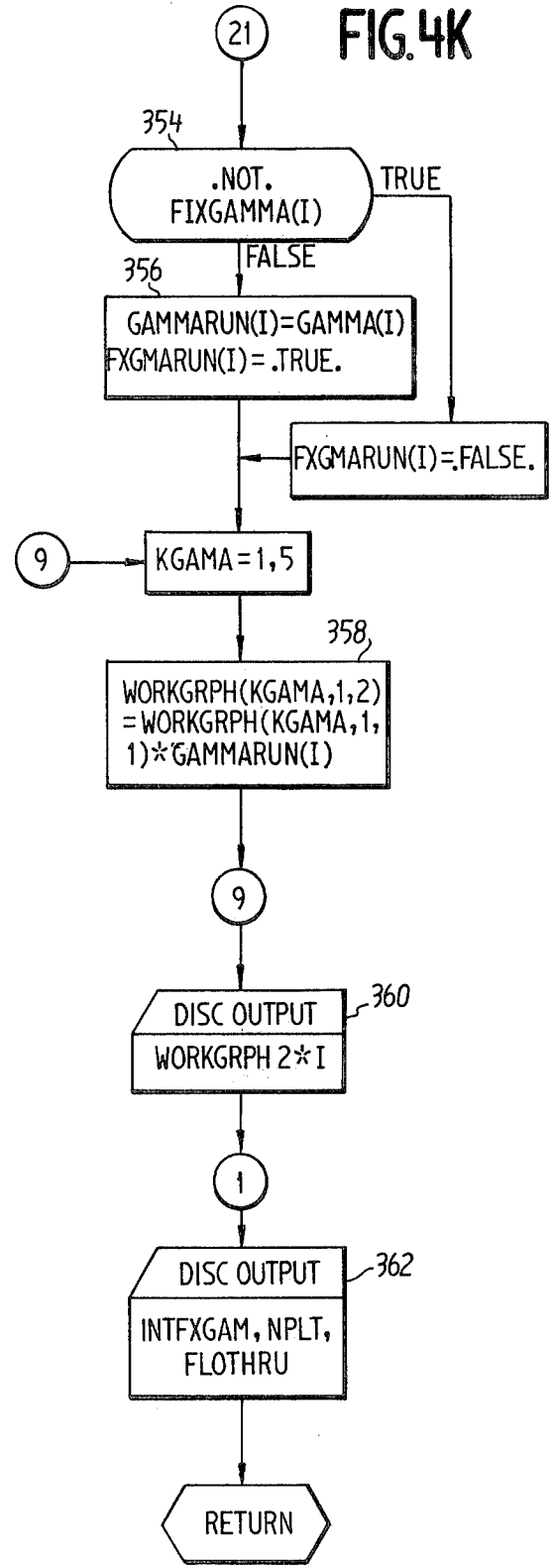
FIG.4K

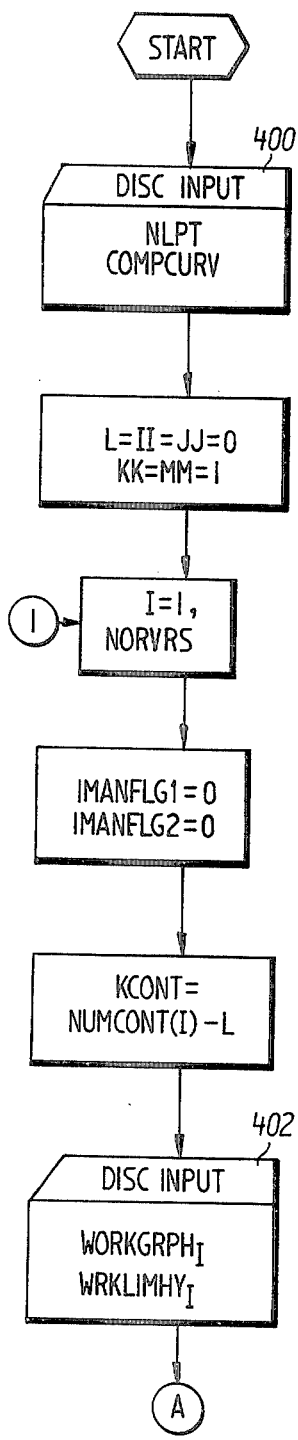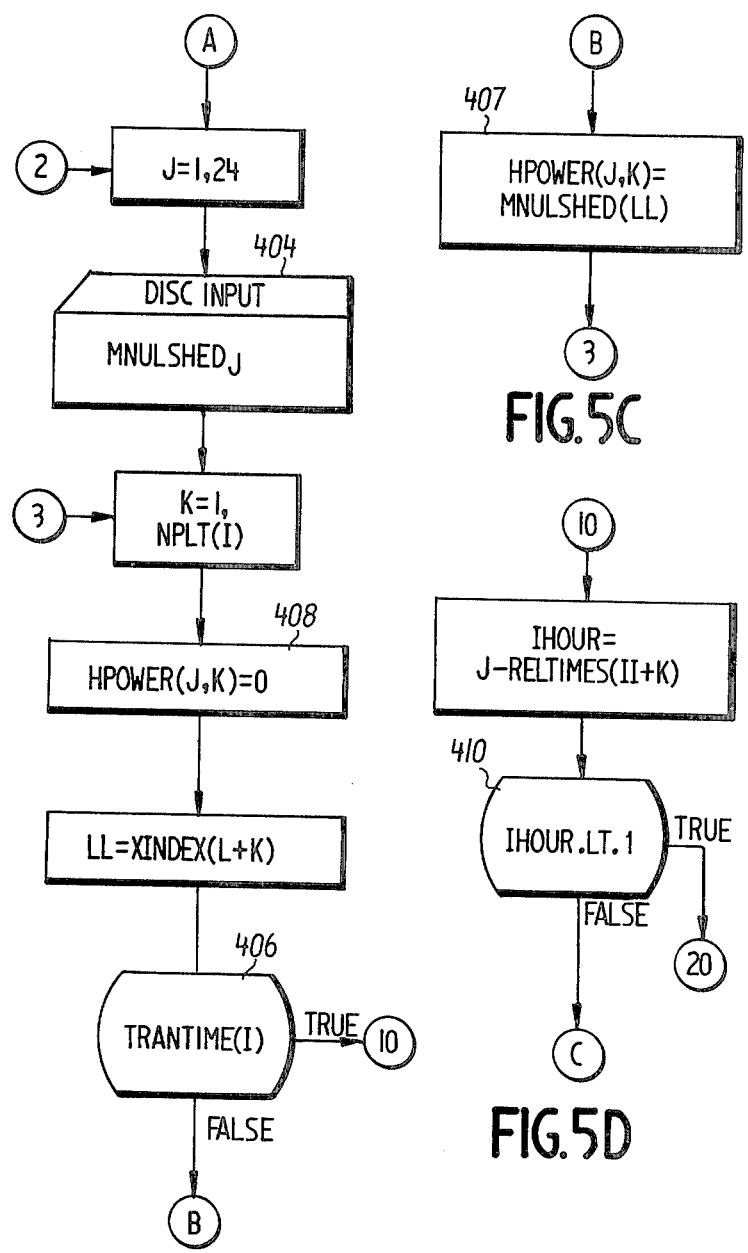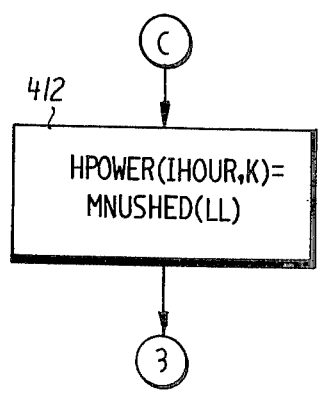

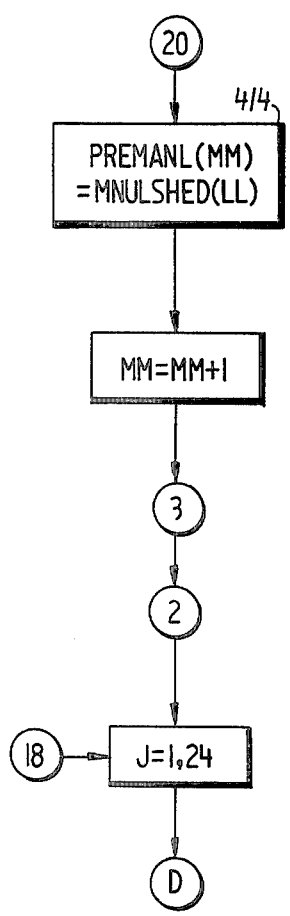
FIG.5F
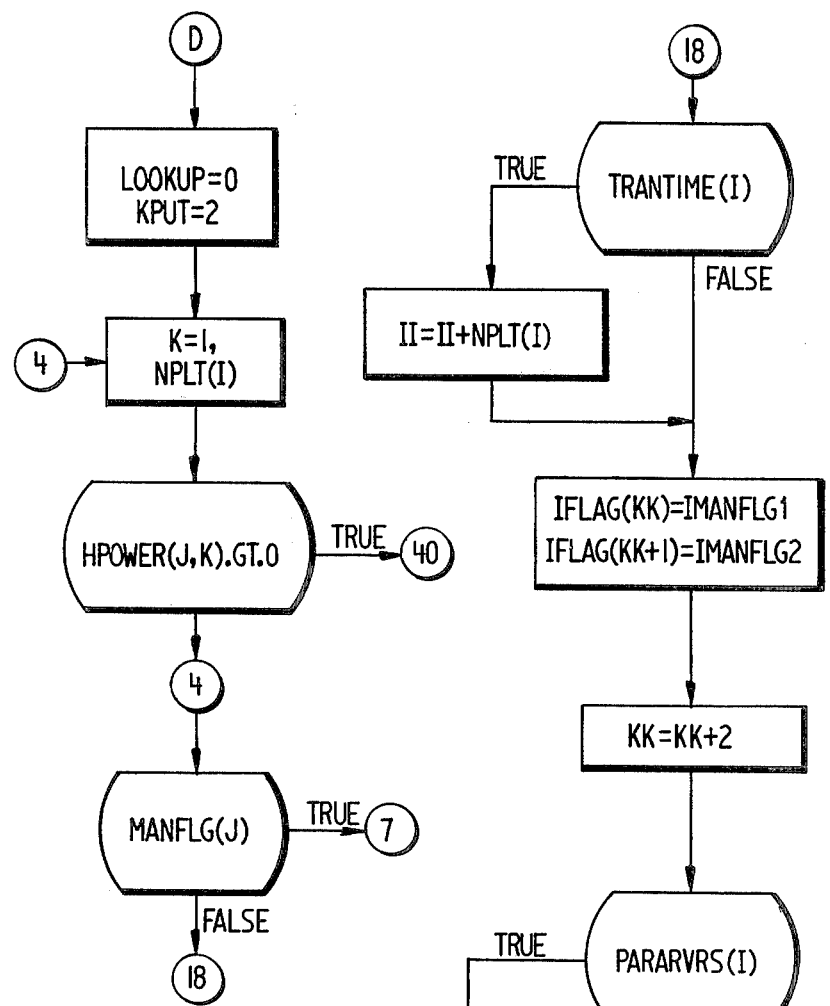
FIG.5G
FIG.5H

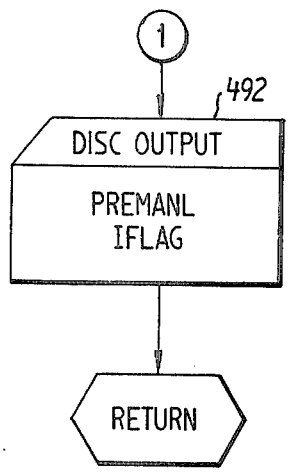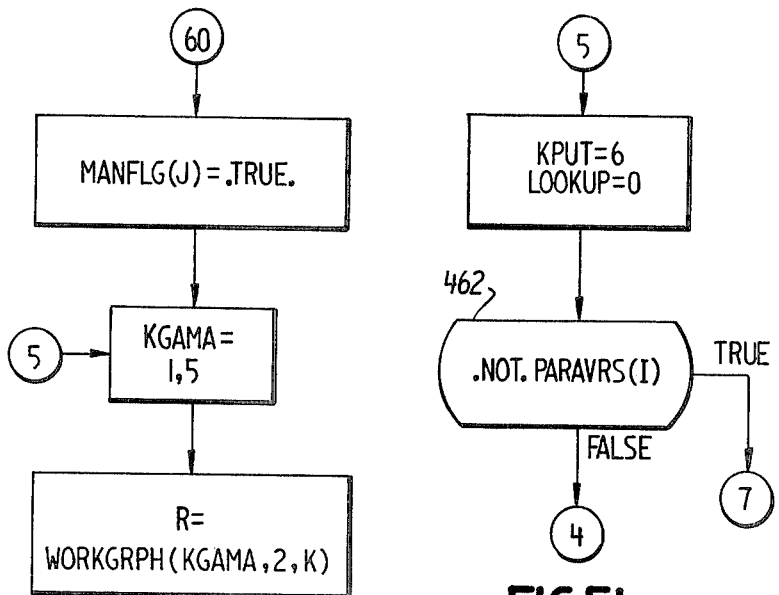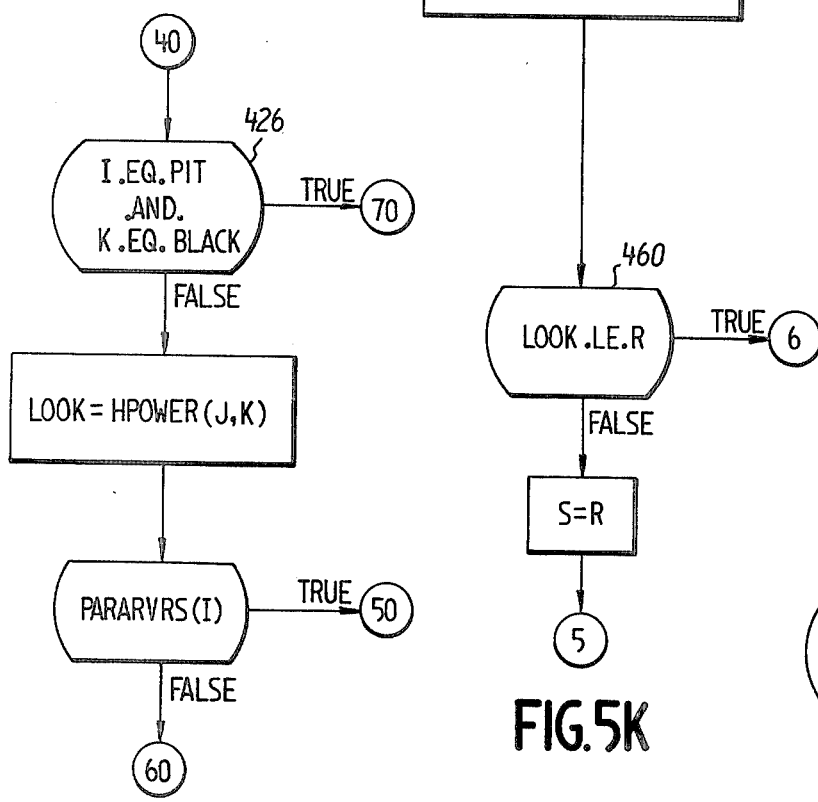
FIG.5I
FIG.5K
FIG.5L
FIG.5J
FIG.5M

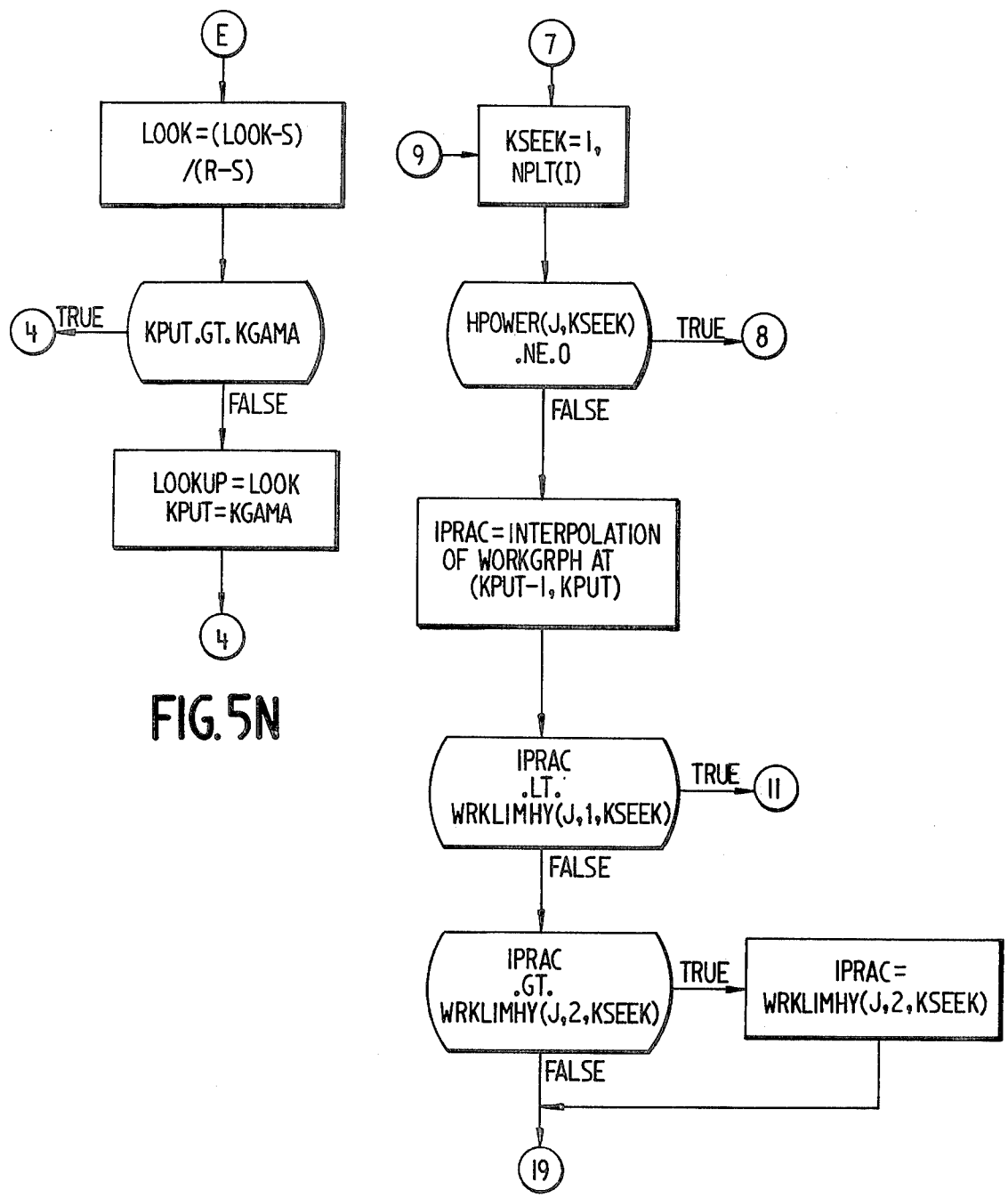

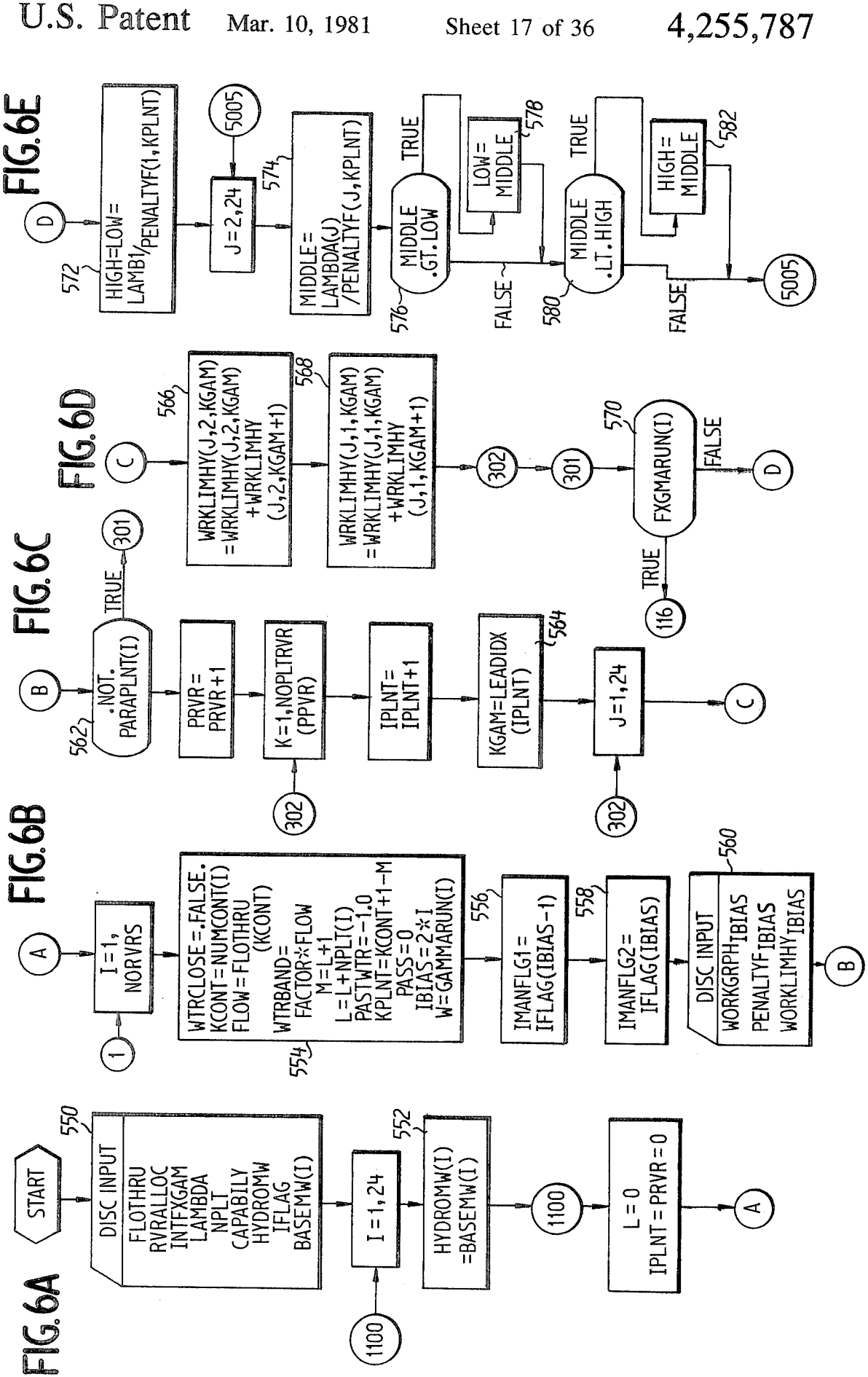

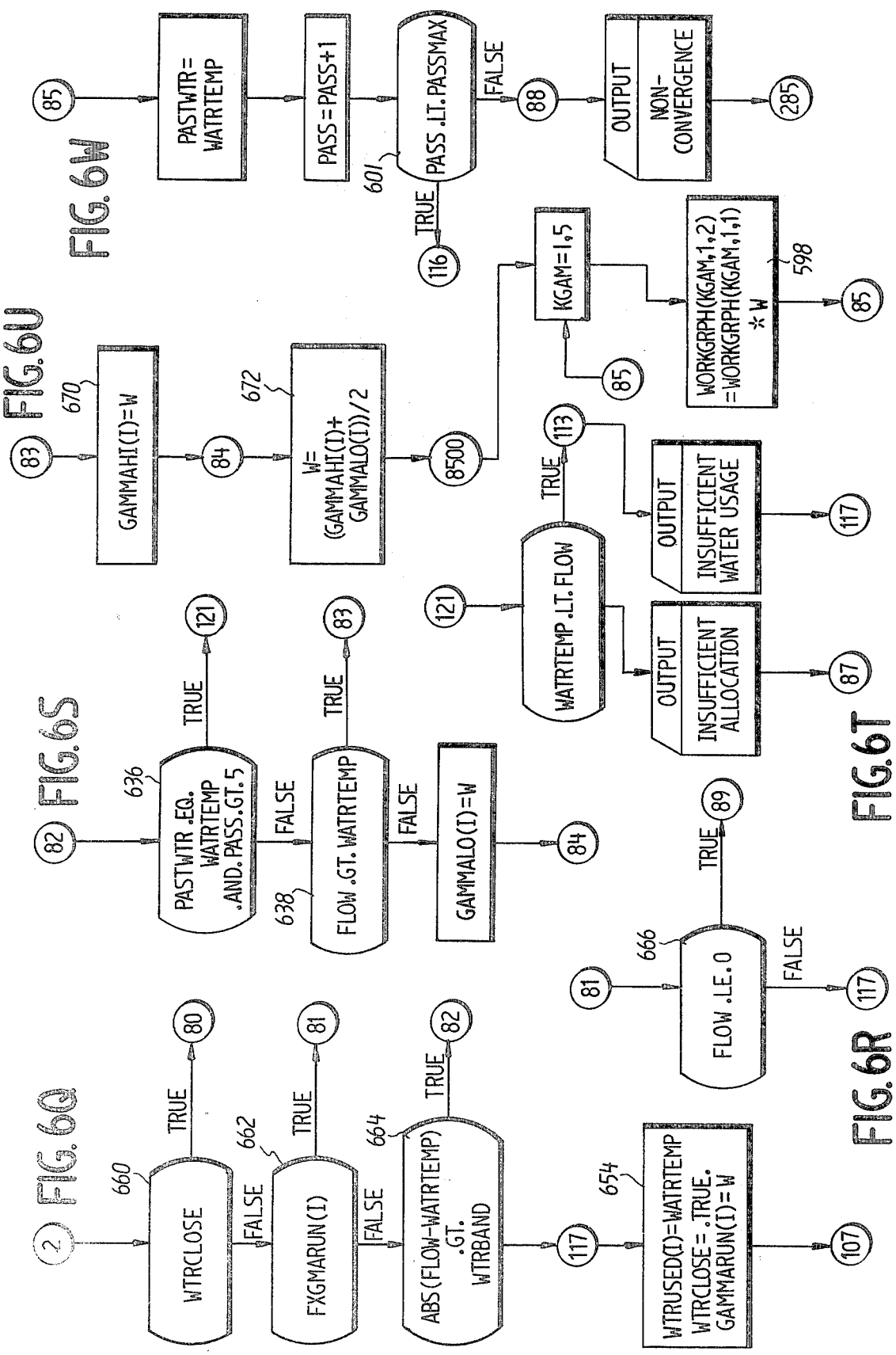

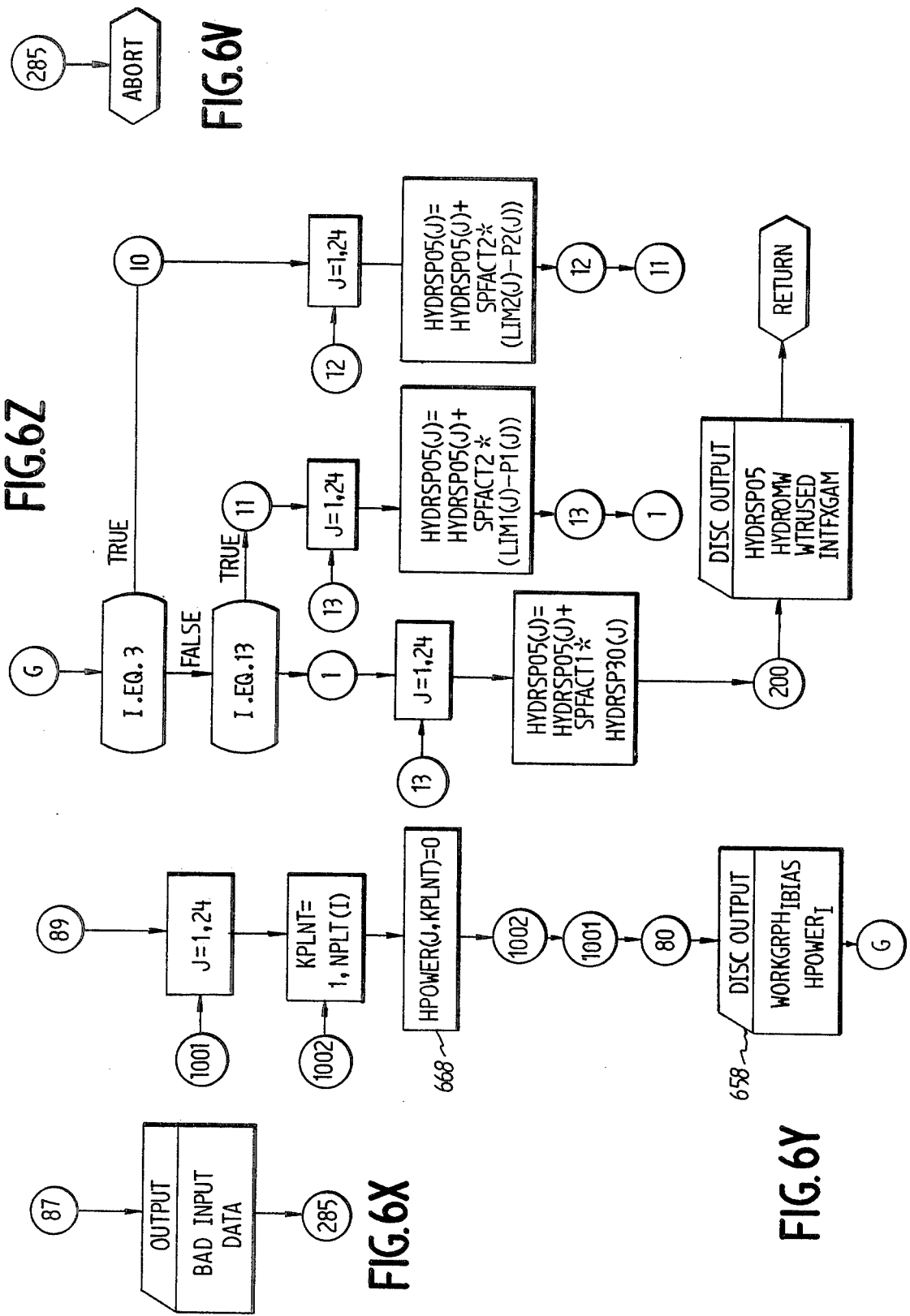

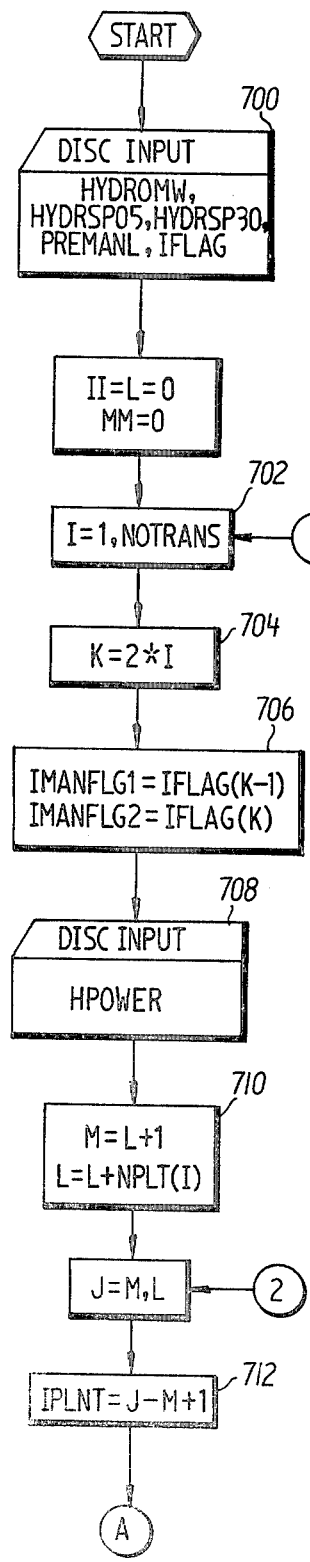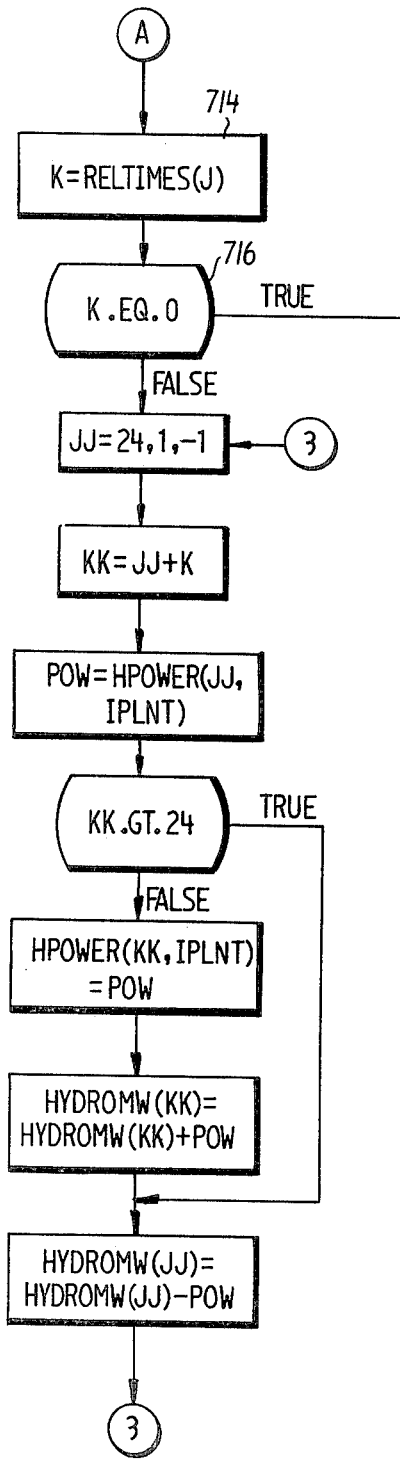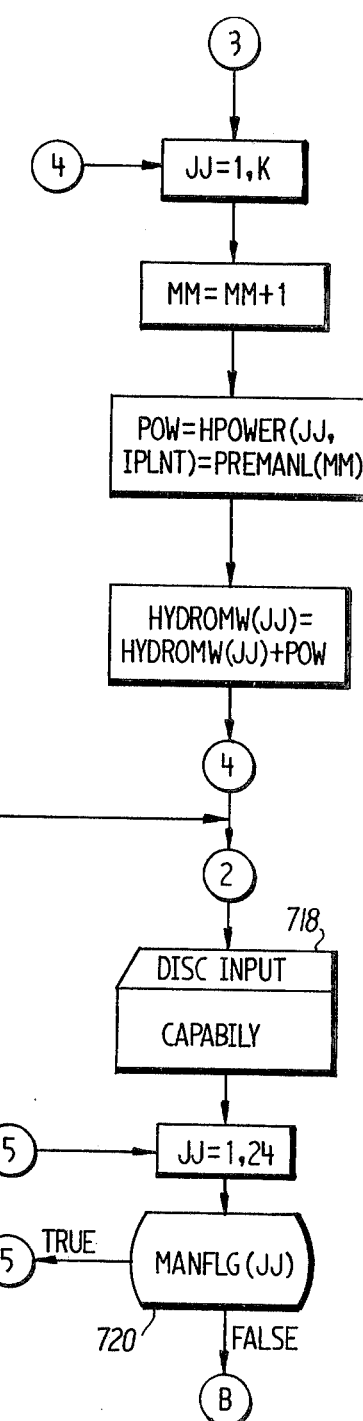
FIG. 7A
FIG. 7B

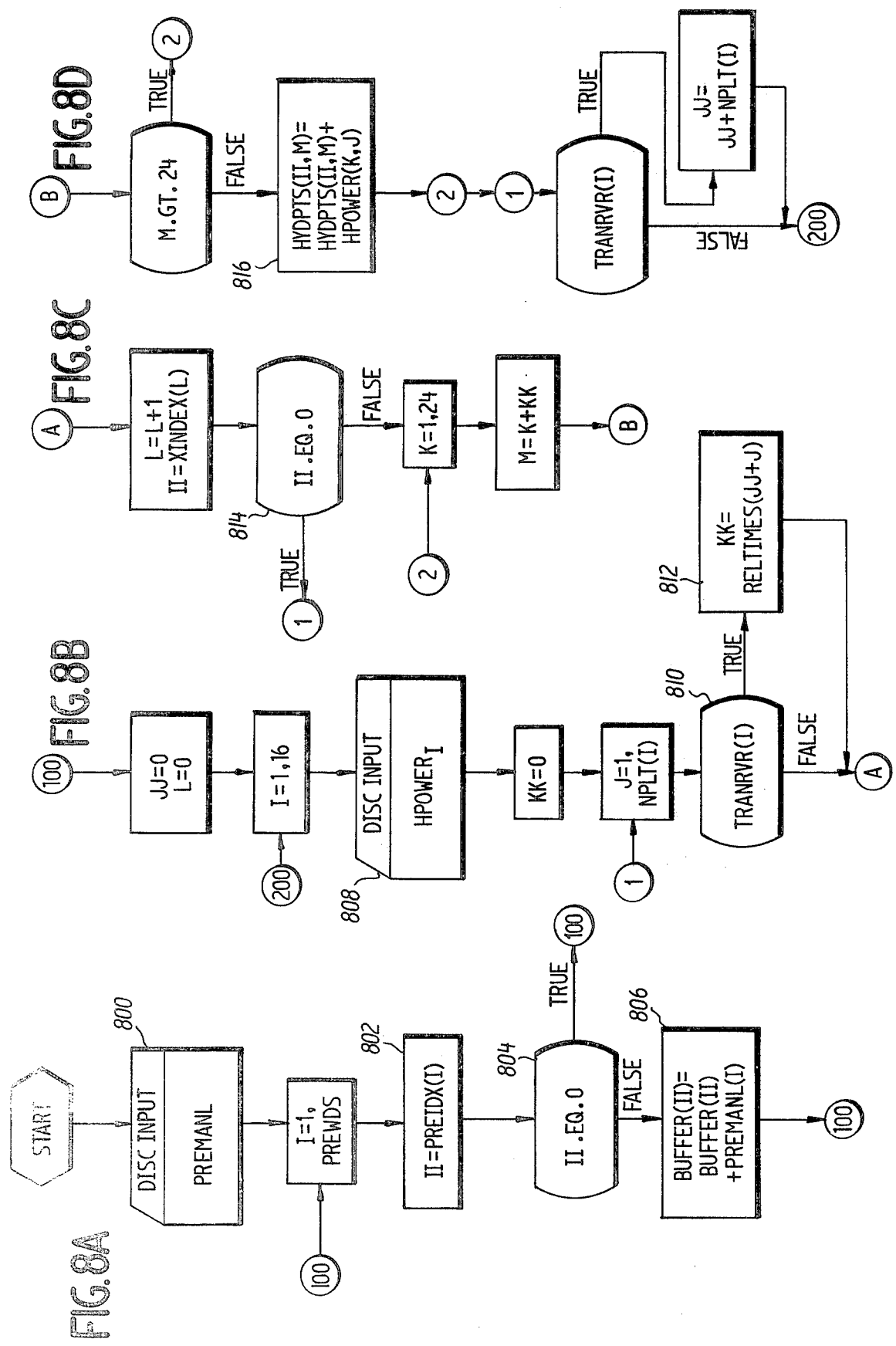

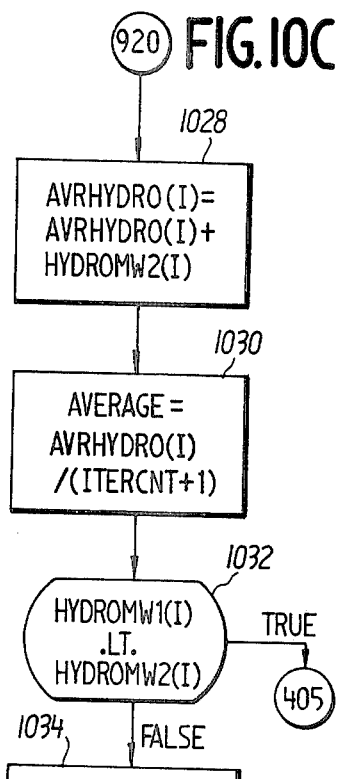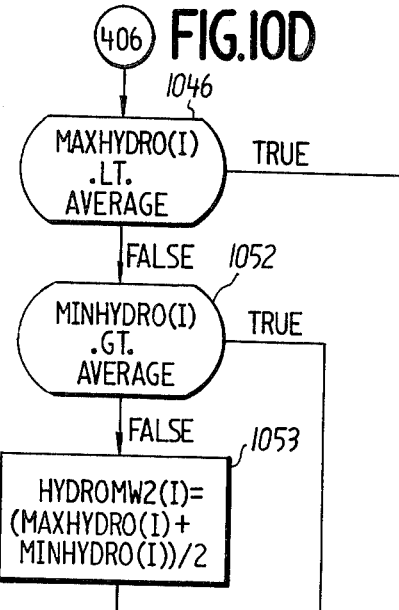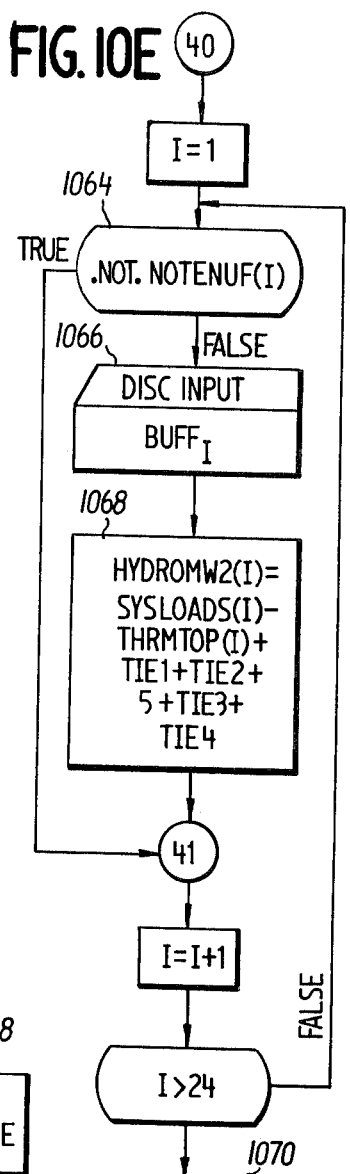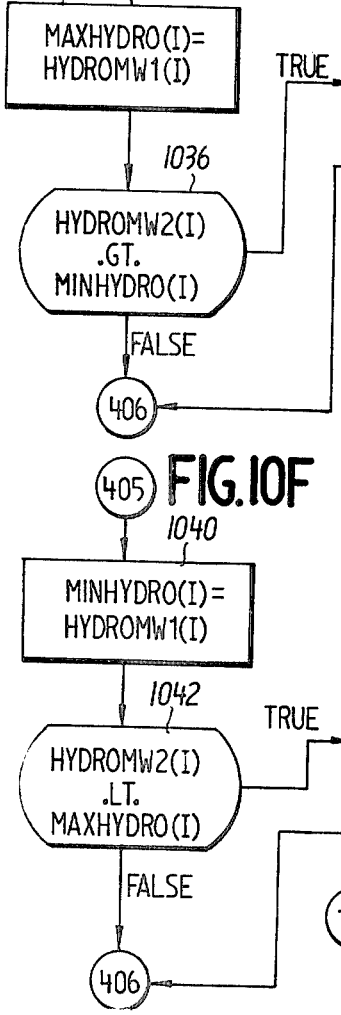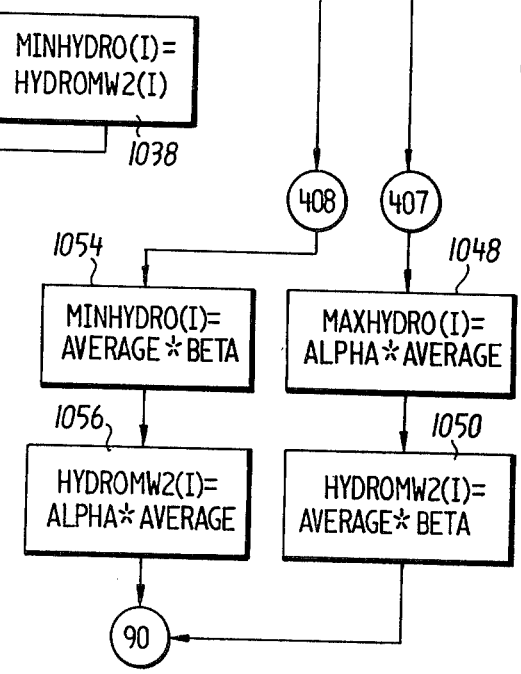

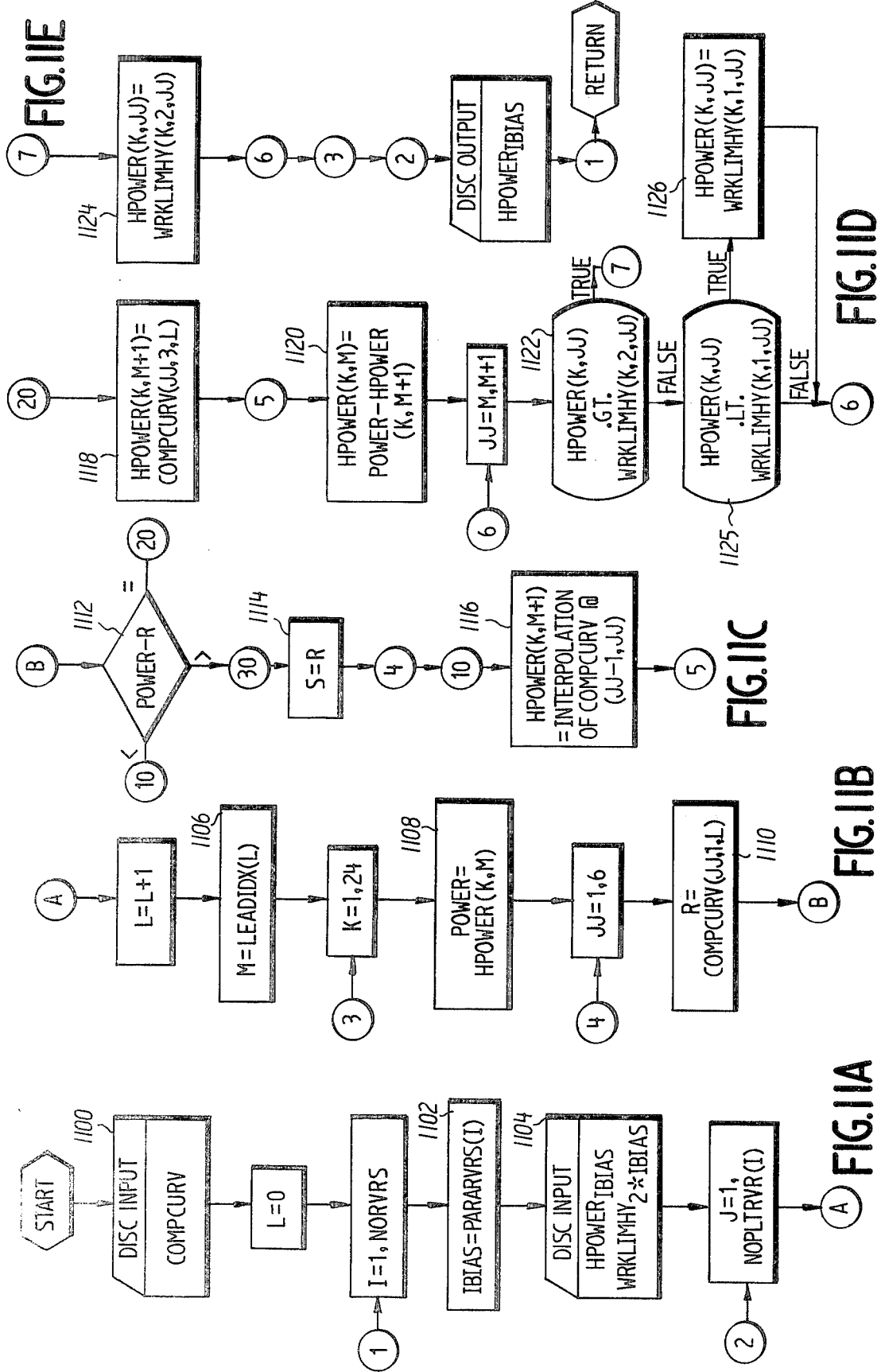

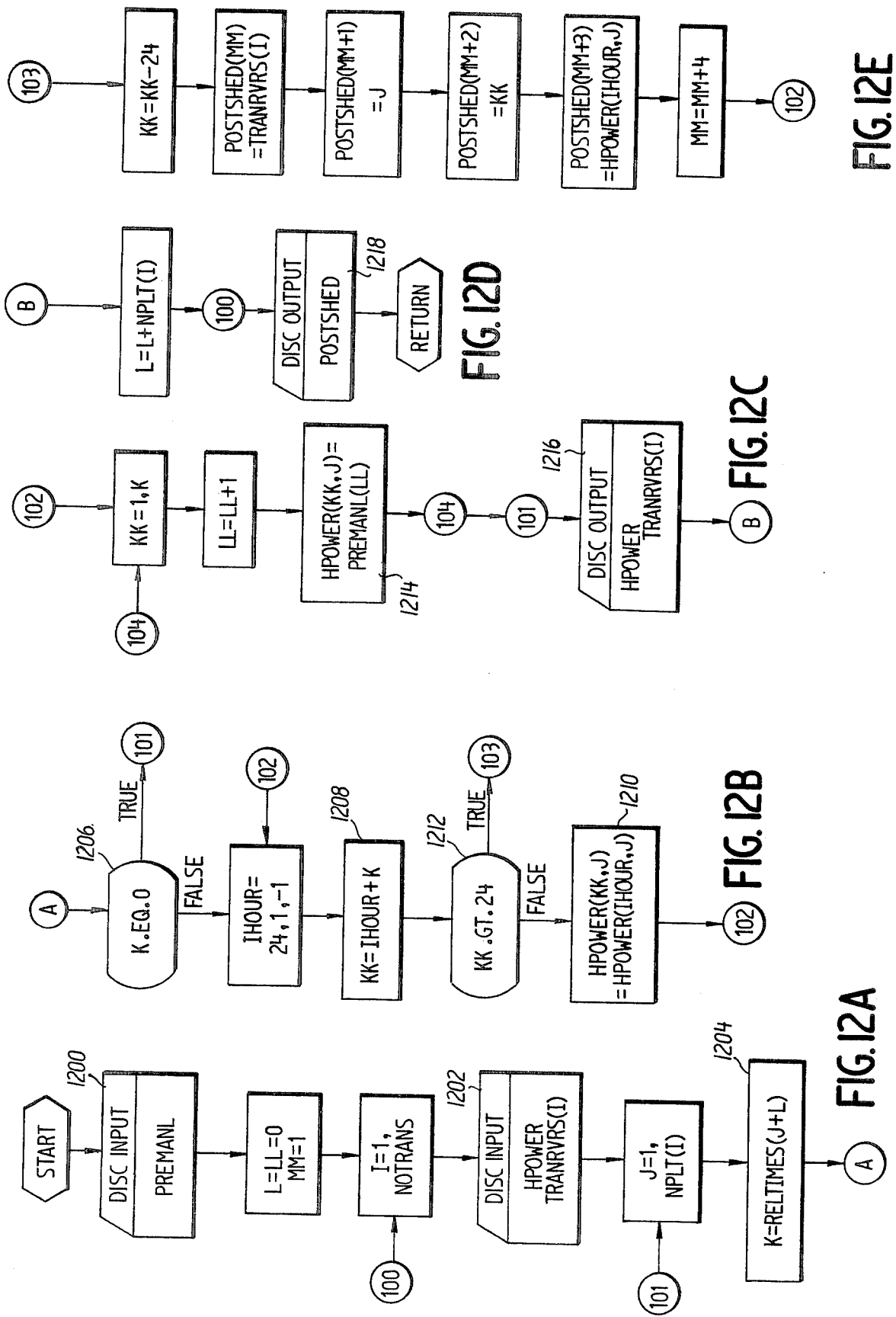

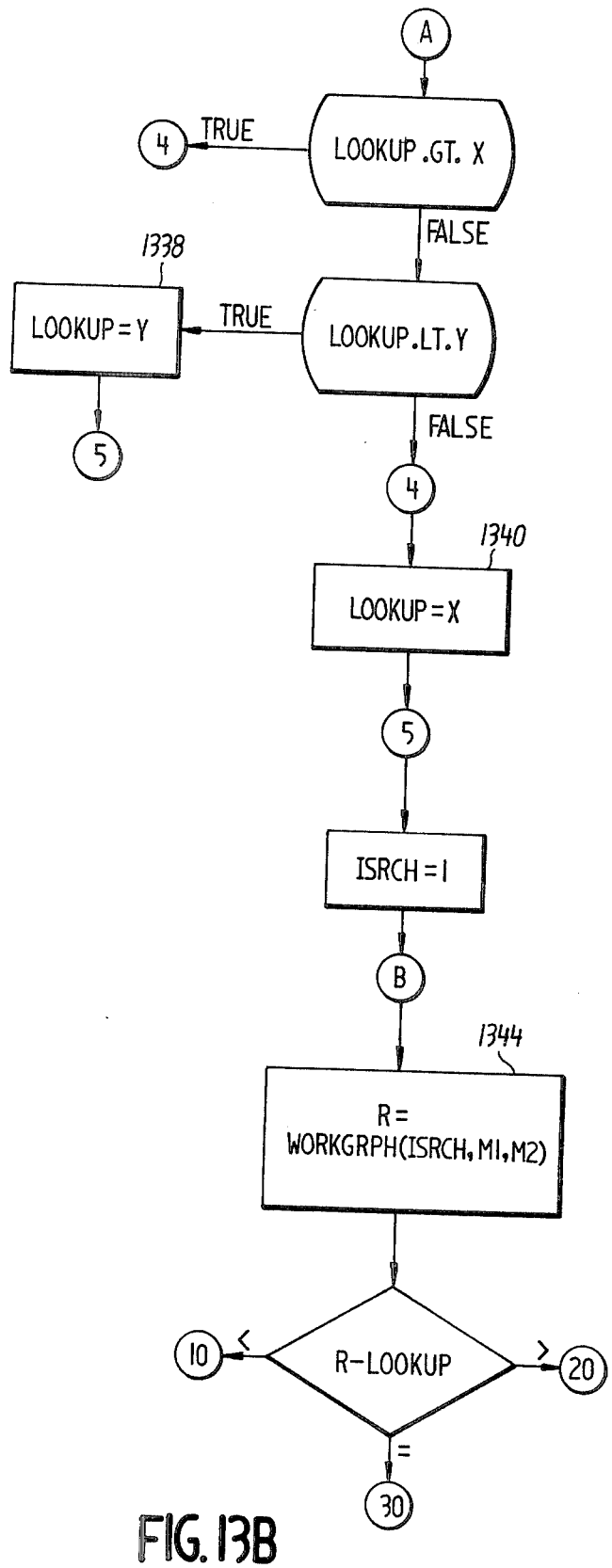
FIG. 13B
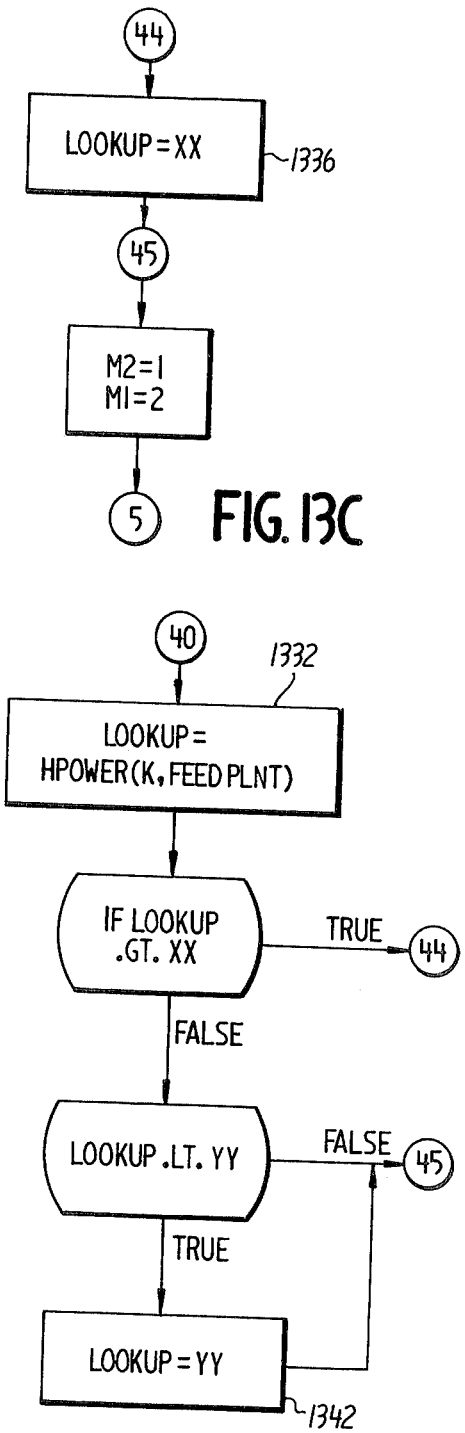
FIG. 13C
FIG. 13K

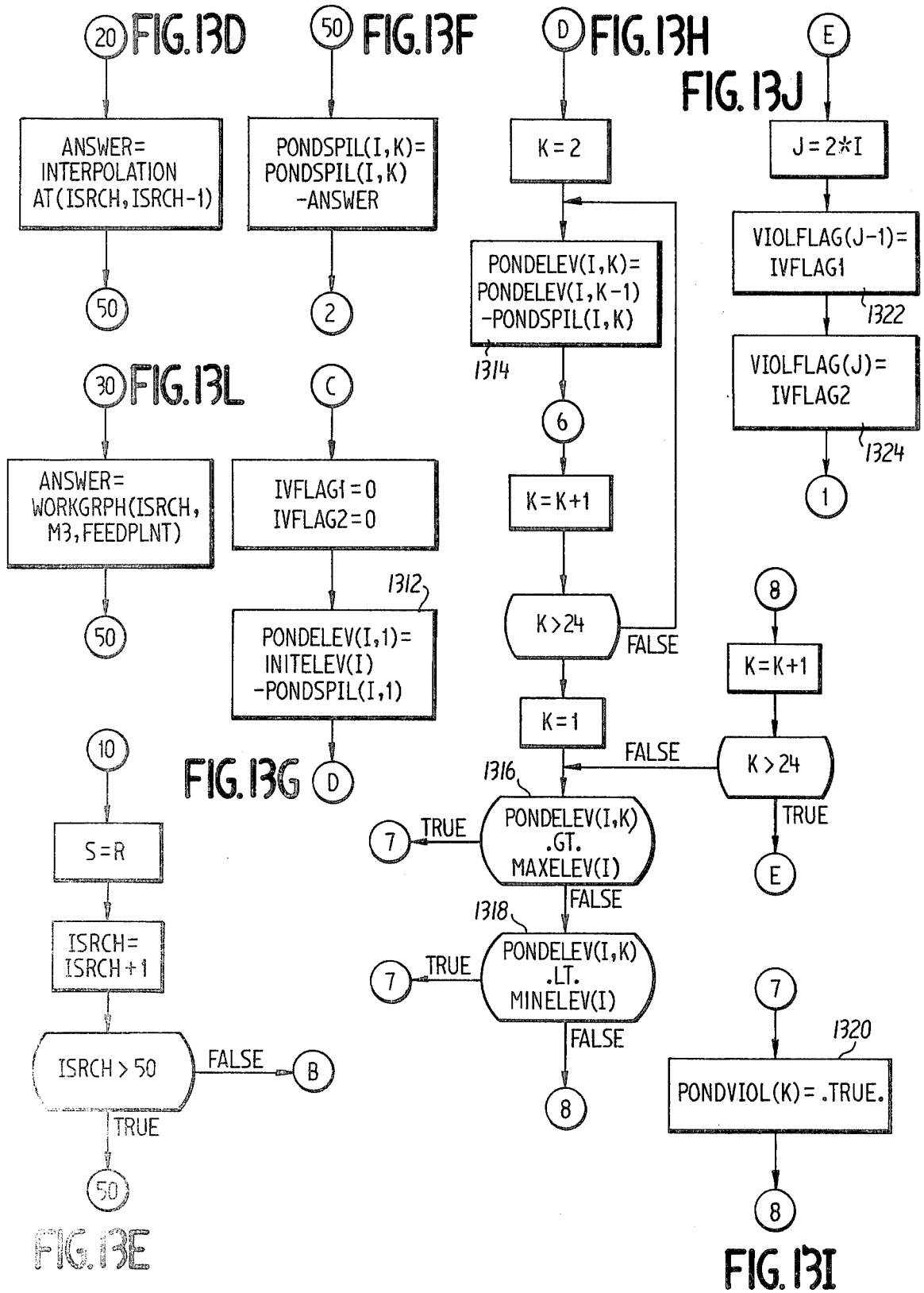

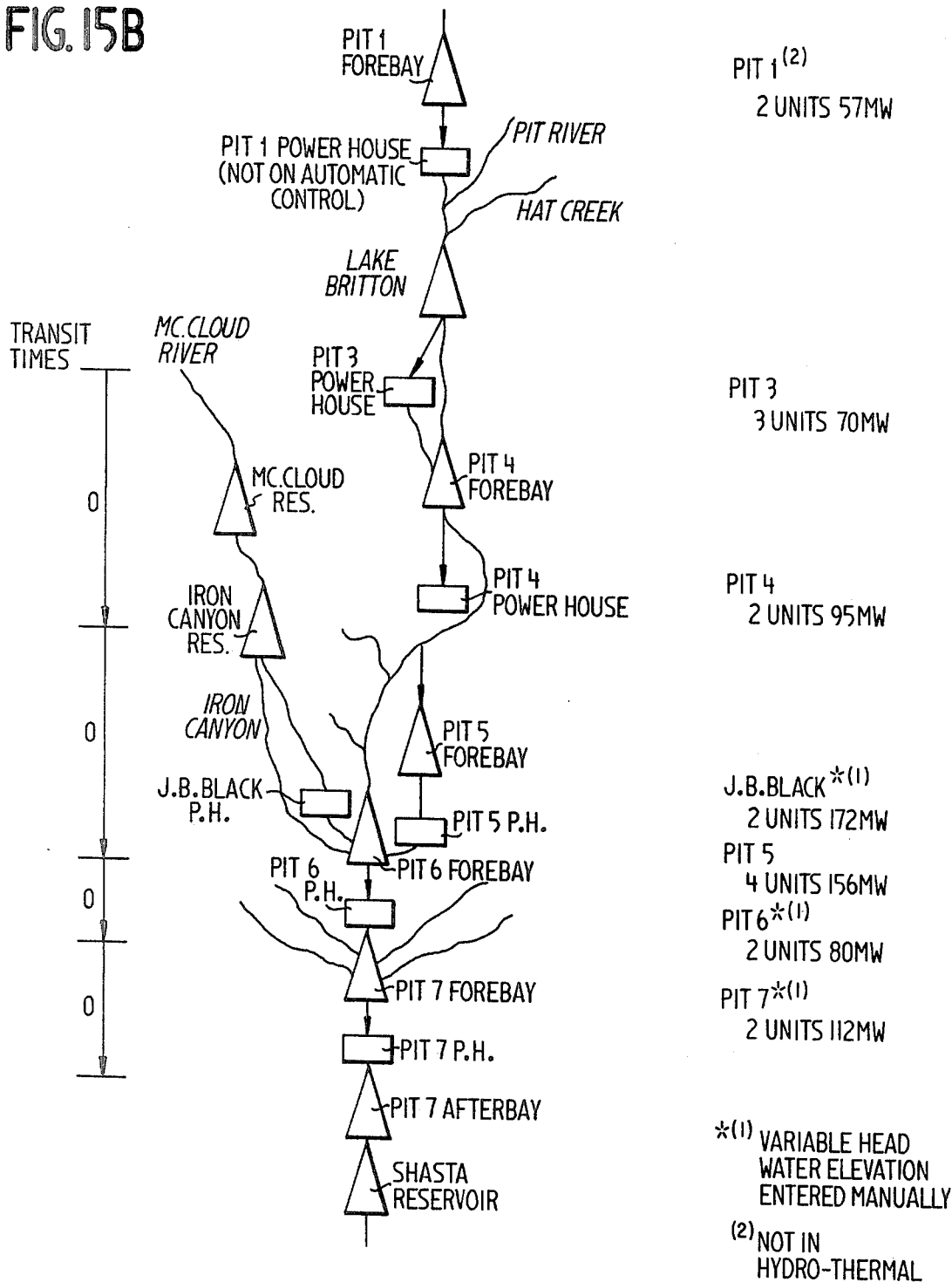

SYSTEM AND METHOD FOR CONTROLLING THE POWER GENERATED BY A SYSTEM OF HYDRO-PLANTS AND THERMAL UNITS

This is a continuation of application Ser. No. 328,194, filed Jan. 31, 1973, abandoned.

CROSS-REFERENCE TO RELATED APPLICATION

Reference is made to the following concurrently filed and related patent application, which is assigned to the present assignee:

U.S. Ser. No. 175,286 entitled "Hybrid Computer System and Method for Rapidly Generating Electric Power System Loadflow Solutions" and filed by D. M. Egelston, M. K. Enns and J. C. Russell.

BACKGROUND OF THE INVENTION

1. Field of the Invention

This invention relates to the method and apparatus for controlling the operation of electric power generating plants of a system to meet economically the forecast of system loads, and in particular, to the coordination of a multiplicity of hydro and thermal generating units within a single system.

2. Description of the Prior Art

The operating procedure of electric companies using both hydro and thermal generating units has traditionally been the manual scheduling of system generation based upon "peak-shaving" with the hydroelectric generating units. All pre-scheduling was based upon the operator's projection of future system needs and available resources. In some cases, the plan of solution was an iterative cost trajectory optimization. In this method, a feasible commitment of units is input to a computer program and then a classical hydro-thermal coordination is conducted using the input commitment. After obtaining a satisfactory water balance for the scheduling day, the start-stop times of both hydro and thermal units are varied until no further savings are gained. However, such a method for achieving unit commitment and economic dispatch required long computation times.

In order to expedite the solution of hydrothermal coordination, logical scheduling rules employed by a power company from its experience are used to obtain a sub-optimal solution to the commitment problem. This solution provides an initial schedule. By means of computer simulation, both large and small variations are made to the initial commitment to obtain a less costly daily commitment. For this optimized schedule, transmission loss penalty factors are calculated and used in interchange negotiations and for subsequent running of the dispatch program.

Selected hydro units are scheduled by a technique known as "peak shaving". The schedule for the remainder of the hydro units is input. For pumped hydro units, either the initial pump-generate schedule may be input of the pump schedule only may be input with the generation determined by peak shaving. Selected hydro and thermal units are committed to non-spin status for satisfaction of the five-minute reserve requirements. Selected hydro units are placed on motor status to contribute toward the five-minute reserves. The on-line hydrosystem five and thirty-minute reserves are calculated. The hydro scheduling logic of peak shaving involves scheduling hydro energy for generation during high load hours. A magnitude ordered load versus time curve is contructed and hydro energy is successively removed from the high to low load hours until all hydro energy specified for a given unit is used.

Computation for hydro optimization attempts to decrease cost by increasing hydro generation in certain hours and decreasing hydro generation in other hours. The test of where to shift hydro is related to the value of system incremental cost for all hours. High lambda hours in which no hydro is used, are potential hours of tentative hydro swap with lower lambda hours in which hydro is used. Dispatching, costing and testing of actual savings comprise the major elements of computation.

Constructions of mathematical models of hydrothermal systems showed that the classical approach would result in an unwieldly number of parameters for which the solution time would be impractical on an on-line digital control computer. Based on the geographical separation of the hydro-electric and thermal generation sub-systems, a modeling technique is suggested by this invention which utilizes this isolation. As is evident in the description of this invention herein, the two sub-systems, hydro and thermal, are dispatched separately with system convergence dependent upon the iteration between the two sub-systems. In contrast, classical methods would dictate a gamma, where gamma is an artificial cost of water in terms of dollars per acre-foot, for each hydro plant, thus, presenting a large number of parameters for solution. No representation is made that any prior art considered herein is the best pertaining prior art nor that the considered prior art cannot be interpreted differently from the interpretations placed on it herein.

SUMMARY OF THE INVENTION

It is, therefore, an object of this invention to control economically the power generation of a system including hydro plants and thermal units.

It is a further object of this invention to reduce the parameters that must be solved to dispatch economically a system including hydro plants and thermal units and to allocate water to each of the hydro plants within the system.

In accordance with these and other objects, this invention provides a system and method for controlling the economic dispatch of a power generating system including thermal units and hydro units disposed in groups according to their corresponding river system. Initially, a set of system lambdas is assumed to initiate the calculation of the hydro generation and achieve water allocation for each hydro plant of the system. Illustratively, a set of 24 lambdas is selected for the previous 24-hour period. Based upon a model of a river system in which various points upon a river system are hydraulically interconnedted, a single plant upon the river is deemed a "control plant" and its characteristics, including its input/output and incremental water rate curves, are used to construct artificial incremental water rate curves for the dependent plants whereby the allocation of water is determined by considering only the working curves of the control plant. Water allocation for the control plant is determined by adjusting an artificial factor gamma, indicative of the cost of water, until the requirements of the given lambdas are met for a pre-determined amount of water flowthrough for the control plant.

Once water allocation has been dispatched for the control plant, and, therefore, for the dependent plants, hydro generation for each plant of each river system is calculated and subtracted from the total system load schedule to determine the power generation to be dispatched for the thermal units. Unit commitment procedures are performed for the thermal units to meet the calculated thermal-power generation and to determine thereby a set of lambdas, illustratively corresponding to 24-hour periods, as a result of the dispatch of the thermal units. The set of calculated lambdas is then used as previously described to establish water allocation for the hydro plants of each of the river systems within the system and to determine new hourly values of total hydro-power generation for all of the hydro plants. Then, the difference between the values of total hourly hydro generation as estimated by using a set of lambdas for a previous time period and of total hourly hydro-power generation calculated by using the lambdas determined by the thermal unit commitment, is compared with a pre-determined value of closure tolerance; if met, hydro-thermal coordination has been completed. If not, a new hourly hydro generation is approximated and a new thermal-power generation is obtained whereby a new set of lambdas is determined by thermal unit commitment. In turn, the new set of lambdas as determined by the thermal unit commitment is used to recalculate as explained above a new set of hourly hydro total generations. The newly calculated values of hydro generation are compared with the previously approximated values of hydro-power generation to ascertain whether the differences are within closure tolerance. This process is repeated until desired closure is effected.

In an illustrative embodiment of this invention, convergence of the coordination between the hydro and thermal generation is determined by the binary search method in which a new approximation of the total hydro-power generation is determined as the sum of the maximum and minimum bounds of hydro generation for the coordination divided by two. The maximum and minimum bounds of hydro generation are set after each coordination constrained by the requirement that the average of all resulting hydro approximations must be within the bounds for the next coordination. Thus, if the average of all resulting hydro approximations is greater than the maximum bound or less than the minimum bound, the respective bound is reset by a given factor to include the average of all resulting hydro approximations.

A further feature of this invention relates to the construction of artificial incremental water rate curves for the dependent plants based upon the working curves, i.e., the input/output and incremental water rate curves of the control plant. The artificial curves for the dependent plants are constructed by first determining the water flowthroughs allocated to each of the plants with respect to the flowthrough of the control plant to provide an allocation ratio for each of the dependent plants. Typically, the control plant is selected as that plant with the greatest water flowthrough. Next, the acre feet per hour axis of the input/output curve of each dependent plant is multiplied by its allocation ratio. A given number of points is selected upon the incremental water rate curve of the control plant, and its acre feet per megawatt hour axis is aligned with that axis of the artificial incremental water rate curve to be constructed for each of the dependent plants. The coordinates of the points on the acre feet per megawatt hour axis of the control plant curve axis are projected directly onto the aligned axis of each of the artificial incremental water rate curves for the dependent plants. The values of power upon the incremental water rate curve of the control plant are then projected onto the power axis of its input-/output curve to determine the values or coordinates of the corresponding points on its acre feet per hour axis. In turn, the values or coordinates of flow are then directly projected onto the acre feet per hour axis of each of the input/output curves of the dependent plants having been previously adjusted by their allocation ratios. The coordinates of the projected points are found upon the power axis of the dependent plant's input/output curves, whereby the corresponding coordinates of these points are found upon the power axis of each of the artificial incremental water rate curves of the dependent plants to thereby set both coordinates of the constructed points defining the dependent plant's incremental water rate curve. By constructing such artificial curves, water allocation for an entire river is readily accountable based upon the water allocation of the control plant.

In a further aspect of this invention, transit times which occur in rivers due to the time delay required for water to flow the control plant to each of the dependent plants are accounted for purpose of determining plant hydro generation. The power generations of hydro plants with transit time considerations are determined in an adjusted control hour corresponding to the real hour of the control plant. Subsequently, the power generations of the dependent plants adjusted for control hour are converted to powers generated in real time hours. As a result, the initial calculation of hydro power is simplified based upon the control hour of the control plant. Where transit times affect hydro generation, typically the control plant is selected as that plant at the head of a river.

BRIEF DESCRIPTION OF THE DRAWINGS

These and other objects and advantages of the present invention will become more apparent by referring to the following detailed description and accompanying drawings, in which:

FIGS. 1A to 1F are flow diagrams for routine FORECAST;

FIGS. 2A to 2I are flow diagrams for routine HYWRKLMS;

FIGS. 3A to 3D are flow diagrams for routine HEADCHEK

FIGS. 4A to 4K are flow diagrams for routine RVRINIT;

FIGS. 7A to 7D are flow diagrams for routine TRANTIME;

FIGS. 8A to 8D are flow diagrams for routine HYDTOTHM;

FIGS. 10A to 10G are flow diagrams for routine LAMCLOSE;

FIGS. 11A to 11E are flow diagrams for routine BREAKOUT;

FIGS. 12A to 12E are flow diagrams for routine TTADJUST;

FIGS. 13A to 13K are flow diagrams for routine PONDCHEK;

DESCRIPTION OF THE PREFERRED EMBODIMENT

Overview of Hydro-Thermal Coordination

Figure 15A:
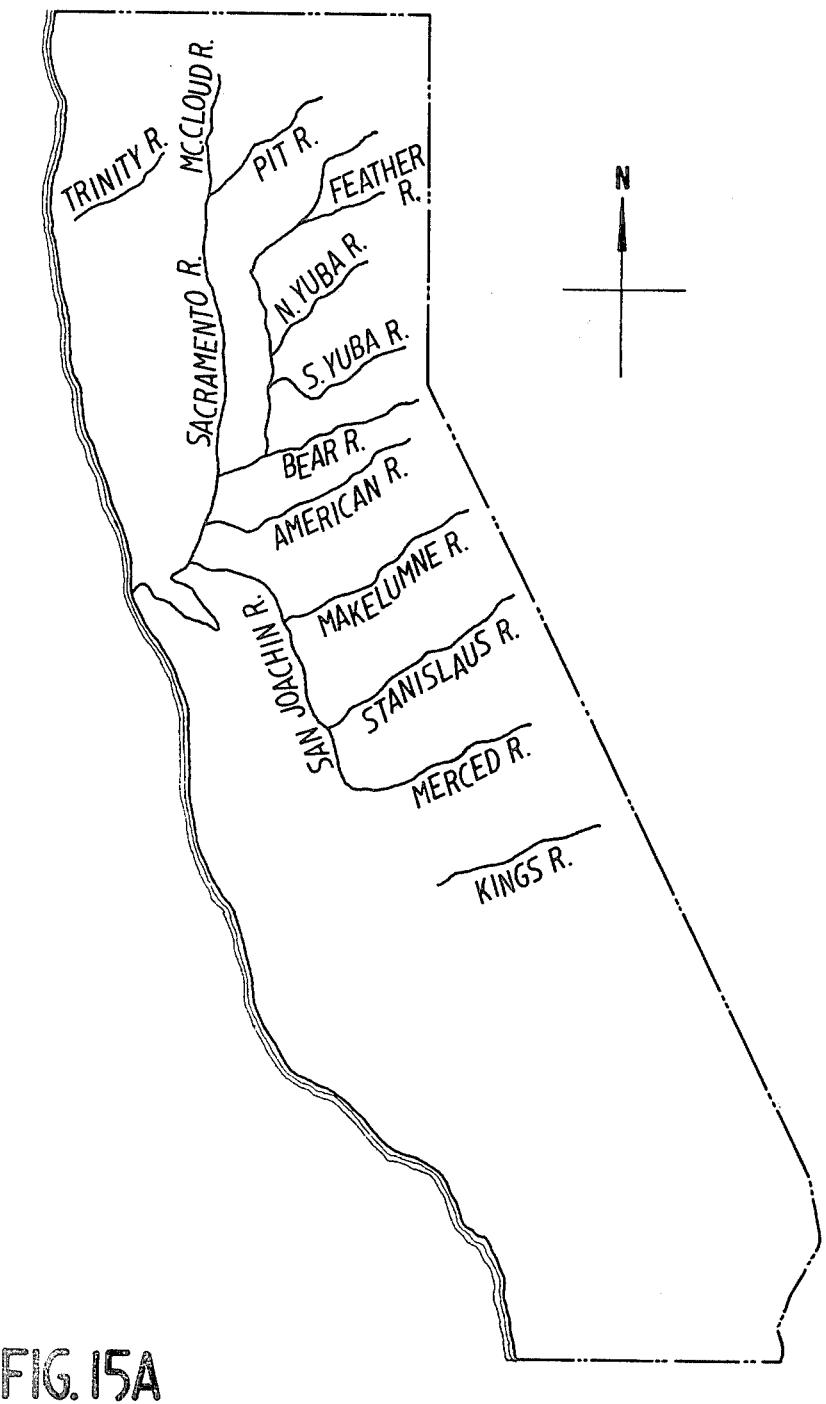
FIGS. 15A and B are, respectively, graphical representations of the rivers upon which the hydro plants of this system are placed, and of the distribution of the hydro plants upon a single river thereof.

In FIG. 15A, there is shown a power generating system employed to generate approximately 10,000 megawatts of electric power for a large part of northern and middle California. The power generating system includes 57 hydro-electric plants disposed over 16 river systems and 37 thermal units. In FIG. 15B, there is shown a schematic diagram of the distribution of hydro plants on the Pit and McCloud rivers. The combined power generating system is predominantly comprised of a large company system and also at least three smaller systems therein dependent for hydro-thermal scheduling and coordination upon the large company system. System ties are confined to 500 kv ties to two outside power generating systems. The method and system of this invention operates to establish water allocation for each of the hydro plants, and then to provide a schedule of power generation based on a forecast load schedule for both of the hydro plants and the thermal units of a system in a manner which minimizes the total dollar input to the system.

In order to realize any degree of optimization, hydro and thermal scheduling cannot be separately achieved, i.e., it is not desirable to preschedule hydro generation, then follow with a thermal scheduling for the remaining load. Assuming a unique relationship between system load and load center lambda, water closure for each individual river system can be achieved independently by dispatching each river, in relation to its control plant, over a period of time, typically 24 hours. Based on known lambdas, i.e., cost of power generation in terms of dollars per megawatt hour, computations are made for water usage, and iterations are made on gamma, an artificial indication of water in dollars per acre foot, until water closure is achieved. By repeating the above process for all river systems and subtracting the resulting hydro-power generation schedule from the system load forecast, the remaining thermal generation can be dispatched by a thermal-unit commitment procedure.

The iteration process is summarized as follows:

1. Assume that a schedule of 24 lambdas is known. In practice, lambdas obtained from a previous computer run can be used.

2. Coordinate each river system and multiply the control plant incremental cost curve by an initial gamma.

3. Perform a 24-hour lookup on each river system based on the schedule of lambdas. Perform water accounting.

4. Iterate gamma on each river system until water closure is achieved.

5. After water closure is obtained, calculate total power generation for each river system based on known gamma and lambda schedules.

6. Subtract total hydro-power generation schedule from total system load schedule to obtain required thermal-power generation, perform thermal-unit commitment on the remaining thermal-power generation, perform interchange negotiation and modify thermal generation as required.

7. Perform a hydro dispatch with the resulting set of lambdas and compare the resulting schedule of hydro generation with the originally assumed schedule.

8. If the results of hydro-generation comparisons are outside closure tolerances, repeat the entire cycle with a new hydro-generation approximation.

Figure 14A:
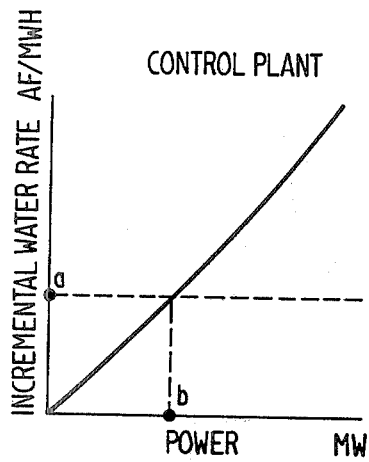
FIGS. 14A and B, and 14C and D are, respectively, the incremental water rate and flow curves for a control hydro plant and a dependent plant on a given river.
Figure 14C:
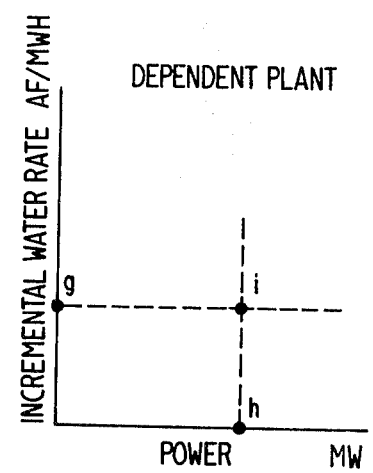

Since plants on the same river are hydraulically coupled, a functional relationship exists such that water available to one plant can be related to water available to another plant on the same river. This permits the mathematical manipulation of all plants on a given river by a single gamma. For the purpose of explaining hydro computations in accordance with this invention, gamma is understood to be an artificial cost of water in terms of dollars per acre foot. For example, each point on the acre feet per megawatt hour axis of the incremental water rate curve of a hydro plant is multiplied by gamma to yield an incremental cost curve having a cost per megawatt hour axis corresponding to values of lambda. For a given point on the control plant's incremental water rate curve as seen in FIG. 14A, there is a corresponding power output and a required water flow given in terms of acrefeet per hour (AF/H) upon the input/output curve of the control plant. A dependent plant uses a water flow having a calculatable relation to the flow of the control plant, and for a given water flowthrough for the control plant, the water flow and power of the dependent plant are determined. Working through the dependent plant's I/O curve as seen in FIG. 16D, then, an artificial water rate curve is constructed in terms of acre feet per megawatt hour by projecting a set of points from the incremental water rate curve of the control plant to define a corresponding series of points on an artificial incremental water rate curve for each of the dependent plants. More specifically, the acre feet per megawatt hour axis of the incremental water rate curve of the control plant is aligned with the corresponding axis of the incremental water rate curves of each of the dependent plants so that the coordinates of the set of points chosen upon the incremental water rate of the control plant define corresponding coordinates upon the acre feet per megawatt hour axis of the artificial curve of each of the dependent plants. Next, corresponding coordinates upon the input/output curve of the control plant are set corresponding to those values of power upon the control plant's incremental water rate curve. For each value of power, a corresponding value of flow upon the input/output curve of the control plant is defined. The flow axes of dependent plants' input/output curves are adjusted in accordance with their corresponding allocation ratios, i.e. the ratio of the water flow through the dependent plant to that flow through the control plant, whereby coordinates of water flow may be directly projected onto the flow axis of each of the dependent plant input/output curves. From the input/output curves of the dependent plant, a corresponding coordinate of power is attained and is projected upon the power axis of the incremental water rate curve of the corresponding dependent plant. In this manner, the coorindates for each point of the set are constructed upon the artificial incremental water rate curve of each dependent plant. As a result, the water allocation for each dependent plant is determined once the water flow for the control plant is set.

When the acre feet per megawatt hour axes of the incremental water rate curves of the plants are multiplied by gamma (as defined above), incremental cost curves with a cost per megawatt hour axis (corresponding to the units of lambda) are obtained. It is highly desirable that the incremental cost of producing power be the same throughout the river. In fact, it is a fundamental premise of hydro-thermal coordination that the incremental cost of producing power, i.e., lambda, be the same throughout the entire system.

From the foregoing, two variables have been described, gamma and lambda. The construction of the artificial water rate curves of the dependent plants is based upon a model of a river system wherein various points on the river are hydraulically coupled with each other. Such a model permits the calculation of water flow at the dependent plants based upon the water flowing through the control plant as indicated by the allocation ratios for the dependent plants. The model of the river system is based upon the finding that the allocation ratios for the dependent hydro plants are relatively constant for a given period of time, for example, 24 hours.

In an illustrative embodiment of this invention, the allocation ratios are calculated for each day's period, whereby gamma is calculated based solely upon the working curves of the control plant. A further implication of the river system model of this invention is that gamma is set for each river system for an assumed or calculated value of system lambda, i.e., a lambda applied to each hydro plant or thermal unit of the entire power generating system. Once a system lambda is assumed or calculated, that value of lambda is applied to the incremental cost curve of the control plant. The variable gamma is reiterated until the corresponding water flow as determined from the input/output curve matches the known value of water flowthrough of the control plant. By constructing the artificial incremental water rate curves for the dependent plants in a manner as described above, the value of gamma for the entire river is determined by a process of reiterating on gamma with regard to the working curves of only the control plant. Once water allocation for the control plant has been established, the water allocation for the remaining dependent plants on the river is likewise established. This corresponds to water convergence. The above principles form the basis for the system model of this invention which is appropriately implemented in an illustrative embodiment of this invention by a computer program.

By keying the calculation of gamma of water allocation to a control plant, a further advantage results in that river systems with transit time considerations are dispatched based upon calculations in terms of the control plant hours. In particular, the actual hour of power generation for those dependent plants with transit time consideration are adjusted by an amount corresponding to the transit time of water between the control plant and the affected dependent plant so that initially the hydro-power generation is calculated within an adjusted or control hour corresponding to the hour in which a quantity of water flows through the control plant. Thereafter, to determine hydro-power generation for real hours, an adjustment is made to set the dependent plant generations calculated for a control hour to their real hours.

Brief Description of Computer Implementation

To facilitate the description of the invention, the computer program which performs the computations required of the hydro-thermal coordination model is sectioned according to routines and subroutines which perform the Hydro Coordination functions. The computer program described below may be carried out upon a Prodac 250 computer. It is understood that state of the art procedures are followed in preparing data for entry into the computations, in controlling the execution of routines through operator input, and in presenting the results of computation in hard copy, visual display or on-line control. Specific reference is made to the above-identified pending application, U.S. Ser. No. 175,286 wherein at p. 37 et seq. and in Appendix II thereof, a program listing of an analogue input program module and executive-related disc-to-disc transfer programs adapted for the Prodac 250 computer are disclosed in detail. The Hydro Coordination functions, as discussed below under like headings, are carried out employing FORTRAN programming in phases of I. INITIALIZATION, II. HYDRO DISPATCH, III. TRANSITION, IV. CONVERGENCE and V. ADJUSTMENT.

I. INITIALIZATION routines are:
  A. FORECAST
  B. FLOWCALC
  C. HYWRKLMS
  D. HEADCHEK
  E. RVRINIT
  F. PREMAN II. DISPATCH routines are:
  A. RVRLOOP
  B. TRANTIME III. TRANSITION routines are:
  A. HYDTOTHM
  B. INTTOHYD IV. CONVERGENCE routine is LAMCLOSE V. ADJUSTMENT routines are:
  A. BREAKOUT
  B. TTADJUST
  C. PONDCHEK A primary function of initialization is to provide a forecast of the day's system load for each hour of the 24-hour period. Load curves from past history are selected by operator entry and scaled in accordance with a peak load scaling factor also indicated by operator entry. The load curve is then adjusted by parameters which will remain fixed for the day, and both system loads and power vectors are modified by a B-matrix manual schedule which is entered by the operator. Routine FORECAST performs the load curve construction which provides data to the main programs of the Hydro-Thermal Coordination. Routine FLOWCALC calculates total flow through the hyro plants in the coordination. Routine HYWRKLMS calculates the working limits for the hydro plants in the system. For those plants dependent on head of water, routine HEADCHEK is used to determine which set of curves is to be used based on an operator entered value for the water head. To implement a river dispatch, the incremental water rate curves of the dependent plants are constructed in routine RVRINIT from the incremental water rate curve and I/O curve of the control plant to key the entire river to the control plant. Routine PREMAN is employed to calculate the effect of manual schedules before the main coordination routines are entered.

The Hydro Dispatch function of the Hydro-Thermal Coordination program consists of routines RVRLOOP and TRANTIME. The Hydro Dispatch is accomplished by reiterating upon the variable gamma with respect to working curves for the system lambda; for each hour, the water usage is calculated and the total water usage is then compared with the allocated flow. If the two match, the river has been dispatched, and if not, a new gamma approximation is calculated and the process is repeated. Once a river has converged, individual hydro plant powers are calculated. When all rivers have been correctly dispatched, hourly output and spinning reserve totals for those rivers constrained by transit times are adjusted in line with the transit time normalization process. Routine TRANTIME handles the distribution of plant outputs for those rivers which are constrained by transit times.

When the Hydro-Thermal Coordination program must move from one discrete portion of computation to another, a transition period is sometimes required. Routine HYDTOTHM performs all the necessary initializations after the Hydro Dispatch has converged and produces parameters which are dependent upon the dynamics of the power generation complex. To perform required initializations when passing between interchange and hydro loops, routine INTTOHYD is used to map new penalty factors, computed in the thermal-interchange loop, into the hydro arrays on a river basis.

The results of Hydro Dispatches are checked for convergence each hour using routine LAMCLOSE. If in any hour convergence fails, new approximations of total hydro-power generation are calculated using the binary search method, and the computations of routine LAMCLOSE are again repeated.

Once the Hydro-Thermal Dispatch has converged, certain adjustments are necessary to adjust individual plant outputs in accordance with transit times, compile a "post-schedule" for plants affected by transit times, compute the individual plant powers for the parallel plants, and calculate and limit check volumes of designated ponds. Routines BREAKOUT, TTADJUST and PONDCHEK, respectively, accomplish the adjustments for plant outputs.

When applying the Hydro-Thermal Coordination program, certain constraints must be applied to the system model. The constraints are as follows:

1. Manual Schedules

Initialization of parameters for the hydro model will include a survey of hydro manual schedules on each river so that a minimum water flow is established in each manually scheduled hour and for the day. The dispatch of water on the river will then be constrained by these minimum requirements.

2. Transit Times

Certain rivers must be handled in terms of hydraulic delays commonly referred to as transit times. Dispatching on these rivers will be normalized on the basis of the control plant, to be accounted for after water convergence.

3. Pondage

On certain rivers temporary water storage is provided by forebays and afterbays associated with plants along the river. In some cases, minimum and maximum water levels in these bays are contractually or operationally required. The model monitors and alarms the water levels of all pertinent ponds.

4. Variable Head Plants

The operating characteristics of certain hydro plants are dependent upon the head of its water source. Each variable head plant has a family of curves, each of which is associated with a given range of head. For these cases, the model selects the set of operating curves which is associated with the current head.

5. Parallel Plants

Parallel plants are defined as plants which share a common penstock. Formerly, the allocation of water between two such plants was based upon empirical observation of the plants. Composite curves are used representing the power generated by the parallel plant pair; thereafter, the power of each of the plant pairs is established.

6. Plant Outages

The outages of hydro plants are handled by adjusting the limits in the particular hours for which the plant is affected. However, water will still be allowed to flow around the plant in order to meet the requirements downriver. Thus, outages are a method of handling partial or complete loss of plant capacity Once the Hydro-Thermal Coordination program has converged, the derived hydro plant incremental water rate curves are stored so the operator can transfer these curves on-line when the period for which the program was run begins.

Figure 16:
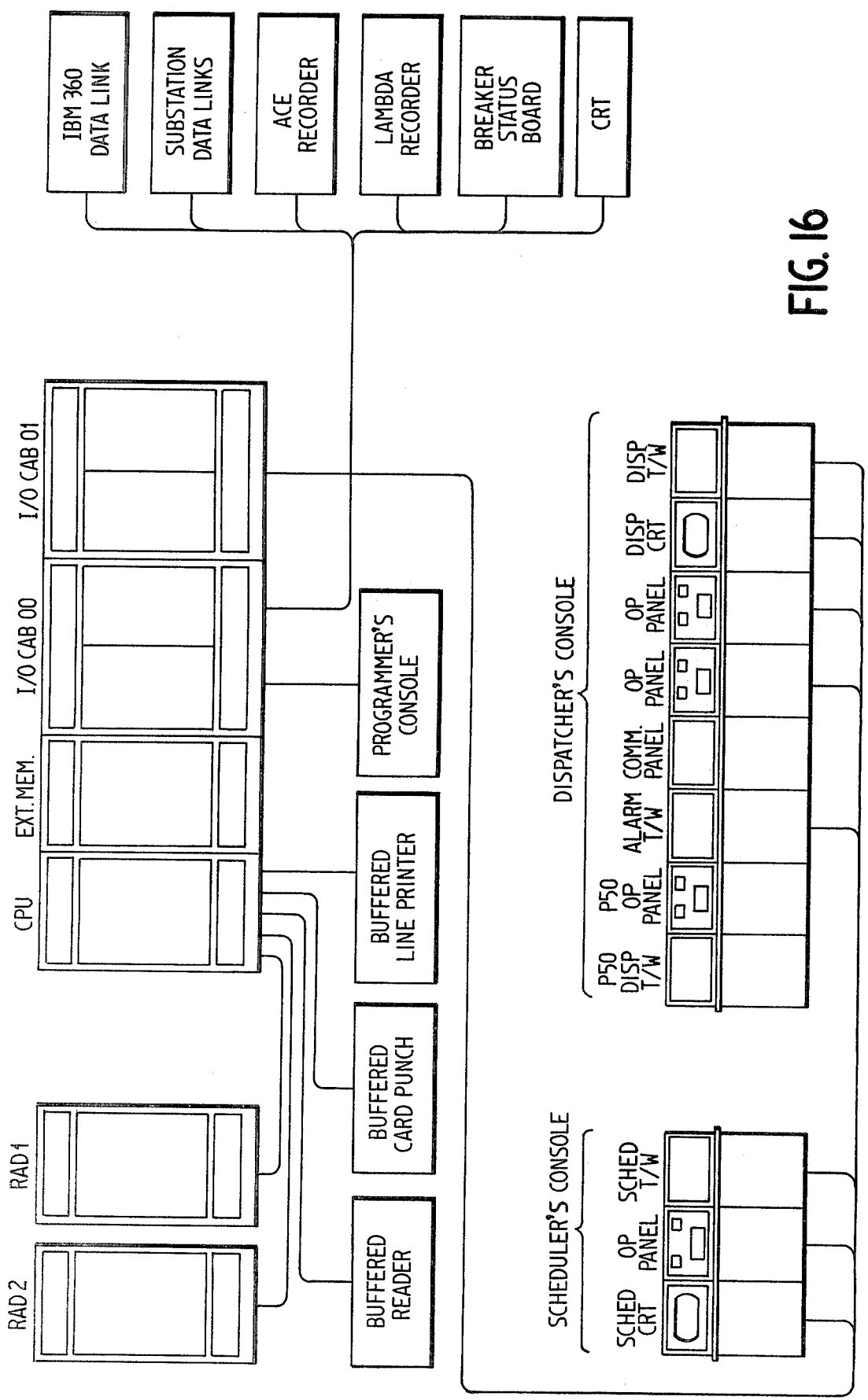
FIG. 16 is a view of the organization of the control equipment for the power generating system of this invention.

In FIG. 16, there is shown a layout of the equipment used to control the subject power generating system including both hydro plants and thermal units. In general, data entry and program control for the Hydro-Thermal Coordination program of this invention are performed through the scheduler's console control panel as shown in FIG. 16. As will be discussed below, the operator will periodically enter through the scheduler's console data indicative, for example, of the water head levels for designated hydro plants, the initial water levels for reservoirs or ponds, the 24 schedule of water releases for designated river systems, and the inflow and outflow on a river with respect to a particular hydro plant. Also shown in FIG. 16 is a dispatcher's console for providing a link between the operator and the computer whereby input to the computer is accomplished through push button initiated interrupts and digital inputs; output from the computer is accomplished through digital output control of lamps, typewriters, CRT and digital displays, line printers and audible alarms.

I. INITIALIZATION

Before the actual dispatch portion of the Hydro-Thermal Coordination program may be run, certain parameters must be initialized. A primary function of initialization is to provide a forecast of the day's system load for each hour of the 24-hour period. Load curves from past history are selected by operator entry in accordance with a selected curve number CURVENUM and scaled in accordance with a peak load scaling factor PEAKFACT made by operator entry to scale up or down previously collected data to the desired or anticipated peak load for that day. The load curve is then adjusted by parameters which will remain fixed for the day, and both system loads and power vectors are modified by manual schedules which are entered by the operator. The load FORECAST routine derives the gross system load profile over a 24-hour period. A net load curve, which is dispatchable by the Hydro-Thermal program, is constructed by subtracting from the gross load those fixed manual generation schedules which cannot be altered by the program. These manual schedules which are used to adjust the gross load curve are normal constraints which have to be met over and above the economic considerations of the program. For example, water agreements which are contractually agreed to by utilities may dictate the scheduling of a hydro plant at full load all day in order to satisfy the amount of water usage.

IA. FORECAST

Referring to FIG. 1A, routine FORECAST is executed by reading the disc as indicated in block 200 for files BUFFER, WEEKSLDS, MISCGENH, MISCGENT and MANPOWER. File WEEKSLDS contains the past week's load curves, file MISCGENH contains hourly data values of miscellaneous hydro-generating units outside the province of the Hydro-Thermal Coordination program entered by the operator through a console, and file MANPOWER contains 24 values reflecting the manual schedules for plants. File BUFFER is a dummy area to allow disc reads to be entered into one area from multiple accessing points.

The on-line operating system supports the Hydro-Thermal Coordination program by accumulating and storing seven days of past history in load curves. Thus, the operator has the choice of selecting for his load curve of the Hydro-Thermal program any one of the curves from the previous peak. Traditionally, the shape of utility system load curves are dependent on season, day of the week, i.e., working day or holiday or weekend, and temperature. The operator uses his judgment as to both forecasting estimates for tomorrow or for the day of the program run to select which of the previous seven day's curves will best fit the power generation requirements for the day. Once selected, the shape of the load curve is fixed and can only be adjusted up or down by operator entry of PEAKFACT, which is a scaling factor to the selected curve. The FORECAST routine uses temporary locations XTEMP and YTEMP to compute a scaling RATIO for adjusting the load curve up or down. After this RATIO is computed, the FORECAST routine multiplies each one of the 24-hour load values by this RATIO to derive the gross system load curve to be used for the program.

In block 202, a variable curve number CURVENUM is made equivalent to the entry in file BUFFER subscripted 179, and a variable peakload scaling factor PEAKFACT is made equivalent to the entry in file BUFFER subscripted 180; further, variable XTEMP is made equal to the value of WEEKSLDS itself subscripted at 25, the hour of the peakload, and CURVENUM, and to the value of CURVENUN. In this manner, a particular load curve is selected. Next, as indicated in block 204, a variable YTEMP is made equal to the value of PEAKFACT corresponding to the operator entry of the peakload scaling, and a value is then formed for variable RATIO by dividing YTEMP by XTEMP. A loop is then entered which adjusts each hourly value of the load curve to the product of the curve value found at WEEKSLDS (I, CURVENUM) and of RATIO where I equals the given hour. In block 206, the variable SYSLOADS indicative of an initial value of net system dispatchable load subscripted for the given hour is then made equal to the value of YTEMP plus a constant equal to 0.5.

Next, in block 206 the disc is read for file PF, penalty factor, and file for loads not schedulable by the Hydro-Thermal Coordination program MATXSHED, both subscripted for the given hour. Referring now to FIG. 1B, employing IJ as an index, step 2A is entered where values of the variable PP subscripted on IJ are all made equal to zero from IJ equals one to sixty-nine. When variable IK is then made equal to 127, then variable MATXPWR as indicated in block 208 is made equal to MATXSHED subscripted on IK, variable MGOTOMP as indicated in block 210 is made equal to GOTOTABL subscripted on IK, and variable INDXTEMP as indicated in block 212 is made equal to INDXTABL subscripted on IK, MGOTOMP defines the algebraic conventions for adding manually scheduled powers to the power vectors to the net systems loads and to the HYDRBASE value, as appropriate. Variable GOTOTABL is assigned 24 data values. In step 2B as shown in FIG. 1C, the algebraic conventions given to MGOTOMP are tested in block 214, and one of six branches is taken. Note that the above steps implement a particular computation, to follow, which depends on the given hour and on the assigned data value corresponding to the given hour. For MGOTOMP equal to one, step 10 is entered where the power vector array PP, subscripted on INDXTEMP, is made equal as indicated in block 216 to the value of MATXPWR, corresponding to the load scheduled for the given hour. Entering step 11, the value of SYSLOADS for the given hour is reduced by subtracting in block 218 the value of MATXPWR, and step 3 is entered. As shown in FIG. 1F, if the value of MGOTOMP is equal to two, step 3 is entered directly into block 220 such that no change is made to SYSLOAD for the given hour. For the given hour, the load curve just equals available plant output. With regard to FIG. 1D, for MGOTOMP equal to three, step 30 is entered in block 222, where the variable indicative of the non-dispatchable hydropower generation HYDRBASE subscripted on both INDEXTEMP and I is made equal to the value of MATXPWR as indicated in block 224, and step 11 is entered. As shown in FIG. 1E, for MGOTOMP equal to four, step 40 is entered where the value of PP subscripted on INDXTEMP is made equal to the negative value of MATXPWR as indicated in block 226. In block 228, the value of MATXPWR is tested to be greater or equal to zero, and if so, step 3 is entered. If false, the value of SYSLOADS for the given hour is changed as indicated in block 230 by the addition of the value of MATXPWR and then step 3 is entered. Due to the negative value of MATXPWR in the above procedure, the value of SYSLOADS is actually reduced. In step 3 as shown in FIG. 1B, index IK is incremented by one and tested to be greater than the value of MANTOP which corresponds to the maximum number of manual schedules to be made. If false, the loop of the step including block 208 is again entered, and if true, step 2C is entered. In step 2C, the value of SYSLOADS for the given hour is changed by subtracting the values of MISCGENH, MISCGENT and MANPOWER for the given hour. The files of SYSLOADS and HYDRBASE are then written to the disc, and control is returned to a calling routine.

In summary, the purpose of the logic in block 214 in conjunction with the blocks shown in FIGS. 1C, 1D and 1E is to establish sign conventions, i.e., to add or to subtract values, to properly modify the variables PP (INDXTEMP), SYSLOADS (I) and HYDRBASE to reflect the nature of the components by classifying them as loads or generation and by properly defining boundary conditions between the power system under control and those systems within the aforedefined system in that they are interconnected for power exchange, but not under the system's control. The value of SYSLOAD calculated in block 220 is the net dispatchable system load for the given hour. Thus, the purpose of the routine FORECAST is to compensate or to eliminate all non-dispatchable loads to determine the resultant SYSLOAD as in block 220 as the power generation or load to be dispatched by the subject control system.

IB. FLOWCALC

Having completed the computation of the load curve for a 24-hour period, routine FLOWCALC is run to calculate a total of water flowthrough for each hydro plant in the coordination. For each plant, there is an equation which calculates its water allocation according to:

$$F_1 = F_{i-1} + I_i - O_i$$

where $F_{i-1}$ = water flowthrough of the immediate upriver plant;

$I_i$ = water inflow for plant that does not emanate from plant above on river system;

$O_i$ = water outflow for plant is that water flowing out of previous plant but which flows around the subject plant.

Plant inflows and outflows are also entered from the schedule's console and into the water allocation equation as illustrated in the following FORTRAN coding steps:

```
FLOTHRU(51) = RVRALLOC(3) + SALLOC (2,79)
              − SALLOC (3,79) and
FLOTHRU(52) = FLOTHRU(51) + SALLOC (2,80)
              − SALLOC (3,80)
``` where an array of the water volumes to be released into each river for the 24-hour period RVRALLOC(3) is read from the disc file RVRAALOC, and SALLOC (2,79), for example, was read from the disc file SALLOC. Note that by the magnitude of the subscript for FLOTHRU, flowthrough values from previous calculations, from upriver plants, are used in the equations for downriver plants. File SALLOC contains operator entered data for each hydro plant defining water inflow and outflow to each plant in the hydro system. SALLOC is defined as either the water inflow for the plant under consideration that does not emanate from the plant above but from another source, or water outflow corresponding to that water volume derived from the previous plant but directed about the plant under consideration. File SALLOC is either water input or output as defined above, dependent upon its first subscript. The values of SALLOC and RVRALLOC are entered daily by the operator upon his console for each river dependent upon the current availability of water. Calculations are carried out sequentially with the first river being calculated first and subsequent rivers in order to provide values of FLOTHRU for each plant on a river. When calculations are completed for each plant on a river, file FLOTHRU is written to the disc and control is returned to the calling routine.

IC. HYWRKLMS

When the fixed system parameters have been constructed, the fixed plant parameters are determined for each of the hydro plants by calculating working limits for each hour, recognizing and handling manual schedules and making preliminary preparations for handling transit time rivers. The calculations of working high and low limits of power generation for each plant in every hour as stored in array WRKLIMHY are determined from three values: normal high limit as stored in file HHILIMIT, normal low limit as stored in file HLOLIMIT and the difference between plant capability as stored in file CAPABILY and scheduled outage as stored in file OUTAGES. The lowest of these values is the working low limit. The working high limit is the lower of the normal high limit and the capability less outage. Neither limit is permitted to assume a value less than zero. The capability of a generating plant is that limit inherent in the plant above which the plant cannot generate power and is preset into the program. The normal high and normal low limits are those limits entered by the operator which reflect the range in which the unit is to be normally operated. Scheduled outages are reductions in the capability of a power generating unit based upon physical and operating constraints, such as for example, limiting water release in a hydro plant, or vibration due to the usage of the power generating plant. The normal high and low limits do not normally change from day to day, and the value of capability is fixed for each plant. The values of outages often change from day to day and are operator entered.

Routine HYWRKLMS adjusts the working limits in those rivers which are subject to transit time constraints by normalizing the limits to the hour in which their flows will originate to prevent complicating logic and time-consuming execution in the actual dispatch. On those rivers for which transit times must be considered, plants with delays will have their limits shifted in accordance with the amount of delay. Thus, a plant with a one-hour delay should have its outage entered for the proper hour, except that outage intended for the last hour should be entered in hour 1. Limits will not apply for hour 1 because a manual schedule has been determined in the previous day's run. As the working limits are calculated for each plant and hour, they are checked for complete outage. If a plant is found to be completely outaged in all hours, its flow of water for the day is set to zero.

Figure 2H:
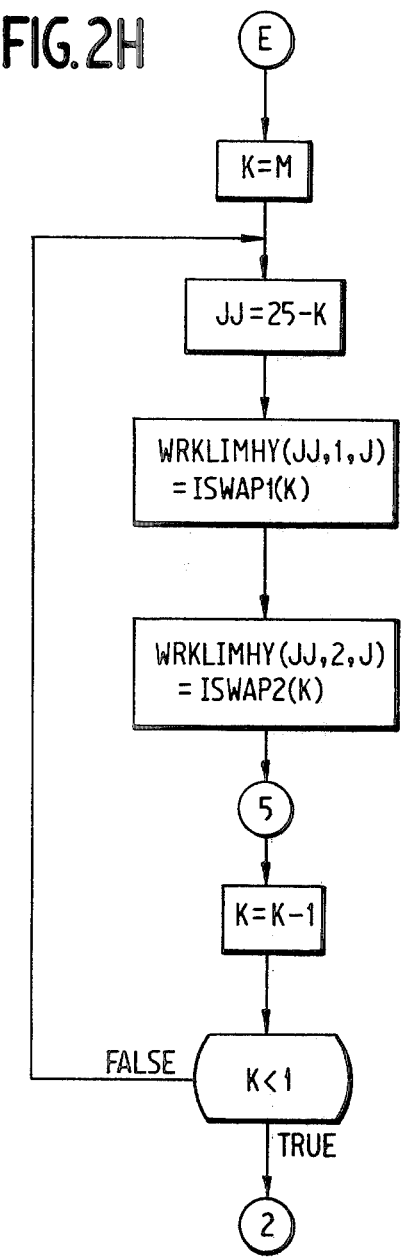
Figure 2I:
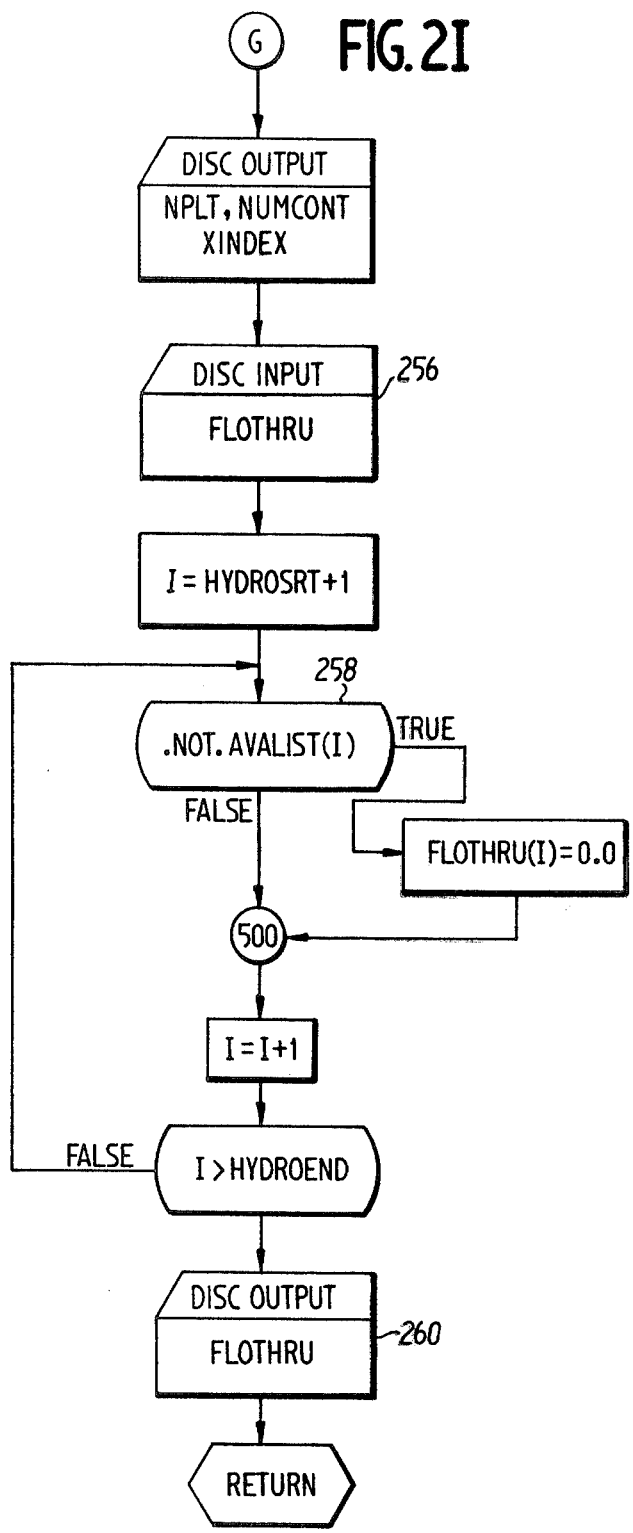

Referring to FIG. 2A, routine HYWRKLMS is executed by first reading the disc for files HHILIMIT, HLOLIMIT and CAPABILY. A loop including block 246 is entered as indicated in block 240 to calculate values for each hour of 24 hours, and contained within this loop is another loop including block 248 for each river. Disc file HOUTAGE is read for each hour as indicated in block 242 and disc file WRKLIMHY is read for each river as indicated in block 244. Continuing through step A as seen in FIGS. 2B, C and D, values of CAPABILY, HHILIMIT and HLOLIMIT are tested for maximum and minimum, and the proper high limit is selected. For each plant having a value of the working limits WRKLIMHY greater than zero, variable AVALIST for the given plant is made TRUE in block 250, indicating that a given plant is available for operation. When all shifts are completed, file WRKLIMHY for a given river is written to the disc, see FIG. 2E, step B. As seen in FIG. 2A, step 401 is then entered and calculations are made for the next hour for each of the rivers. Step C is then entered as seen in FIG. 2F to calculate limits for rivers having transit times. Disc file WRKLIMHY, subscripted on the given transit river, is read into block 252, and each plant is tested for a transit time delay as indicated by an array indicating those plants with transit time considerations RELTIMES in block 254. RELTIMES has one entry for each hydro plant in the program and is used to designate if this plant should have its working high and low limits adjusted for transit time considerations. If the plant's entry in the RELTIMES array is equal to zero, no adjustment is necessary for transit times. If the plant's entry in the RELTIMES array is not equal to zero, the entry reflects the number of hours of transit time adjustment this plant needs from the top of the river. Transit time resolution in this program is on an hourly basis. Transit time delay is that time required for water released in the upper plant on the river to reach the plant under consideration. When a delay is required, step D is entered as seen in FIG. 2G, and the value of WRKLIMHY is shifted according to the hourly delay for each of 24 hours. Having tested all rivers and all transit time plants and having written file WRKLIMHY to disc, step G is entered, FIG. 2I, and file FLOTHRU is read from disc in block 256. For each plant, availability is tested in block 258 in variable AVALIST, and if FALSE, the value of FLOTHRU for the given plant is made equal to zero. When all plant availabilities have been tested, file FLOTHRU is written in block 260 to the disc, and control is returned to the calling routine.

ID. HEADCHEK

The output and efficiency of some hydro plants are significantly dependent on head of water. For such hydro plants, more than one set of generation curves exists, and a head checking routine HEADCHEK is used to determine which of a set of incremental water rate and input/output curves previously entered is to be used, based on an operator entered value indicative of the head of water. The routine makes decisions on the values of head delimiters which define the range of input head values for which a given set of curves applies. When the proper set of curves has been selected for a plant, the corresponding curve values are stored in the working input/output and incremental water rate curve file. In addition, due to the unique handling of parallel flow plants, those parallel plants with variable head curves are handled separately but in the same manner as shown in FIGS. 3D and C to derive composite curves COMPCURV for parallel plants to be used in subsequent routines.

With respect to FIG. 3A, routine HEADCHEK is executed by first reading file HEAD into block 280 from the disc which gives the actual heads for the hydro plants as entered by an operator on his console. Step 10 is entered wherein tests and calculations will be made for each variable head plant. Following in step 10, the disc is read into block 282 for file VARCURV, which contains all of possible incremental water rate and input/output curves for the variable head plants. The actual head value for the given plant, which is input by the operator, is used to select the proper curve, whereupon the file of the selected water rate curve WTRTCURV as determined by block 283 is read as shown in FIG. 3B from the disc in block 284, the data of the file corresponding to the base set of incremental water rate curves. The values to be stored in the incremental water rate curve file WTRTCURV for the given plant are then made equal to the values of the selected curve from file VARCURV in blocks 286 and 288, and file WTRTCURV is then written to the disc as indicated in block 290. Next, the file for the selected input/output curves PIOC is read from the disc as indicated in block 292. The values of PIOC for the given plant are then made equal as indicated in blocks 294 and 296 to the values of the selected curve from file VARCURV dependent on water head. Upon completion of the insertion of new data in the WTRTCURV AND PIOC curves, control is returned to the calling routine.

IE. RVRINIT

All plants on the same river are dispatched in relation to a control plant. The control plant is that plant which has the greatest water flow (FLOTHRU) for the day, except on transit time rivers where the control plant is that which lies at the head of the river. Values of flow FLOTHRU were determined previously in the FLOWCALC routine. To reduce the number of variables, working curves are constructed in routine RVRINIT from plant incremental water rate curves and input/output curves to key the entire river to a control plant whereby artificial incremental water rate curves are constructed for all other, dependent plants on the river and water allotment for the entire river is calculated based solely on the curves of the control plant.

Figure 14B:
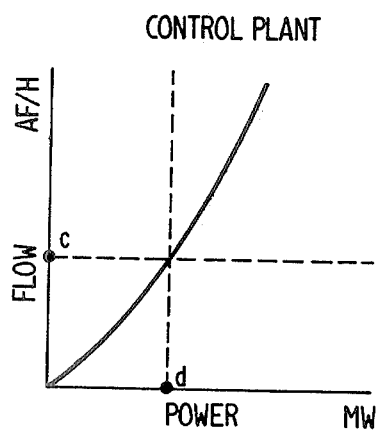
Figure 14D:
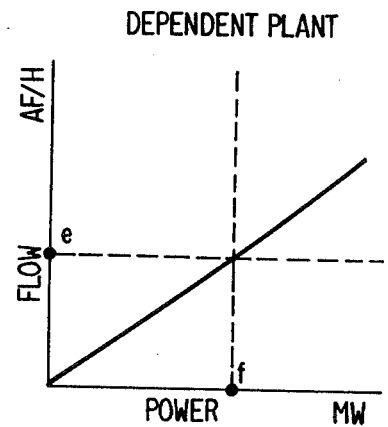

Normally, the control plant will be that plant with the greatest flow FLOTHRU and a process of constructing the artificial incremental water rate curve for each of the dependent plants is initiated by determining that plant with the greatest FLOTHRU. Next, the allocation ratios as stored in file ALLRATIO for each dependent plant are calculated as the ratio of the dependent plant's water flow to that of the control plant, and the incremental water rate and input/output curves of the control plant are designated as those curves from which an artificial, incremental water rate curve will be constructed for each of the dependent plants. As shown in FIGS. 14A and C, the incremental water rate curve has an ordinate in terms of acre feet per megawatt hour and a power abscissa in units of megawatts, while the input/output curves as shown in FIGS. 14B and D have a water flow ordinate in terms of acre feet of water per hour and a power abscissa in units of megawatts. Illustratively, the artificial incremental water rate of the dependent plant is calculated based upon five points corresponding to a minimum and a maximum point determined by the range of available water flow through the control plant and three intermediate points disposed therebetween. To illustrate the process, a point "a" is selected upon the ordinate of the incremental water rate curve of the control plant as shown in FIG. 14A. Point "a" not only determines the corresponding power to be entered upon the abscissas of the incremental water rate and input/output curves of the control plant as points "b" and "d", but also determines the corresponding value upon the ordinate of the incremental water rate curve for the dependent plant as indicated by the letter "g". The ordinate of the incremental water rate curve of the control plant and the dependent plants have a 1:1 correspondence with each other, and in this context, are aligned with each other so that point "g" upon the ordinate of the incremental water rate curve of the dependent plant is determined by drawing a straight line as indicated in FIG. 14A and C from point "a" to point "g". Next, a corresponding point on the water flow ordinate of the input/output curve of the control plant is determined as point "c" and is projected along a straight line to determine point "e" upon the water flow ordinate of the input/output curve of the dependent plant. The input/output curve of the dependent plant is the actual curve dependent upon the inherent properties of the dependent plant, as opposed to an artificially constructed curve. The allocation water ratio ALLRATIO is used to multiply the units of the ordinate of the input/output curve of the dependent plant so that the point "c" may be projected directly from the input/output curve of the control plant to designate a corresponding point "e" upon the water flow ordinate of the input/output curve of the dependent plant.

The ability to use ALLRATIO in this manner is dependent upon a model of a river system in which a given amount of water as stored in file RVRALLOC is released at the head of the river and other input and outputs to the given river are accountable in order to determine accurately the water flowthrough of each plant. Significantly, the model of the river system is based upon the concept that the water released at the head of the river travels down the entire river and that water flowthrough of each plant is determined based upon the original amount of water released modified successively for each plant by the water input from other sources and the water outflow from the river above the given plant. Having determined point "e" upon the ordinate of the input/output curve of the dependent plant, a corresponding point "f" is determined upon its abscissa to be projected to determine point "h" upon the power abscissa of the artificial incremental water rate curve. In this manner, one point of the five points is determined on the artificial curve. In a similar manner, the other four points are projected to construct the incremental water rate curve of the dependent plant. The artificial incremental water rate curves of the other dependent plants are calculated in a similar manner. As will be explained later in detail, the calculations to determine the water allotment for the entire river are based upon calculations involving only the incremental water rate and I/O curves of the control plant, to assure that the water requirements of each of the dependent plants and the control plant are met at the same time.

Referring to FIG. 4A, routine RVRINIT is executed by first reading as indicated in block 320 the disc for files DUMMY, EFFDEV, INTFXGAM, FLOTHRU and NPLT. DUMMY is defined as a buffer to read from core values of GAMMA, FIXGAMMA, GAMMAHI and GAMMALO. GAMMA is an array of the FIXGAMMA entered by the operator on his console. FIXGAMMA is a flag indicating those rivers for which a fixed gamma has been set by the operator. Further, the file INTFXGAM brings in the following data: FXGAMARUN, GAMMARUN. NPLT indicates the number of hydro plants in each river system. The file NPLT includes NUMCONT indicating the control plant of each river and file XINDEX indicating a cross index between operator entrys and program storage. EFFDEV is an efficiency deviation factor, which is applied to the incremental water rate curve of a hydro plant to account for deviations in the power generating efficiency of the hydro plant caused by physical factors in the plant, for example, physical wear on the turbine for a hydro plant. This factor is entered by the operator through the console.

A loop is entered at step 1 to iterate for each river up to the number of rivers NORVRS. In the loop, the files of the plant I/O curves PIOC and the incremental water rate curves WTRTCURV are read from the disc as indicated in block 322, and a search is made as indicated in block 324 for the plant with the highest river flowthrough FLOTHRU. Entering step A as seen in FIG. 4B, variable X is made equal to the value of FLOTHRU subscripted for one of the rivers. The value of X is tested in block 326 to be less than or equal to zero corresponding to a plant with a flow set to zero, and if so, step 2 is entered again to test the next plant. Next, a test is conducted in block 328 to determine which plant has a flow value greater than zero, but less than the maximum flow found in previous iterations of the loop of step 2; if true, step 2 is again entered. For a flow value greater than a previous value, a temporary storage location for flowthrough TEMPFLOW is now made equal to X and the number of the corresponding plant with higher river flowthrough is stored in variable KCONT as indicated in block 330. Having tested all plants, step 2 is completed, and the hydro plant with the highest flowthrough is identified thereby.

As shown in FIG. 4F, a test is made in block 332 for whether a plant's curve has been constructed as indicated by flag CURVESET; if so, step 21 is entered. Initially, flag CURVESET is set false as indicated in block 324. If false as initially set, a test is made in block 334 on the value of the TEMPFLOW equal to zero indicating that there is no water allotted to the river, and if so, step 107 is entered where as seen in FIG. 4I, flag FXGMARUN subscripted on the given river is made a logical true, and step 1 is entered again to iterate on the next river. If not zero, a flag CONTROL is made TRUE as indicated in block 336, indicating a given river will be dispatched and its control plant is found. Next, a flag FIXCNTRL, subscripted for the given river, is tested in block 238 to determine whether the river is a transit time river. If tested TRUE, the control plant is fixed as the plant at the head of the river corresponding to the value of NUMCONT indicated in block 240. Step F is then entered, as shown in FIG. 4J where tests are made in block 342 on whether the plant with the greatest flowthrough is the same as the control plant and whether the control plant has a flowthrough value greater than zero as indicated in block 344. If the test is TRUE in either case, step 501 is entered as indicated in block 346 where the number of the control plant KCONT is made equal to the number of the plant found to have the greatest flow so that in either case, the working curves are constructed based on the plant (whether the control plant or not) with the greatest flowthrough. As seen in FIG. 4G, step 3 is entered and the incremental water rate curve for each dependent plant on the river is constructed from its own input/output curve and the incremental water rate and input/output curves of the plant with the greatest flowthrough. With regard to FIG. 4G, selected points on the incremental water rate curve as stored in file WTRTCURV and the input/output curve as stored in file PIOC of the plant with the greatest flowthrough are entered into the file WORKGRPH for receiving the working curves of the plant. In block 350, the power axes of the aforementioned curves are multiplied by an efficiency factor EFFDEV. As tested in block 352, if more plants are to be tested, step 104 is entered to construct the curves for other plants on the river using the aforementioned curves of the plant with the greatest flowthrough; if there is only a single plant on a river, step 21 is entered.

In step 21 as shown in FIG. 4K, flag FIXGAMMA is tested in block 354 to determine whether the given river is to be entered by the operator under a fixed gamma, and the flag FXGAMARUN is set to the same state as FIXGAMMA. If FIXGAMMA is true, then GAMMARUN is set equal to that value of GAMMA as entered by the operator. GAMMARUN is that file for storing the current value of gamma to which a river has been dispatched. A loop is entered in which the working curves for the river are multiplied by GAMMARUN as indicated in block 358 for each of the five points on the curve. Step 9 is entered where the working curves are selected and then written to the disc in file WORKGRPH as indicated in block 360. Step 1 is entered again to iterate on the number of rivers, and when all rivers have been tested and the working curves computed, files as defined previously by INTFXGAM, NPLT and FLOTHRU are written to the disc as indicated in block 362. Control is then returned to the calling routine.

In step F as seen in FIG. 4J, if the flowthrough of the fixed control plant is tested to be zero, step 502 is entered where the working curves of the fixed control plant tested are made equal as indicated in block 364 to the curves of the plant with the greatest flowthrough. Step 600 as seen in FIG. 4F is entered to iterate again in step 3 to provide the curves of the plant with the greatest flowthrough.

Returning to FIG. 4B and step A, when the test for CONTROL is true as determined in block 366, step B is entered where the number of the plant with the greatest flowthrough is tested in block 368 to be equal to the number of the plant under test. If false, step C is entered and the allocation ratio ALLRATIO for the plant is calculated as the quotient of the flow through the plant divided by the flowthrough of the plant with the greatest flowthrough, as indicated in block 372. At step 5, a loop is entered to calculate each of the five points on the curve, beginning by calculating the flow of water through the plant at the point KSEEK by multiplying the flowthrough of the plant with the greatest flowthrough at that point by the allocation ratio ALLRATIO as indicated at block 373. The calculated flow is limit checked by comparing it against the maximum and minimum points on the plant's input/output curve as multiplied by the efficiency factor EFFDEV. Upon entering point D, the value PRAC is set equal to the amount of water which will flow if the plant is operated at this point. A loop is then entered to determine the plants megawatt output for this amount of water flow. The plant input/output curve is searched until the value of water as stored in file PRAC has been bracketed, as performed by blocks 382, 384 and 386. Once the value of water flow has been bracketed, the value of the power output for the plant can be calculated and this point on the working curve can be constructed as indicated in blocks 388 and 390. Then at point 5, the routine will return to calculate the remaining points on the working curve of the five points. Once all five working points on the curve have been calculated, the flag CURVESET is set true as indicated in block 370 and step 2 is entered again to reiterate on the next plant.

IF. PREMAN

The presence of a manual schedule indicates that the operator wishes to fix power generation of a given plant. The presence of transit times, parallel flow plants and the coordination of plants on the same river makes handling the manual schedules for hydro plants greatly different from that of thermal units. For a river, any manual schedule for a given plant on the river in a given hour dictates the complete schedule of power generation of other hydro plants on the river. If more than one plant on a river is manually scheduled, the schedule which results in the greatest flowthrough for the control plant is chosen to schedule the remaining plants. The outputs calculated for the non-manual plants are subject to the boundaries of the working limits.

In those hours where manual schedules are required, the operating point for the river for that hour is found from the manual schedule; then the water necessary to meet the operating point is calculated from the control plant's input/output curve. The hourly values of water required are summed to give a base value for the day. The base value represents the amount of water needed to produce the manual schedules. For transit time plants, the manual schedules are normalized back to their control hour, with the first hours corresponding to transit delays pre-scheduled from the previous day's run. The first hours are input by operator entry.

In the calculation of manual schedules, special handling is required for tandem plants, i.e., those plants connected in parallel. If one of the plants is manually scheduled, the other of the plants is also manually scheduled and the composite output of the tandem must be determined before water usage is calculated. A special composite curve as stored in file COMPCURV makes it possible to calculate the composite output from a lookup of one plant's output. If neither plant is scheduled, the working curves are designed to function in terms of the complex.

Figures 5P, 5Q, 5R, 5S:
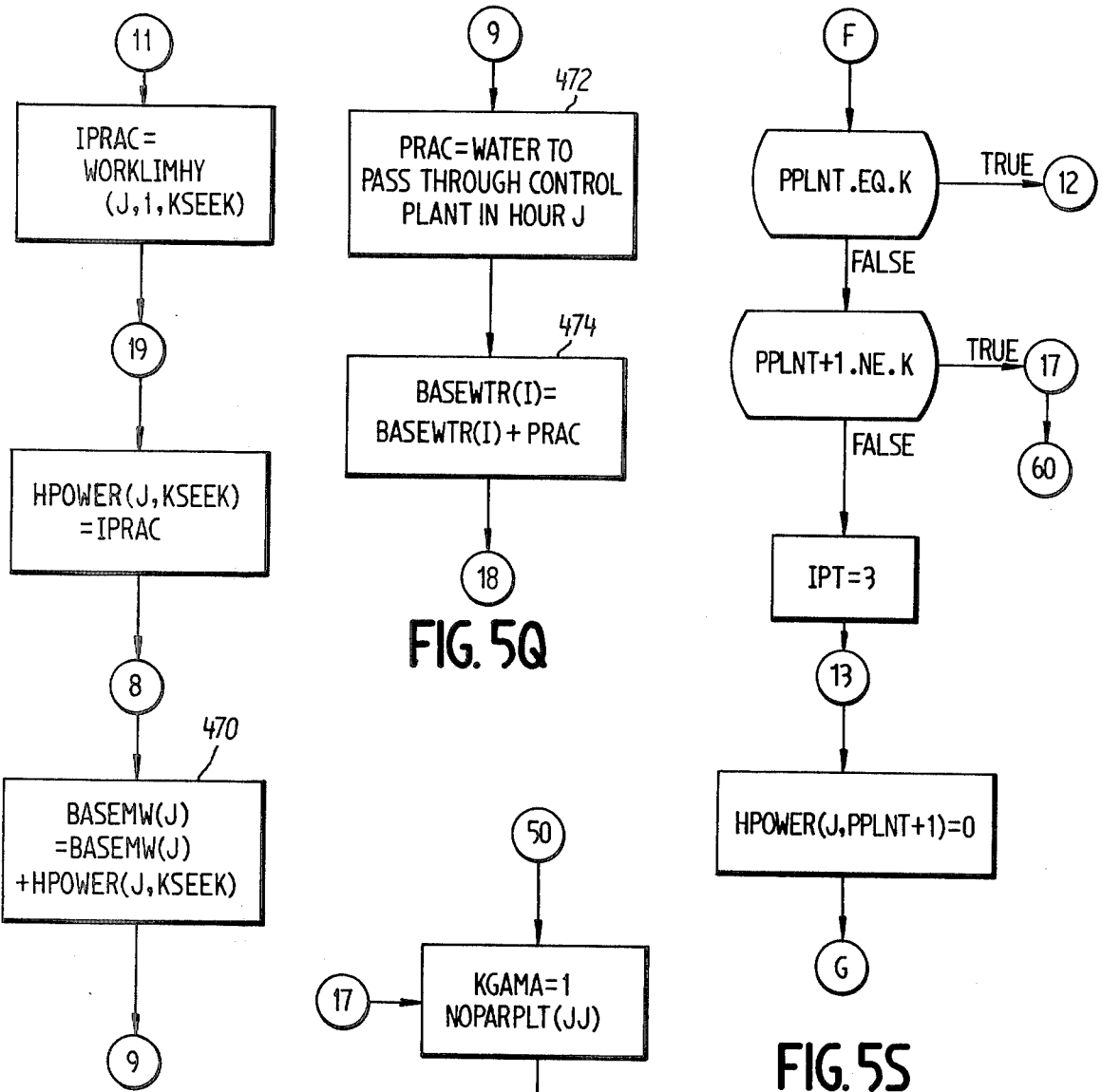
FIGS. 5A to %Y are flow diagrams for routine PREMAN.
Figure 5T:
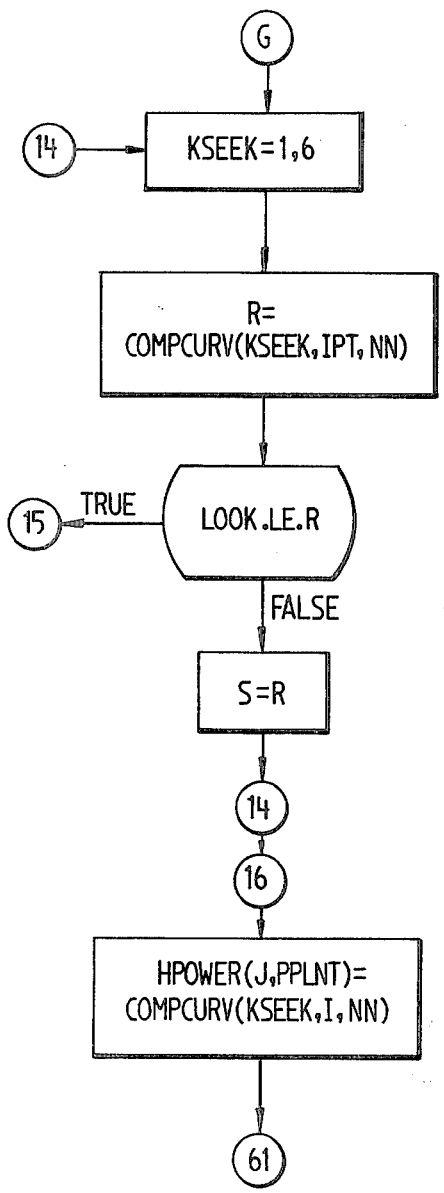
Figure 5W:
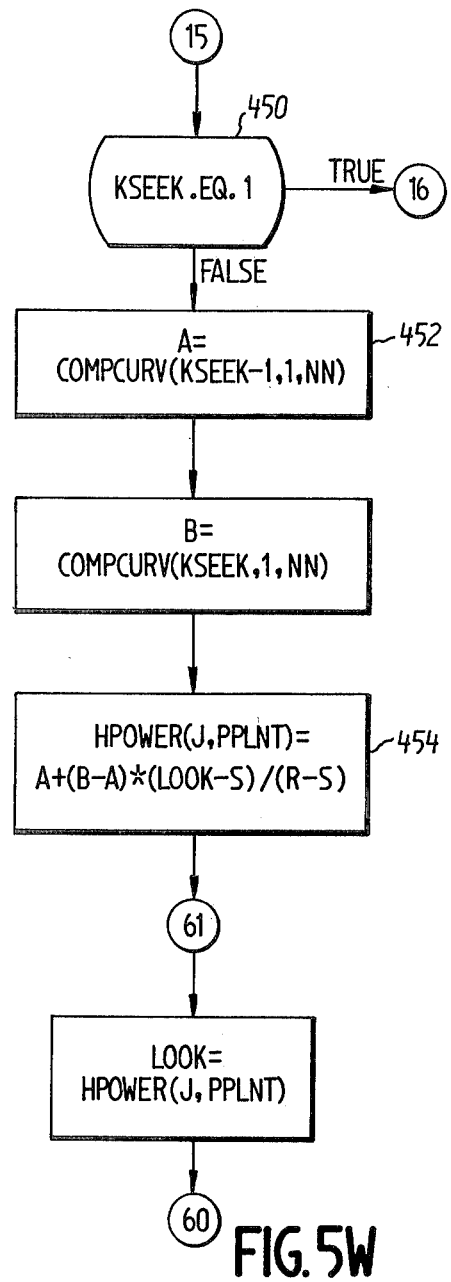
Figure 5U:
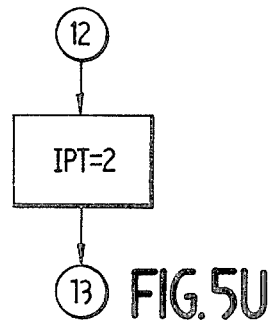
Figure 5Y:
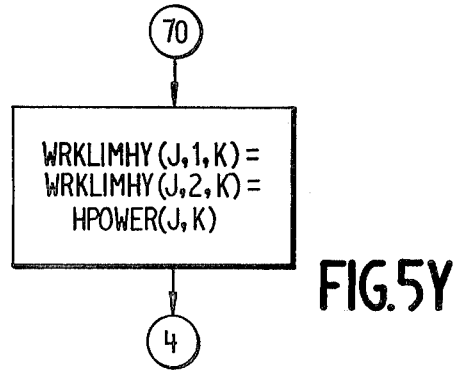

Routine PREMAN is employed to calculate the entire effect of manual schedules before the main coordination routines are entered, i.e., routines RVRLOOP and LAMCLOSE. Referring to FIG. 5A, routine PREMAN is executed by first reading files for the number of plants on a river NPLT and the composite curve for parallel plants COMPCURV in block 400 from the disc. Step 1 is entered to iterate in a loop for each river of the total number of rivers NORVRS. In the loop of step 1, files for the artificial incremental water rate and characteristic I/O curves of the dependent plants WORKGRPH and the working limits of the hydro plants WRKLIMHY are read from the disc into block 402 and a loop of step 2 is entered to iterate to examine all manual schedules for each of 24 hours as indicated in block 404. Within this loop as shown in FIG. 5B, the disc is read again for file MNULSHED corresponding to manual schedules of power generation for the given hour as entered by the operator. Step 3 is entered next to test each plant on the given river for transit time requirements. If the given plant has transit time requirements as decided in block 406, step 10 is entered; otherwise the value of the power output of a plant HPOWER as indicated in block 408 is made equal to MNULSHED as indicated in block of FIG. 5C for the given hour, and step 3 is entered again to test the next plant. If transit times are to be considered, the manual scheduled power is shifted in time according to the transit times. In step 10 as seen in FIG. 5D, a variable IHOUR is made equal to the sum of the current hour of the loop in step 2 and the appropriate transit time RELTIMES, and then tested in block 410 to be less than a value of one. If less than one, step 20 is entered to store the shifted manual schedule into a premanual PREMANL, a manual storage file for the previous day. The remaining steps in routine PREMAN calculate the water usage resulting from the adjusted manual schedules calculated as indicated above. These quantities are stored in BASEWTR for subsequent use by the RVRLOOP routine.

II. HYDRO DISPATCH

The Hydro Dispatch subfunction allocates the water through each plant in accordance with system lambda and a gamma convergence. The dispatch of the river is tied to the allocation of water through a control plant, which is either the plant with the greatest flowthrough of water or which is a fixed plant. River dispatch is accomplished by slaving each plant in the river to the curves of the plant with the greatest flowthrough. The determination of the control plant as well as the calculation of the dependent plant incremental water rate curves are accomplished in routine rvrinit, discussed above. The Hydro Dispatch subfunction of the Hydro-Thermal Coordination program comprises two routines: RVRLOOP and TRANTIME to be discussed below.

IIA. RVRLOOP

With reference to FIG. 6A, routine RVRLOOP is excuted by first reading data from disc storage as indicated in block 550. Data are read for each plant for flowthrough FLOTHRU, water allocation RVRALLOC, integer fixed gamma INTFXGAM lambda LAMBDA, the plant number NPLT, plant generating capabilities CAPABILITY, the total amount of hydro generation dispatched in each hour HYDROMW and the manually scheduled power BASEMW. INFTXGAM is an integer equivalenced to the logical FXGMARUN. The purpose of this equivalence is to permit a logical FXGMARUN which is the first piece of information in a disc sector to be equivalenced to INTFXGAM thereby allowing this variable to be the first variable read from the disc sector.

Loop 1100 transfers the load curve data for each hour of 24 hours from variable BASEMW to HYDROMW as indicated in block 552. The next loop labeled 1 as shown in FIG 6B will perform all the calculations required of routine RVRLOOP for each river of the number of rivers NORVRS. For the example of this Hydro Dispatch subfunction, 16 rivers are considered. For any value of I from 1 to, and including, the total number of rivers NORVS, a number of variables is first written into block 554 as obtained from the INITIALIZATION phase discussed above. Note the dependence of some variables on the value of I as an index number, e.g. KCONT=NUMCONT(I). After setting flags IMANFLG1 and IMANFLG2 in boxes 556 and 558, respectively, to indicate those rivers manually scheduled and the hours in which the river will be manually dispatched, data are read from the disc for dependent plant curves from file WORKGRPH, penalty factors PENALTYF and the high and low working limits from file WRKLIMHY, as indicated in block 560. If the particular plant of index I is not a parallel plant as decided in block 562, a branch is taken to 301, discussed subsequently. If the plant is a parallel plant, loop 302 is entered as shown in FIG. 6C for iterations from K=1 to the number of parallel plants on the river NOPLTRVR (PRVR) where PRVR is incremented by one for each execution of the loop path for parallel plants. An index value KGAM is set according to the leading index LEADIDX for the first of the two parallel plants on a river as indicated in block 564, and loop 302 is entered for 24 iterations, one for each hour, using J as an index. In FIG. 6C, composite working limits are constructed for parallel plants pairs. As shown in FIG. 6D, working limits WRKLIMHY are calculated for all values of J and K as indicated in blocks 566 and 568, whereupon branch point 301 is entered. If a fixed gamma run flag as stored in file FXGMARUN has been set as decided in block 570, a branch is taken to calculation point 116, discussed subsequently. FXGMARUN is a flag set by the operator indicating that a particular river is to be operated with a fixed gamma. Thus, the operator may enter a head of water or a gamma facilitating full hydro power generation for that particular river for a day. In situations where an abundance of water is available, the operator can easily ensure that all plants will be running at full capacity for the entire day. Even though the operator could achieve the same result by manually scheduling all the plants on that river for full generation, the use of a fixed gamma will allow the operator to acheive the same end with a minimum of data entry.

As shown in FIG. 6E, for variable gamma runs permitting the normal calculation point of gamma as to be explained, high (HIGH) and low (LOW) variables are computed in block 572 as the ratio of lambda as stored in file LAMB1 for the first hour and the penalty factor as stored in file PENALTYF, as selected by the initialized value of the control plant of KPLNT in block 554. Loop 5005 is entered where iterations proceed from J=2 to 24 for each hour of a day to compute and test a middle variable as stored in file MIDDLE as indicated in block 574. The middle variable is computed as the ratio of lambda for all J values as derived from file LAMBDA(J) and the penalty factor as a function of both the values of J and KPLNT. The value of MIDDLE is tested in block 576 to be greater than the value of LOW, and if so, the value of LOW is made equal to MIDDLE as indicated in block 578. Next, the value of MIDDLE is tested in block 580 to be less than the value of HIGH, and if so, the value of HIGH is made equal to MIDDLE as indicated in block 582. In FIG. 6E, the loop determines the maximum and minimum values of the adjusted lambda for the control plant of the river for the entire day. The adjusted lambda of the control plant equals the lambda of the system divided by a penalty factor associated with that plant.

The above procedures ultimately search through values of adjusted lambda for the given river to select, in effect, the adjusted value for the control plant of the river.

Figures 6F, 6G, 6H, 6I, 6J, 6K:
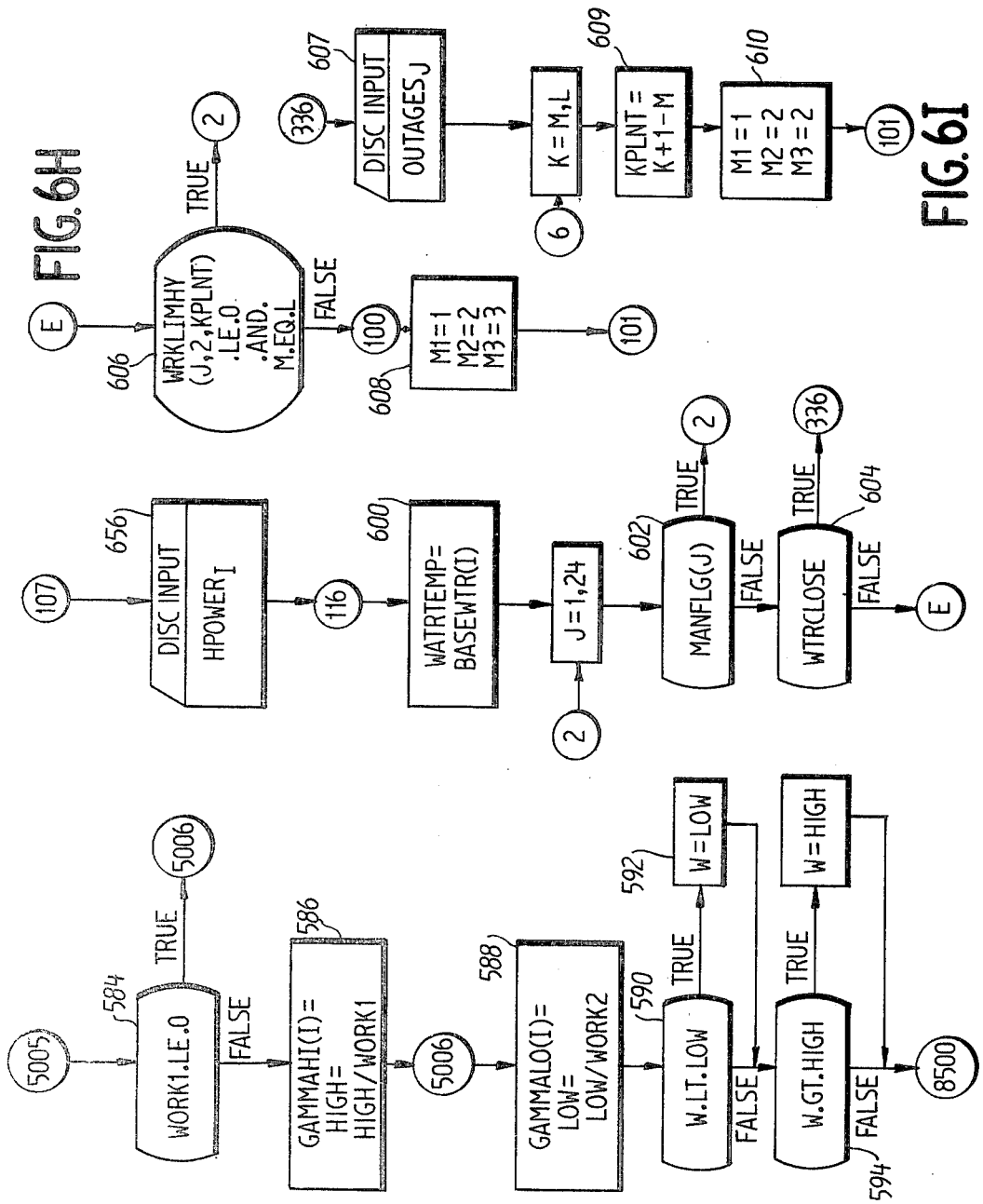
FIGS. 6A to 6Z are flow diagrams for routine RVRLOOP.

Proceeding from step 5005 and referring to FIG. 6F, the value of variable WORK1 is tested in block 584 to be less than or equal to zero, and if so, a branch is made to 5006. The variable WORKI is made equivalent to the value of variable WORKGRPH at its subscripted value of 1,1,1 corresponding to the minimum point on the incremental water rate curve for the control plant as derived from the file WORKGRPH. Before entering step 5006, the value of HIGH is modified by dividing in block 586 the previous value of HIGH by WORK1 and the quotient is used as the high value or boundary for the solution of gamma to be stored in file GAMMHI(I)

for a given river. Similarly, the low value of gamma is calculated in block 588 using as a divisor the variable WORK2 which is made equivalent to the highest value on the incremental water rate curve of the control plant. The reiteration value W was initialized in the INITIALIZATION phase and made equal to the boundary value of gamma for a given river of lying outside a defined range. In particular, the value of W is tested in block 590 to be less than the boundary value of LOW, and if so, W is made equal to the value of LOW as indicated in block 592. Next, W is tested in block 594 to be greater than the value of HIGH and if so, W is made equal to the boundary value of HIGH as indicated in block 596.

Proceeding to step 8500 and referring to FIG. 6U, loop 85 is entered to compute five values in block 598 of WORKGRPH multiplied by the value of W, i.e. gamma, obtained above and to store temporarily the results in another indexed part of the array associated with WORKGRAPH. As shown in FIG. 6W, variable PASTWTR indicative of water previously dispatched for a control plant on the river is made equal to the value of WATRTEMP, and variable PASS indicative of the number of passes is incremented by one and tested in block 601 to be less than a maximum number of passes PASSMAX permitted to achieve convergence. If less, a branch is made to point 116, and if not, an output is made to the system diagnostic printer stating, "HYDRO-THERMAL: RIVER LOOP DID'T CONVERGE, RIVER XX, WATER ALLOCATED YYYY, WATER USAGE ZZZZ", where XX are the digits of the number of the given river, YYYY gives the flow of the given river and ZZZZ gives a temporary water closure value of the given river. Following the above, an abort is made, as indicated in FIG. 6V to the step 285 at which time operator action is needed to input new data and to initialize routine RVRLOOP again.

Proceeding to step 116 as shown in FIG. 6G, the variable WATRTEMP is made equal as indicated in block 600 to the value of input data as compiled in the initialization phase indicative of the minimum amount of water required to meet the manual schedule for that river as stored in file BASEWTR(I). Next, loop 2 is entered where conditions are tested at each hour of a 24-hour period, the first test as conducted in block 602 being whether a manual schedule is in effect, whereupon the next hour is tested. If not a manual schedule, then flag water closure WTRCLOSE is tested in block 604, and if achieved, plant OUTAGES are evaluated in step 336 as shown in FIG. 6I. The disc is read for data on OUTAGES in block 607 and loop 6 is entered where an index K is used starting with the value M and ending after value L. Variable KPLNT is calculated in block 609 and initializatons are made in block 610 before entering step 101. If water closure has not yet been achieved, then a test is made on WRKLIMHY, the high working limits, for the given hour and given river as shown in FIG. 6H. If the working limit is less than or equal to zero and M=L as tested in block 606, indicating a one plant river, the next hour is taken at step 2. If, however, the conditions are not met, then an initialization is made in block 608 for the values of M1, M2 and M3 to index the working curves of the control plant to evaluate water used corresponding to the gamma profile for this 24hour period, and step 101 is entered.

In the following, computations are made in preparation for testing convergence. As shown in FIG. 6K, variable LOOKUP is calculated in block 612 as the ratio of the system lambda at hour J (LAMBDA(J)) and the penalty factor at the same hour for control plant K (PENALTYF(J,KPLNT)) indicative of the adjusted lambda for the control plant. Variable LOOKUP is next tested in block 614 to be less than a variable X indicative of the low limit of the operating range of the incremental water rate curve for the plant control, as stored in WORKGRPH subscripted 1,1,2, and if true, LOOKUP is made equal in value to X as indicated in block 618 of FIG. 6J. Next, LOOKUP is tested in block 616 to be greater than variable Y which has been made equivalent to the maximum value of the incremental water rate curve of the control plant as stored in WORKGRPH subscripted 5,1,2 and if so, LOOKUP is made equal in value to Y as indicated in block 620.

Figures 6L, 6M, 6N, 6O:
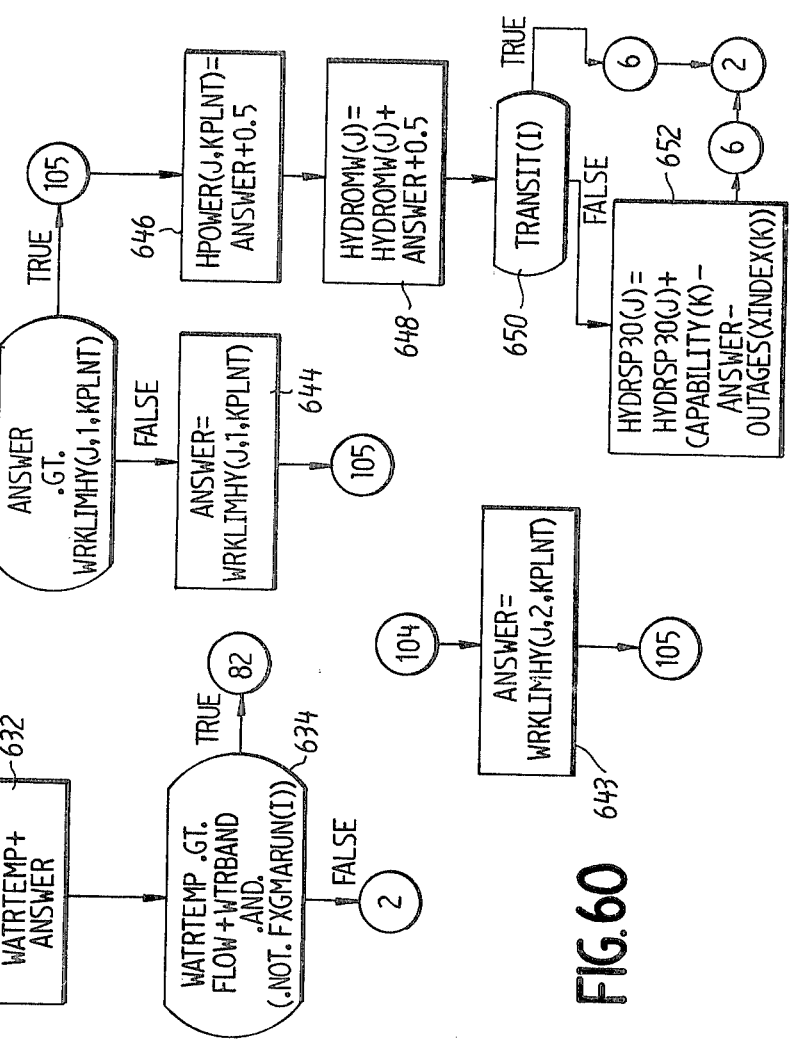

In FIG. 6L using the value of LOOKUP, i.e., the effective value of lambda for the control plant of the river, the program searches the working curve of the control plant to locate at what point LOOKUP lies. If this point lies between two points on the curve, the amount of water passing through the plant in this hour is the interpolation of the working curve. If it lies on any point on the curve, the amount of water used is equal to the water output at that point on the curve. Variables R and S represent the two consecutive points on the curve which bracket the LOOKUP value and are used in the interpolation of the working curve. The result of the searth will then be contained in the variable ANSWER which will be the amount of water passing through the control plant in this hour for the operating point as designated by the effective lambda which is the adjusted lambda. In block 634, if a fixed gamma applies to this control plant as tested herein, the hour loop is continued regardless of the value of WATRTEMP, still incrementing J between values of 1 and 24, as indicated in FIG. 6G.

In particular, loop 15 is entered using ISRCH as an index from 1 to 5. Variable R is made equal as indicated in block 622, each time in the loop, to the value of WORKGRPH subscripted to ISRCH, M1, M2, where M1 and M2 were selected during initializations in blocks 608 and 610. Next, the variables R and LOOKUP are tested in block 622 for less than, greater than or equal to each other. If the result of the test is less than, a variable S is made equal to R as indicated in block 624, and the loop is executed again if ISRCH is not greater than five. If ISRCH is greater than five, step 50 is entered, to be discussed subsequently. When R and LOOKUP are equal in value, step 30 is entered, variable ANSWER is made equal as indicated in block 626 to the value of WORKGRPH subscripted ISRCH, M3, KPLNT, and step 50 is entered. When R is greater than LOOKUP, an interpolation is performed in block 628 to give ANSWER a value between two values for WORKGRPH as follows:

ANSWER=WORKGRPH(ISRCH-1,M3,KPLNT)+(WORKGRPH (ISRCH,M3,KPLNT))−WORKGRPH(ISRCH-1, M3,KPLNT)(LOOKUP-S)/(R-S).

Finally, step 50 is entered and the flag WTRCLOSE indicative of whether water usage or power output is being calculated, is tested as shown in FIG. 6M.

If the flag WTRCLOSE is false, i.e., water is being calculated as tested in block 630, the following steps are taken. The initial temporary water value is added in block 632 to the value of ANSWER calculated above to give a new value to WATRTEMP to provide an accumulated value of water allocated to the control plant. Only if the newly calculated value of WATRTEMP is greater than the sum of the value of FLOW initialized in block 554 and the range of acceptable water closure WTRBAND also initialized in block 554 as a percentage of FLOW, and fixed gamma is not invoked, will step 82 be entered. WTRBAND is the criteria for water closure, typically 2 to 5% of water flowthrough at the control plant.

In step 82 as shown in FIG. 6S, the condition of WATRTEMP equal to the variable PASTWTR and the number of passes (PASS) greater than five will cause an exit to step 121 as in block 636, indicating that a limit condition has been achieved and water closure is impossible because of too little or too much water allocated by the operator. If the calculated value of temporary water WATRTEMP is less than the value of FLOW as tested in block 638, an output is made to the system diagnostic printer stating, "HYDRO-THERMAL: FOR RIVER XX, POINT YY THE ALLOTTED FLOW OF ZZZZ EXCEEDS PLANT USAGE OF ZZZZ.", where XX are the digits of the given river, YY are the digits of the given plant, and ZZZZ and AAAA are values in digits of water flow. Execution proceeds to step 117 which is discussed subsequently in connection with the culmination of passes through the loop of step 2. If the calculated value of temporary water WATRTEMP is equal to or greater than the value of flow FLOW, an output is made to the system diagnostic printer stating, "HYDRO-THERMAL: FOR RIVER XX, PLANT YY THE ALLOTTED FLOW OF ZZZZ IS LESS THAN MINIMUM USAGE OF AAAA.", where XX, YY, ZZZZ, and AAAA are as before. Execution continues to step 87 where, referring to FIG. 6X, another output is made to the system diagnostic printer stating, "HYDRO-THERMAL: RIVER, XX. BAD INPUT DATA, HYDRO-THERMAL ABORTED", where ZZ are the digits of the given river. Step 285 is entered and an execution of the Hydro-Thermal Coordination program ends.

Referring again to step 50 as shown in FIG. 6M, if water closure flag WTRCLOSE is true, indicating that this pass has calculated the power of the control plant, execution proceeds to step 120 as shown in FIG. 6N. If the value of power output of a plant as stored in ANSWER is greater than the value of the plant's working limit WRKLIMHY subscripted J,2, KPLNT as tested in block 640, an exit to step 104 is made where ANSWER is made equal to the working high limit as indicated in block 643. If false, the value of ANSWER is the made equal to WRKLIMHY as indicated in block 642, and step 105 is entered. If in step 120, the value of ANSWER is less as tested in block 640 than or equal to working high limit WRKLIMHY subscripted J,2,KPLNT, a test is made in block 642 whether ANSWER is greater than the working low limit WRKLIMHY subscripted J,1,KPLNT. If greater, step 105 is entered, and if not, the value of ANSWER is made equal to the working low limit WRKLIMHY before entering step 105 as indicated in block 644. At step 105, the variable HPOWER subscripted J, KPLNT is made equal as indicated in block 646 to the value of the power of the plant stored in ANSWER plus a bias value of 0.5 added for rounding purposes, followed by a computation in block 648 for HYDROMW for the given lambda time period set by J. As power is calculated for each plant in the system, it is accumulated in file HYDROMW, as indicated in block 648. Next, a test is made in block 650 whether the current river, as subscripted by I, is a transit river. If false, i.e. not a transit time river, a calculation of the total spinning reserve of all hydro plants is made in block 652 to make the value of hydro-spinning reserve available in thirty minutes HYDRSP30 for the given hour, equal to the current value of HYDRSP30 for the given hour plus the value of CAPABILY for the given plant, minus the assigned power for that plant as stored in ANSWER minus any outage conditions applicable to that plant as stored in OUTAGES. As shown in FIG. 6N, step 6 is again entered for iteration until the value of the index K is greater than the number of rivers L, given in FIG. 6I, at which time step 2 is again entered. Step 2 as shown in FIG. 6N permits iterations with index J for each until J is greater than 24 corresponding to the completion of all passes through the program for each hour on a given river.

In connection with the culmination of passes through the loop of step 2, a successful water closure would have been set as the result of entering step 117 of FIG. 6Q. In step 117, the amount of water dispatched through the control plant WTRUSED subscripted for the given river is made equal as indicated in block 654 to the temporary water value WATRTEMP, the flag WTRCLOSE is set true and the variable GAMMARUN subscripted for the given river is made equal to the value of W, the calculated value of gamma. Next, step 107 is entered as indicated in FIG. 6G where the disc is read as indicated in block 656 for power data HPOWRI associated with the given river. Upon entering step 116, which was the entry of fixed gamma computations, the above processes associated with step 2, FIG. 6G, commence. In this pass, however, water closure flag WTRCLOSE will test true and step 336 will be entered.

With the completion of step 2 if water closure flag WTRCLOSE is true, all values of lambda for a 24-hour period have been evaluated for a given river and water closure was successful. Execution now proceeds to step 80, shown in FIG. 6Y, where the data computed in the previous steps is written to the disc for the WORKGRPH file and HPOWER file as indicated in block 658. As shown in FIG. 6Z, additional steps are taken for specific rivers illustrated as rivers number three and thirteen which have special spinning reserve rules. In the special cases, loops 12 and 13 are executed to update the five-minute spinning reserve values HYDRSPO5 for each hour, for each value associated with lambdas for a 24-hour period. In all cases, the loop invoking step 200 is executed to update HYDROSPO5 for the 24 hours and a final write is made to the disc to store the files HYDRSPO5, HYDRSP30, HYDROMW, WTRUSED and INTFXGAM. At this point, the routine RVRLOOP has been successfully executed, in terms of achieving water closure, and a return is made to the calling routine.

Two additional contingency situations are handled by RVRLOOP as shown in FIG. 6R and S beginning with steps 81 and 82. If flag WTRCLOSE tests false as indicated in block 660, at the conclusion of the loop involving step 2, a test is made on flag FXGAMARUN which is subscripted on I for the river under consideration. It the test is true corresponding to the use of a fixed gamma, step 81 is entered and a test of the value of FLOW is made in block 666. If FLOW has a value greater than zero as tested in block 666, step 117 is entered where flag WTRCLOSE is set true and processing proceeds as though convergence had been achieved. If the value of FLOW is less than or equal to zero, step 89 shown in FIG. 6Y is entered. Step 89 contains two loops, 1001 and 1002, which place a value of zero as indicated in block 668 in the power array HPOWER for subscripts J and KPLNT corresponding to the values of hours and plants, thereby zeroing out the power output of each plant on a river for the 24-hour period, because there is no water flow. Step 80 is then entered with processing as described previously. If the test in block 662 of FIG. 6Q of FXGMARUN is false, a test is made on the magnitude of the difference between the values of the water allocation for the control plant as stored in FLOW and the water dispatched for the present gamma as stored in WATRTEMP. If the difference is greater than the absolute value of the convergence band WTRBAND, step 82 is entered. This test is the measure for water closure which, if successful, would have permitted execution beginning at step 117.

With regard to FIG. 6S, if the test in block 636 of the temporary water flow and number of passes fails, then a test of the value of FLOW and the temporary water flow WATRTEMP is made in block 638. If FLOW is greater than WATRTEMP, then step 83 is entered where a high gamma variable, GAMMAHI(I), is made equal as indicated in block 670 of FIG. 6U to the value of W which was previously set in step 5006. If false, then variable GAMMALO(I) is set equal to W to provide new boundaries of gamma for the next iteration. In step 84 as shown in FIG. 6U, a new gamma approximation W is calculated in block 672 as the average of GAMMAHI just set and the value of GAMMALO for the given river. With a new value of W corresponding to a new gamma, computation proceeds at step 8500 as described previously in an attempt to achieve water closure.

As before, if water closure is successful and all rivers have been considered at the conclusion of the loop invoking step 1, the routine RVRLOOP will calculate all spinning reserves as explained above and will write new data to the disc and return to the calling program. Thus, at completion of routine RVRLOOP, the following data has been made available and written to disc: the hydro-dispatch schedules for each plant and for each hour, the water used by the control plant of each river for each day, the working curves including the incremental cost curves for each river, i.e., the incremental water rate curve multiplied times the calculated value of gamma, the total spinning reserve accumulated for all plants for each hour in categories of 5 and 30 minutes, the calculated value of gamma for each river and the total power generation for each hour of all hydro plants. If not successful, diagnostics will be printed and the system program will end to await operator intervention.

IIB. TRANTIME

Once hydro dispatch has been finished for the current system lambda profile, the hourly totals of generation and spinning reserve must be adjusted by routine TRANTIME so that they reflect the true condition of transit times. When this routine finishes, the Hydro-Thermal Coordination program has values for hydro generation which it may use in one-to-one correspondence with the real time hour. Routine TRANTIME handles the distribution of plant power outputs for those rivers which are constrained by transit times. For this illustrative discussion, four rivers are affected by transit times.

Referring to FIG. 7A, execution of TRANTIME begins by reading the disc as indicated in block 700 for files HYDROMW, HYDRSPO5, HYDRSP30, PREMANL and IFLAG. Files HYDRSPO5 and HYDRSP30 contain total actual hydro 5 and 30 minute spinning reserves for each of 24-hour periods for the entire hydro system. File PREMANL contains the premanual scheduled power values of plants from a previous 24-hour period. The loop of step 1 is entered in block 702 and variable I is used to index from a value of one to NOTRANS, the number of transit river, i.e., those rivers having transit times. A variable K is made equal to two times I in order to bring the flags from the array IFLAG into local storage by placing thereon in IMANFLG1 and IMANFLG2 as indicated in block 704. Locations IMANFLG1 and IMANFLG2 are the same as those referenced by MANFLG. Next, the disc is read for file HPOWER as indicated in block 708, the individual hydro plant outputs previously calculated for each of 24-hour periods. After initializing plant indexes M and L for the river as indicated in block 710, step 2 is entered to iterate in a loop from J equals M to L. Variable IPLNT is made equal in block 712 to J minus M plus 1, which is the river index for a plant. Variable K is made equal to the array RELTIMES subscripted on J, as indicated in block 714, which gives the relative transit time in hours between plants on a river based upon the position of the control plant. Note that the subscripting is selected to give relative water source delay data for a given plant. With regard to FIG. 7B, K is tested in block 716 to be equal to zero indicating no transit time delay, and if so, step 2 is iterated again. If tested false, indicating a river with transit time considerations, step 3 is entered where a loop is iterated using JJ as an index. In the loop, the given plant output is adjusted for each of 24-hour periods from hour 24 to hour 1. Next, step 4 is entered where manual schedules are inserted for the corresponding values of HYDROMW resulting from the previous day's run as taken from the PREMANL file for the previous 24-hour period. At the conclusion of step 4, step 2 is iterated again until completed at which time the disc is read as indicated in block 718 for file CAPABILY which contains the maximum high operating limits for the plants on the river. Step 5 is entered next using JJ again as an index from one to twenty-four, corresponding to each of 24-hour periods. For each hour, flag MANFLG is tested in block 720 to determine whether the river is manually scheduled for the given hour, and if so, the next hour is considered.

Figures 7C, 7D:
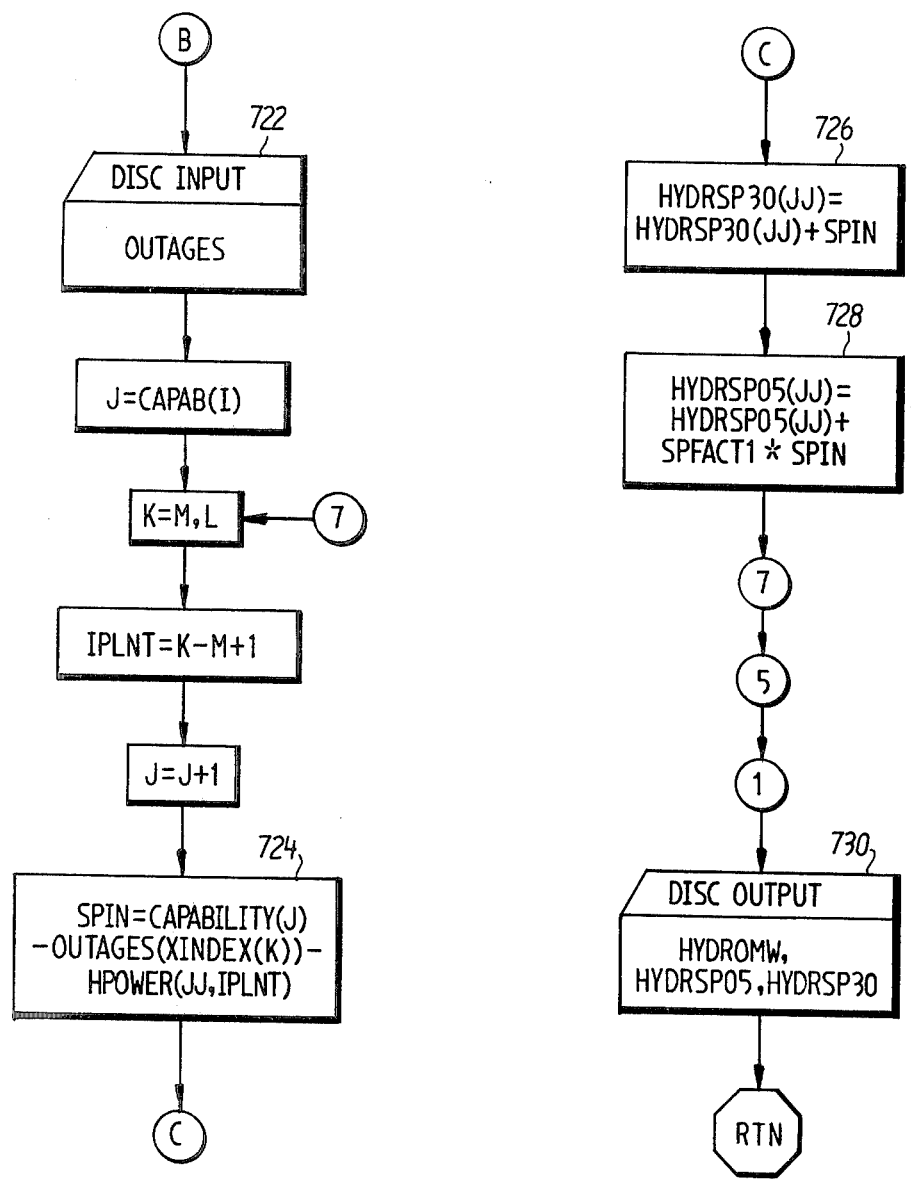

If false, step B as shown in FIG. 7C is entered where the disc is read for scheduled outage data for the plants in file OUTAGES as indicated in block 722. Variable J is made equal in block 722 to array CAPAB subscripted by I, which is the starting index for the plant maximum high limit CAPABILY for the given river, and step 7 is entered. The loop of step 7 is iterated to calculate in block 724 the available spinning reserve for the plants in the transit time river as CAPABILY minus OUTAGES minus HPOWER. For each iteration, values are accumulated into spinning reserve for variables HYDRSPO5, hydro five-minute spinning reserve as indicated in block 726, and HYDRSP30, hydro 30-minute spinning reserve as indicated in block 728. The loop of step 7, within the loop of step 5, is iterated to completion and the loop of step 5 is likewise iterated to completion, whereupon the next transit time river is processed beginning again with step 1. When all transit time rivers are processed, the updated values of total hydro power, individual plant power outputs and spinning reserves for each of the 24 real hour periods are written on disc in file HYDROMW and files HYDRSPO5 as indicated in block 730. Routine TRANTIME is completed and control is returned to the calling routine.

III. TRANSITION

When the Hydro-Thermal Coordination program must move from one discrete portion of computation to another, a transition period is sometimes required. The routines which provide transition subjunction make calculations which are employed by other routines and produce parameters which are dependent upon the dynamics of the power generation complex. Routine HYDTOTHM performs all the necessary initializations after the hydro dispatch has converged, but prior to entering the thermal-interchange calculations. The basic requirements to be satisfied by routine HYDTOTHM are:

1. Initialize the power vector points which are affected by the new hydro-generation schedule.
2. Schedule the non-withdrawable interchange and calculate its production cost on an hourly basis.

The power vector adjustments are calculated from two sources: the pre-manual schedules and the hydrogeneration schedule. The pre-manual values are handled separately because they have been separated from the hydro-dispatch values. The generation schedule is then routed on top of these values into a bookkeeping area of the computation designated specifically for the affected points. When all of the changes have been accumulated, they are mapped into the power vector points by means of a cross-index table. Then, if there are any base values to be added in, these are included in the appropriate points.

The scheduling of the non-withdrawable interchange is controlled by a modified gamma type construction. The criterion for convergence in this method is that all interchange has been allotted. To start, a gamma value is calculated for the tie, and interchange is then allotted in each hour. If limits are violated, a new gamma is calculated from the necessary adjustments and the interchange is rescheduled. The process continues until all interchange is allotted and no limits in violation.

IIIA. HYDTOTHM

With reference to FIG. 8A, routine HYDTOTHM is executed by reading the file for the premanual schedules of power generation calculated in the previous 24-hour period as stored in PREMANL from the disc as indicated in block 800. Step 100 is entered, where iterations are made using values of II found in block 802 from PREIDX subscripted on I. PREIDX indicates which values of the premanual power schedules are to be entered into the power vector for the hour. Variable I is incremented from a value of one to the value of PREWDS, i.e., the number of premanual schedules in PREMANL. For a value of II equal to zero as tested in block 804 indicating a premanual power value not to be entered into the power vector, step 100 is iterated again, and for a non-zero value indicating a premanual schedule to be entered into the power vector, the value off BUFFER subscripted on II is made equal as indicated in block 806 to the previous value of BUFFER plus the value of PREMANL subscripted on I, thus summing the power values of the premanual schedules to be entered at a point on the power vector. This step implements the routing into a bookkeeping area. Completing step 100 as shown in FIG. 8B, step 200 is entered where file HPOWER is read from disc as indicated in block 808, subscripted from I equals one to 16, corresponding to the number of groups of plants, one group for each river. Upon entering step one if the river is a transit time river as tested in block 810, variable KK is made equal as indicated in block 812 to the hour of transit delay with regard to the control plant found in variable RELTIMES and step A is entered. If not, step A is entered directly where array XINDEX, corresponding to the cross-index of hydro plants in the hydro power system, is tested to be zero in block 814 indicating whether a penalty factor is associated with the plant, and if so, step 1 is entered again. If not, step 2 is entered and a bookkeeping area HYDPTS for the given hour is made equal as indicated in block 816 to the previous value of HYDPTS plus the value of HPOWER subscripted on K for the given hour and J for the given plant. Thus, the hydro powers are placed into the power vector array accounting for the delay times incurred on the transit time rivers to insure that the hydro power values are entered correctly into their real time hours. Steps 2, 1 and 200 are then iterated to completion. From the above computed value, adjustments are made to system penalty factors, buffer data and interchange data as found in files corresponding to PF, BUFFER and INTERCHG. Having initialized the power vector points affected by the new hydro-generation schedule, control is returned to the calling routine.

III.B. INTTOHYD

Figures 9A, 9B, 9C:
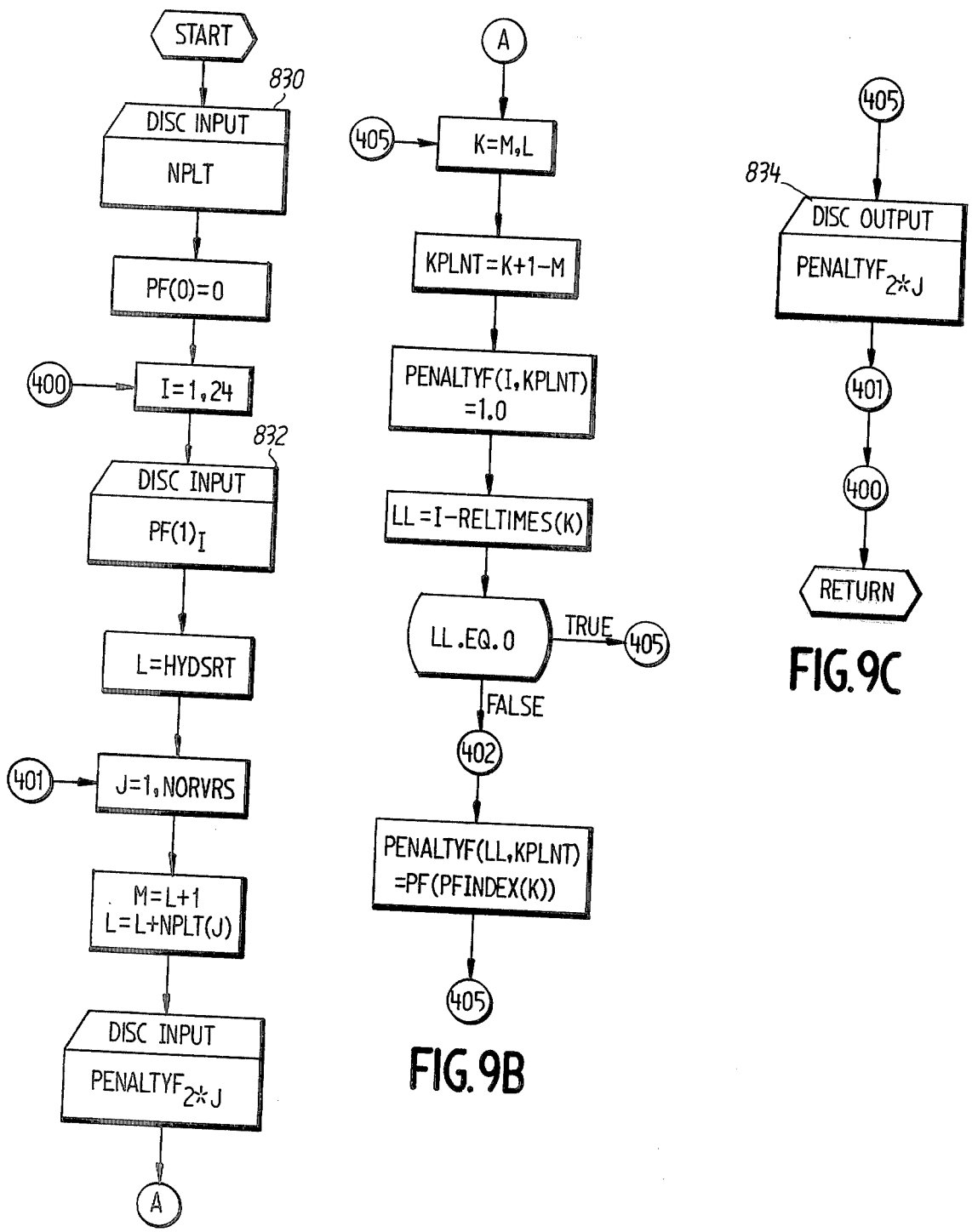
FIGS. 9A to 9C are flow diagrams for routine INTTOHYD.

To perform required initializations when passing between interchange and hydro loops, routine INTTOHYD is used to map new panelty factors, computed in the interchange loop, into the hydro arrays on a river basis. The mapping takes into account the normalizing necessary to process transit time constraints. The default value of the penalty factors for the next day is one. With reference to FIG. 9A, routine INTTOHYD is executed by first reading file NPLT from the disc as indicated in block 830. Step 400 is entered to iterate on variable I from 1 to 24 corresponding to 24-hour periods, and the penalty factors as derived from the interchange or stored in file PF are read for each hour from disc as indicated in block 832. Step 401 is next entered to iterate on all rivers, and to generate the new panalty factors PENALTYF for each plant. For each river, file PENALTYF is written to disc as indicated in block 834, and upon completion of all iterations, control is returned to the calling routine.

IV. CONVERGENCE - LAMCLOSE

The convergence criterion for the Hydro-Thermal Coordination program has been chosen to conform with the unique approach to hydro dispatch. Hydro-Thermal dispatch begins by running a hydro dispatch with a set of initial lambdas taken, for example, from the last run. With the hydro-power calculated by hydro dispatch, thermal dispatch loads are then calculated in a conventional manner against which the thermal units are loaded and an interchange negotiation run. The resulting system lambda profile as derived from the thermal dispatch is then used for another hydro dispatch. A test for convergence is made between the previously calculated value of hydro-power generation based upon the assumed lambda and the calculated value of hydro generation based upon the lambda derived from the thermal dispatch. If in any hour convergence fails, a new approximation of total hydro generation is calculated using the binary search method, and the above process repeated to obtain convergence between the approximated and calculated values of hydro generation.

The first pass of the Hydro-Thermal Coordination program yields both initial minimum and maximum bounds of hydro-power generation. Reasoning that the reaction of system lambda to the hydro generation in any hour tends to overcompensate for the error in the initial approximation, the minimum and maximum bounds of hydro-power generation computed should bound the actual solution. After each pass, the binary approximation is made using previously computed bounds of hydro-power generation, new thermal-dispatch loads are calculated and the process is again repeated. The total hydro generations achieved from the hydro-dispatch subfunction RVRLOOP for each iteration are averaged. If the average value does not lie within the minimum and maximum bounds, the appropriate bound is adjusted to place the average within the bounds and the process is then continued to reach convergence.

Figure 10A:
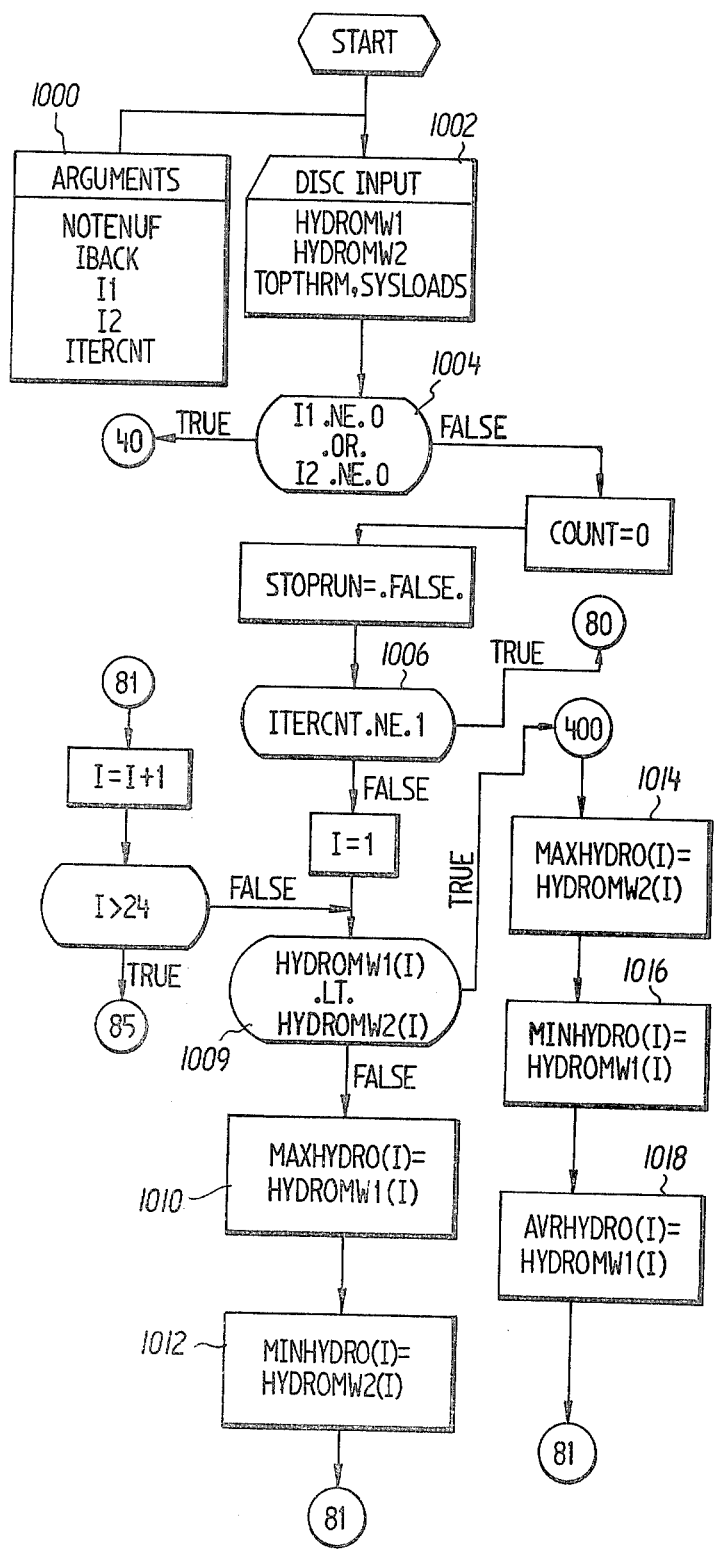
Figure 10B:
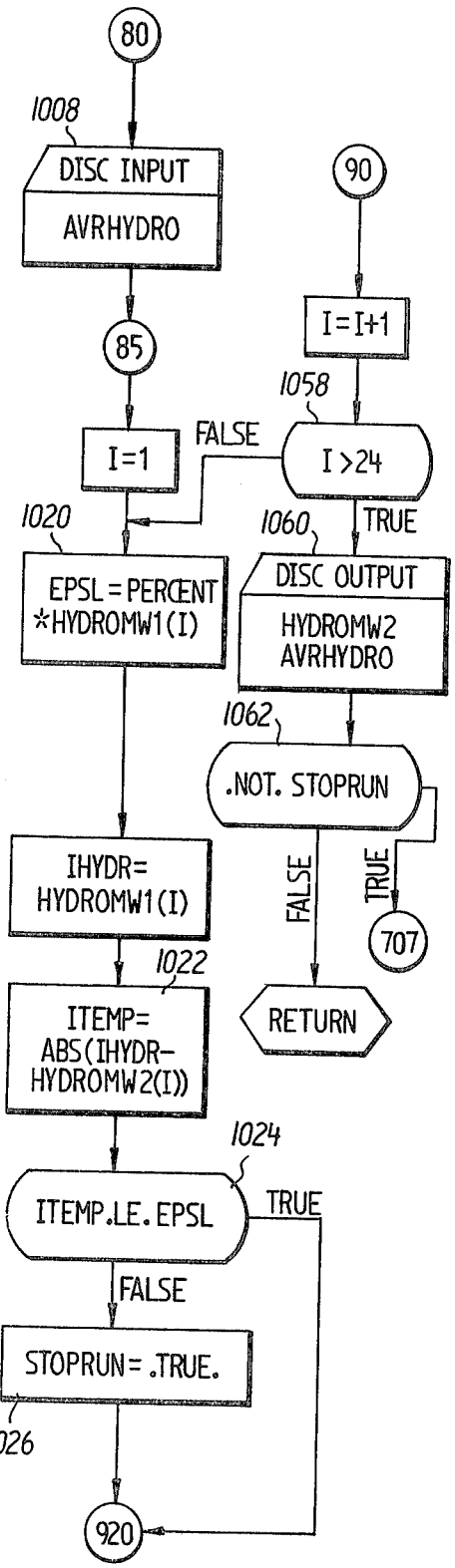

With reference to FIG. 10A, routine LAMCLOSE is executed by the system as a subroutine transferring arguments from block 1000 for NOTENUF, a logical array indicating the hours in the present run for which there was not enough thermal generation; IBACK, a return statement number for the calling routine; I1 and I2, integer equivalents to the NOTENUF array; ITERCNT, the current iteration count, corresponding to the number of times routine LAMCLOSE has been run; and COUNT, the current number of attempts which have been made to correct a situation of insufficient power generation. The disc is read as indicated in block 1002 for the hydro-power generation in files HYDROMW1 and HYDROMW2 for storing calculated and approximated values of hydro generation, for file TOPTHRM to input the maximum thermal generation in each hour, and for the gross system load from all available resources including thermal, hydro and interchange, as stored in file SYSLOADS. HYDROMW1 and HYDROMW2 are files for storing either of the calculated value of hydro generation based on the dispatch of the rivers by routine RVRLOOP using the resulting lambda profile from the thermal dispatch or the approximated value of hydro generation resulting from a binary search approximation. Initially, in routine LAMCLOSE, the previously approximated value of hydro generation is stored in file HYDROMW1 and the calculated value of hydro generation in file HYDROMW2. At the conclusion of routine LAMCLOSE, if convergence is not met, the new approximated value of hydro generation is stored in file HYDROMW2 and the calculated value of hydro generation in file HYDROMW1. Next, integers I1 and I2 are tested in block 1004 for being not equal to zero, and if so, step 40 is entered to be discussed subsequently. If neither integer is zero indicating insufficient thermal-power generation, variable INTERCNT is tested in block 1006 for being not equal to one. Variable INTERCNT is set equal to one indicating that this is the first passthrough of routine LAMCLOSE, if it is desired to initialize the maximum and minimum values of hydro dispatch for each 24 hours. Otherwise, step 80 is entered as indicated in FIG. 10B and average hydro values are read from disc as indicated in block 1008, and processing continues at step 85. When INTERCNT is set to one, a loop is entered with index I incremented from values of one to twenty-four for each hour of the day. In each iteration, the value of HYDROMW1 is tested in block 1009 to be less than the value of HYDROMW2, and if true, step 400 is entered. If false, the maximum hydro value MAXHYDRO is made equal to HYDROMW1 for the given hour as indicated in block 1012. Step 85 is entered where I is increment by one and tested to be greater than 24. If true, as indicated in block 1009, the loop is executed again, and if greater or false, step 81 is entered. When step 400 is entered, the maximum hydro value MAXHYDRO is made equal to HYDROMW2 for the given hour as indicated in block 1014, and the minimum hydro value MINHYDRO is made equal to HYDROMW1 for the given hour as indicated in block 1016. In addition, an average hydro value AVRHYDRO is made equal to HYDROMW1 as indicated in block 1018 for the given hour, before entering step 81. The above procedures insure that the average hydro-power dispatch AVRHYDRO lies between the maximum and minimum values (MAXHYDRO and MINHYDRO) represented as:

$$P_{mini} \leq P_{avgi} \leq P_{maxi}$$

where $P_{avg}$ is the average of all resulting hydro dispatches. Empirical observation has shown that $P_{avg}$ steadily trends towards the solution.

Step 85 begins another loop as shown in FIG. 10B into iterations on I for each hour of a 24-hour period. This loop performs the binary convergence as follows. A percentage of the value HYDROMW1 for the given hour is found in block 1020 for the convergence band EPSL by multiplying a constant PERCENT times the value of HYDROMW1. The value of PERCENT is programmed, typically 5%. The magnitude or absolute value of the difference between HYDROMW1 and HYDROMW2 for the given hour is formed and stored as indicated in block 1022 in the variable ITEMP to obtain a value indicative of convergence. The value of ITEMP is tested in block 1024 to be less than or equal to the value of EPSL. If ITEMP is true, indicating that convergence has been achieved for the given hour, step 920 is entered, and if false, a flag STOPRUN is set indicative of non-convergence in at least one hour, as indicated in block 1026, and then step 920 is entered. The significance of setting STOPRUN time is that the difference between two hydro dispatches for the same hour is not within the tolerance desired for convergence as set by the predetermined percent of HYDROMW1.

Proceeding in step 920, as shown in FIG. 10C, the variable for the average hydro value AVRHYDRO is updated by adding the current AVRHYDRO value to HYDROMW2 for the given hour and placing the running sum of all HYDROMW in the variable AVRHYDRO as indicated in block 1028. Next, a variable AVERAGE is made equal as indicated in block 1030 to the quotient of the value of AVRHYDRO divided by the number of iterations originally set in INTERCNT plus one, corresponding to the total number of files added into AVRHYDRO. The value of HYDROMW1 is tested in block 1032 to be less than the value of HY- DROMW2 for the given hour, and if true, step 405 is entered, discussed subsequently. If false, the value of the maximum found as previously calculated MAXHYDRO is made equal to the value of HYDROMW1 for the given hour as indicated in block 1034, and then the new value of HYDROMW2 is tested in block 1036 to be greater than the value of the minimum bound MINHYDRO. If false, step 406 is entered, and if true, the value of MINHYDRO is made equal as indicated in block 1038 to the value of HYDROMW2 for the given hour before entering step 406. As shown in FIG. 10F, step 405 makes the value of MINHYDRO equal to the value of HYDROMW1 for the given hour as indicated in block 1040. The value of HYDROMW2 is tested in block 1042 to be less than the value of MAXHYDRO for the given hour. If false, step 406 is entered, and if true, the value of MAXHYDRO is made equal to the value of HYDROMW2 as indicated in block 1044 before entering step 406. Thus, HYDROMW2 is tested with regard to the previous maximum and minimum boundaries, MAXHYDRO and MINHYDRO, and HYDROMW1. First, HYDROMW2 is tested to be greater or less than HYDROMW1. If greater, the value of MINHYDRO is set equal to HYDROMW1. Next, the value of MAXHYDRO2 is tested to be greater or less than the value of MAXHYDRO, and if less, the value of MAXHYDRO is set equal to HYDROMW2. In this manner, if the solution is going toward convergence, the boundaries of the solution are simultaneously narrowed.

The preceding computations from step 920 to step 406 implement the following equation:

$$P_{avg} = \frac{\sum_{i=1}^{n} P_i}{n}$$

where N = the number of iterations plus one, and $P_i$ = the ith approximation of the hydro value. The value of $P_{avg}$ is used to test the validity of the simultaneous narrowing of the bounds of the solution MINHYDRO and MAXHYDRO. As will be seen in the following, if $P_{avg}$ falls outside the narrowed bounds, the exceeded bound is expanded.

In step 406, as shown in FIG. 10D, the current maximum bound MAXHYDRO is tested in block 1046 to be less than the value of AVERAGE computed in the steps above. If MAXHYDRO is less, step 407 is entered where the value of MAXHYDRO is made equal to the product of a programmed constant ALPHA (illustratively of a value of 1.01), and the value of AVERAGE as indicated in block 1048, and the value of HYDROMW2 is made equal to the product of a programmed constant BETA (illustratively of a value of 0.99) and the value of AVERAGE as indicated in block 1050, before entering step 90. If the test of MAXHYDRO less than AVERAGE if false, a test is made in block 1052 for the value of MINHYDRO to be less than the value of AVERAGE. If true, step 408 is entered whereby the value of MINHYDRO is made equal to the product of the constant BETA and the value of AVERAGE as indicated in block 1054, and the value of HYDROMW2 is made equal to the product of the constant ALPHA and the value of AVERAGE as indicated in block 1056 before entering step 90. If the new value of AVERAGE is determined to be greater than the MAXHYDRO or less than MINHYDRO, new values for MINHYDRO and MAXHYDRO are set as appropriate. More specifically, if the value of AVERAGE is greater than the value of MAXHYDRO, a new value of MAXHYDRO is determined as the product of AVERAGE and ALPHA, and if the value of AVERAGE is determined to be less than MINHYDRO, a new value of MINHYDRO is determined to be the product of the constant BETA and AVERAGE. As seen by the illustrative values of both ALPHA and BETA, the new minimum or maximum bound is set slightly below or above the value of AVERAGE, respectively. If either MINHYDRO or MAXHYDRO values are violated, as determined in blocks 1046 and 1052, a new value for HYDROMW2 is calculated as a product of ALPHA or BETA times the value AVERAGE as appropriate. If the AVERAGE falls within the bounds, the value of HYDROMW2 is made equal by the search approximation to the sum of MAXHYDRO and MINHYDRO divided by two. Step 90 is then entered.

The new value of HYDROMW2 is used to determine the new value of the thermal-dispatch generation, whereby a new set of system lambdas is derived. The new set of the system lambdas is subsequently used to calculate the next hydro dispatch, the value of which is to be tested again the approximated value of hydro generation for convergence.

Throughout the Hydro-Thermal Coordination, there are convergence requirements which must be met. In the hydro dispatch, gamma convergence is required on each river independently. The inputs to the convergence program for hydro dispatch, previously discussed as routine RVRLOOP, are the lambdas for the past unit commitment-interchange negotiations. The unit commitment requires lambda convergence in each hour constrained by economic considerations refined in the interchange negotiations. The lambda values for a 24-hour period are then input for the next hydro dispatch.

Routine LAMCLOSE, as discussed above, processes the consecutive hydro dispatches for convergence. IF convergence is not achieved for routine LAMCLOSE, a new approximation of hydro generation is computed for the thermal unit commitment by use of the binary search. Specifically, a new hydro value is selected for each hour of a 24-hour period as $$P_{i+1} = (P_{max} + P_{min})/2$$

where i is the number of the last approximation. The equation is implemented in LAMCLOSE as HYDROWM2(I) = (MAXHYDRO (I) + MINHYDRO(I))/2 as indicated in block 1053.

If in the convergence process the relationship of $P_{min} < P_{avg} < P_{max}$ is not met for $P_{avg}$, the limits are increased. In particular, as seen in steps 406 and 408 of FIG. 10D, where $P_{min} > P_{avg}$, $P_{min}$ is adjusted downward so that $\beta P_{min} < P_{avg} < P_{max}$. This relationship is implemented in block 1054 of LAMCLOSE as MINHYDRO(I) = AVERGE *BETA. For $P_{max} < P_{avg}$, $P_{max}$ is adjusted upward so that $P_{min} < P_{avg} < \alpha P_{max}$. This relationship is implemented in block 1048 of LAMCLOSE as MAXHYDRO(I) = ALPHA * AVERAGE.

In step 90 of FIG. 10B, index I is incremented by one corresponding to an index to the data for the next hour. IF the 24th hour has not been processed as tested in block 1058, the loop beginning with EPSL = PERCENT * HYDROMW1(I) of block 1020 is entered again. When hour 24 has been processed, i.e., a false output of block 1058, the data in files HYDROMW2 and AVRHYDRO are written to the disc as indicated in block 1060, and the flag STOPRUN indicating nonconvergence is tested in block 1062. If STOPRUN has been set, execution of routine LAMCLOSE is complete and control is returned to the calling routine to continue coordination iterations. If STOPRUN had not been set, indicating convergence, step 707 is entered, as shown in FIG. 10G, where adjustment subroutines BREAKOUT, TTADJUST and PONDCHEK are called in order as described below. Upon execution of these subroutines, routine LAMCLOSE bids the output task to call an output routine to apply data to the on-line system for control of the thermal units and hydro plants.

Before discussing the above-mentioned adjustment subroutines, step 40 of routine LAMCLOSE is presented as shown in FIG. 10E. The purpose of step 40 is to generate 24-hour values of variable HYDROMW2 in which there is insufficient total thermal-power generation based upon the present value of HYDROMW2. Array NOTENUF provides an indication of insufficient thermal generation in conjunction with previously scheduled hydro generation system load, flagging the particular hours in which HYDROMW2 is insufficient. As a result, new values of HYDROMW2 are calculated and read to disc, and based upon these new values, a new value of thermal power generation for the flagged hours is calculated. For each hour, the variable NOTENUF has been set true or false as indicated in block 1064 corresponding to whether sufficient thermal power is available for the estimated value of HYDROMW2. For insufficient power in a given hour, the disc is read for file BUFF as indicated in block 1066. In routine LAMCLOSE as indicated in block 1066, variable TIE1 is made equivalent to the value of BUFF subscripted 124; variable TIE2 is made equivalent to the value of BUFF subscripted 125; variable TIE3 is made equivalent to the value of BUFF subscripted 120; and variable TIE4 is made equivalent to the value of BUFF subscripted 119. TIE1 to TIE4 are scheduled interchanged values for the flagged hours, where there is insufficient thermal generation. The value of HYDROMW2 for the given hour is made equal as indicated in block 1068 to the sum of the value of SYSLOADS, for the given hour, the interchange values TIE1, TIE2, TIE3 and TIE4; and a power factor (e.g. 5 megawatts), minus the value of maximum thermal-power generation THRMTOP for the given hour. The new calculated value of HYDROMW2 is a value of hydro generation calculated for the flagged hour assuming that thermal power generation is dispatched for its maximum capacity. The above steps are repeated for each hour up to 24 values of an index I, whereupon the file HYDROMW2 is written to disc as indicated in block 1070. Execution of LAMCLOSE is now completed and control is returned to the calling program using the reference IBACK.

V. ADJUSTMENTS

Once the hydro-thermal dispatch has converged, certain adjustments are necessary to adjust individual plant output in accordance with transit times, compile a "post-schedule" for hydro plants affected by transit times, compute the individual plant power outputs for the parallel plants, and calculate and limit check hourly volumes of designated ponds. When these adjustments have been computed, the data for Hydro-Thermal Coordination is ready for output.

VA. BREAKOUT

Through all the dispatch iterations, the generation of the parallel flow plants is kept in a compacted form until convergence is achieved. After convergence, the individual plant outputs are calculated, limit checked and stored in the output arrays by routine BREAKOUT. Routine BREAKOUT performs these functions by use of the composite curves stored in COMPCURV, constructed specifically for the parallel plants. The curves dictate individual plant outputs based upon the total output of the composite, and the method of calculation is a curve lookup with interpolation as required. With reference to FIG. 11A, routing BREAKOUT begins execution by reading file COMPCURV as indicated in block 1100 from the disc. At step 1, a loop is iterated on I as an index from I equal one to NORVRS, the number of rivers with parallel plants. Variable IBIAS is made equal in block 1102 to the index PARARVRS to permit address of data for the next parallel plant river. Prior to execution of routine BREAKOUT, the power outputs for the parallel plants are stored as the combination of power outputs for the two plants. The purpose of routine BREAKOUT is to identify the power to be generated by each plant of the two plant complex by use of the composite curve stored in COMPCURV. Next, the disc is read again as indicated in block 1104 for files HPOWER and WRKLIMHY, and a loop is entered at step 2. This loop, within the previous loop, iterates on J as an index from one to NOPLTRVR, the number of the parallel plants on the river. With regard to FIG. 11B, a variable M is made equal to block 1106 to the index of the first plant in a parallel plant pair LEADIDX subscripted on the index L and incremented by one each time the loop of step 2 is executed. At step 3, another loop is entered, within the previous two loops, to iterate on variable K from one to twenty-four corresponding to each hour of the 24-hour period. Variable POWER is made equal as indicated in block 1108 to variable HPOWER subscripted on hour K and plant M. Continuing at step 4, another loop is entered within the previous three loops iterating on JJ from one to six corresponding to points on the composite curve COMPCURV. In the next instructions, variable R is set as indicated in block 1110 to a value of a point on the composite curve COMPCURV which subscripted on JJ, 1 and L is the axis of the composite power on this curve. POWER is tested in block 1112 by subtracting from POWER the current value of R to determine where the value of POWER lies on the composite curve. For a result of greater than zero indicating that a value of POWER is not yet located on the curve as indicated in block 1114, a variable S is made equal to R, and the loop is iterated again. Because of the curve construction, the value of POWER will always lie on the composite curve. For a result of less than zero indicating that the value of POWER has been bracketed on the curve, step 10 is entered directly and the last values of S and R will be used in the interpolation. At step 10, the value of HPOWER subscripted on hour K and on the second parallel plant in the pair Mil, is made equal as indicated in block 1116 to the value calculated by interpolation between the points on COMPCURV corresponding to the current and previous values of index JJ (R and S), are then step 5 is entered. Note that the interpolated value of HPOWER is computed for the second plant in the parallel plant pair, the index of which is M+1. Taking the path of step 20 for a result equal to zero indicating that POWER lies directly on a defined point of the composite curve, the value of HPOWER subscripted at K and M+1 is made equal as indicated in block 1118 to COMPCURV subscripted at JJ, 3, L, which is the axis of power for the second plant before entering step 5. At step 5, the value of HPOWER subscripted at hour K and plant M is made equal as indicated in block 1120 to the difference between the value of POWER and HPOWER subscripted at K and M+1. This computation calculates the power for the first plant in the parallel plant pair.

In FIGS. 11D and E, step 6 is next entered as a loop operating within the loops of steps 3, 2 and 1. In step 6, index JJ, now having new meaning, has just two values corresponding to the plants in the parallel plant pair with indexes of M and M+1. The value of HPOWER subscripted on K, for the given hour, and JJ, for the plant, is tested in block 1122 to be greater than the high working limit of the given plant as subscripted for WRKLIMHY (derived in routine HYWRKLMS) in subscripts K, 2, JJ. If true, HPOWER is made equal as indicated in block 1124 to WRKLIMHY for the given conditions. If false, HPOWER is tested in block 1125 to be less than the low working limit WRKLIMHY, subscripted K, I, JJ, and if true, HPOWER is made equal as indicated in block 1126 to WRKLIMHY for the given conditions, before entering step 6. If false, step 6 is entered directly and the loops of steps 3 and 2 are iterated until completed. Upon completion, the computed values of HPOWER are written to disc, and the loop of step 1 is iterated to completion whereupon the subroutine BREAKOUT is completed having distributed the power from the dispatch between the plants of a parallel pair, and control is returned to the calling routine.

VB. TTADJUST

During the hydro-thermal coordination dispatch, all hydro plants were "normalized" into their control hours to simplify the dispatch so that dispatch calculations for all plants are performed with regard to the control plant. When convergence has been obtained, adjustment routine TTADJUST is called to map the outputs of the hydro plants from their control hour into the real hours of the day, when they will actually occur based upon transit times relative to the control plant. With reference to FIG. 12A, subroutine TTADJUST is executed by first reading file PREMANL from the disc to input all pre-manual schedules as indicated in block 1200, which are schedules of power generation in effect for this 24-hour period because of transit time adjustments from the previous 24-hour period. Step 100 is entered to iterate on variable I from one to NOTRANS, the number of transit time rivers. Within this loop, file HPOWER is read as indicated in block 1202 for the given transit time river as given by variable TRANRVRS (I), an array containing indexes indicating rivers with transit times. In the next step 101, the loop is iterated using variable J from one to NPLT, the number of the plant for the given river. Variable K is made equal as indicated in block 1204 to variable RELTIMES, which contains the transit times between plants on the river relative to the control plant, subscripted on J plus L. With regard to FIG. 12B, the value of K is tested in block 1206 to be equal to zero indicating no transit time for a given plant, and if so, the loop is iterated again. For K not equal to zero indicating that the tested plant has a transit time, a loop is entered in step 102 to readjust plant outputs for each hour. Using KK as a variable equal to the sum of IHOUR and K as indicated in block 1208, the values of HPOWER are adjusted in block 1210 for the statement HPOWER (KK,J)=HPOWER (IHOUR,J). For KK greater than 24 as tested in block 1212, step 103 is entered, as shown in FIG. 12E to set up the Post Schedule, which is a schedule of plant outputs to occur in the next 24-hour period because of transit time adjustments. At the completion of iterations in step 102 as shown in FIG. 12C, a loop is entered at step 104 to insert the applicable pre-manual schedules as indicated in block 1214. When completed, the adjusted load power values are written to disc as indicated in block 1216 in file HPOWER subscripted on TRANRVRS (I). As shown in FIG. 12D, the loop of step 100 is iterated to completion upon all transit time rivers, whereupon the post schedules are written to disc in file POSTSHED as indicated in block 1218, and control is returned to the calling routine.

V C. PONDCHEK

Figure 13A:
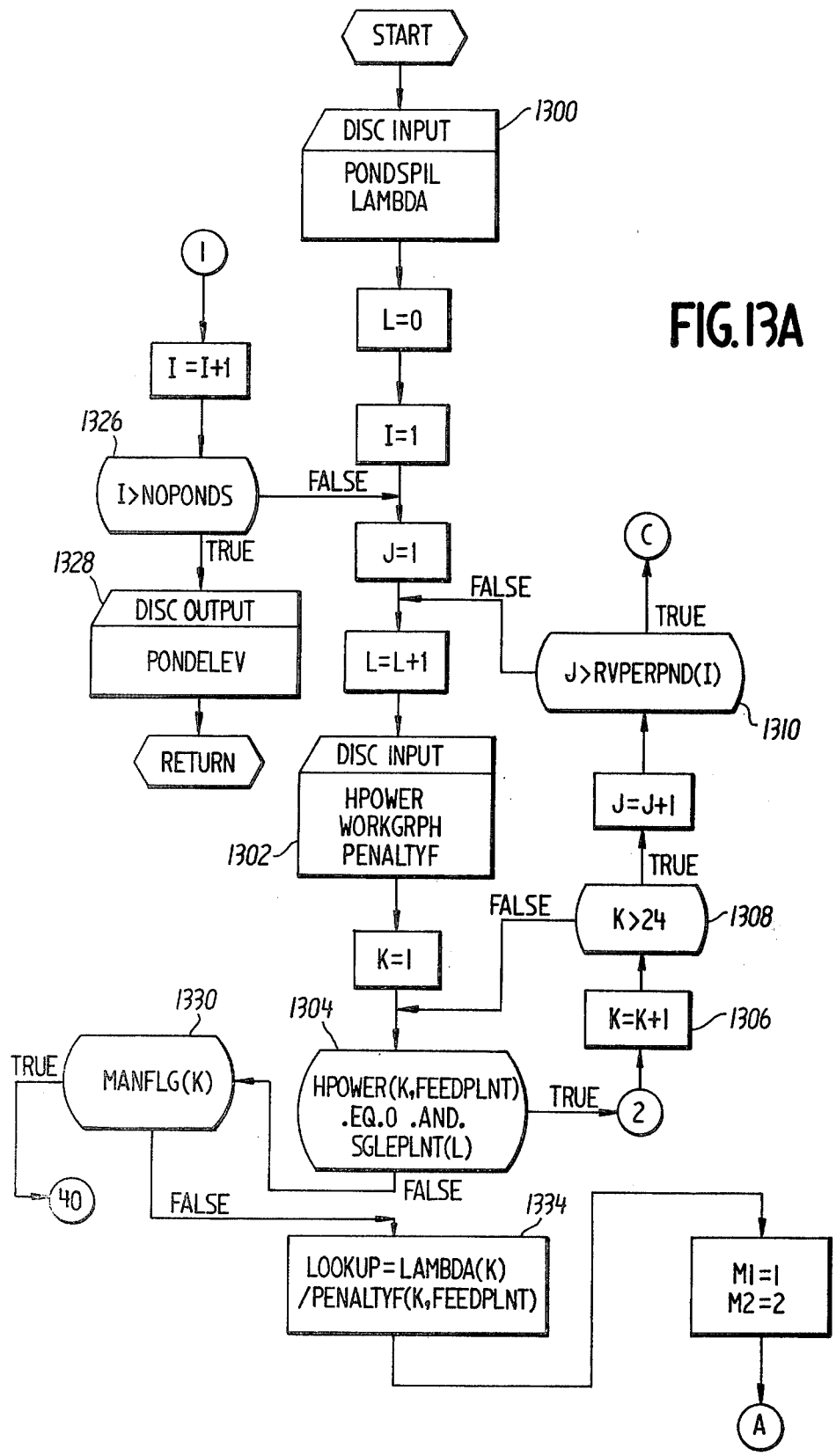

After the final hydro dispatch, subroutine POND-CHEK calculates the hourly pond water volumes from the initial volume, dispatched water flow for the hour on pertinent rivers, and the fixed schedule of pond outflow. When the volume has been calculated in each hour, it is checked against the high and low limits of water volume for that pond, and a flag is raised if in violation of its limits. The results of the pondage evaluations are stored on disc for output task use. For purposes of this discussion, an illustrative embodiment of subroutine PONDCHEK is described which evaluates hydro dispatch for four plants dependent on ponds. Referring to FIG. 13A, execution of the subroutine begins by reading the disc for files PONDSPIL and system lambdas as indicated in block 1300. File POND-SPIL contains the scheduled outflow of water from each pond for each hour. Each pond is analyzed indexing on I as a variable. The inflow of rivers to a given pond is calculated using J as an index. The particular river's pertinent data is read as indicated in block 1302 from disc in files HPOWER, WORKGRPH, and PENALTYF. Using K as an index, inflow for each hour of the given river, up to the 24th hour, is calculated. If the test as made in block 1304 of the plant hourly generation is zero (HPOWER (K, FEEDPLNT)=O), and it is a single plant river as indicated by flag SGLEPNT, the hour is incremented and the test repeated through 24 hours (see blocks 1306 and 1308). Completing 24 hours, the index J is incremented to the next river flowing into the given pond and tested in block 1310 to be greater than the number of rivers RVPERPND associated with a given pond. If less than, the next river data is made input and the loop is executed again. If all rivers have been evaluated as indicated by the false response of block 1310, step C is entered, as shown in FIG. 13G, where the value of pond water volume PONDELEV is calculated in block 1312 as the initial pond water volume INITELEV minus the scheduled outflow per hour PONDSPIL from the given pond for the first hour. Referring now to FIG. 13H, 23 calculations are made subsequently in block 1314 passing through step 6, whereby the value of pond elevation for the next-succeeding hour is made equal to the immediately preceding value of pond elevation minus the scheduled outflow per hour for the same succeeding hour. Upon completion of this loop, pond volume has been computed for each hour and diagnostic limit checking proceeds.

In FIG. 13H, the values of the hourly calculated pond water volumes PONDELEV are tested in blocks 1316 and 1318, respectively, to be greater than the normal operating high limit MAXELEV or to be less than the normal operating low limit MINELEV, of the given pond. If either limit is exceeded, a logical variable PONDVIOL is set true as indicated in block 1320 of FIG. 13I for the given hour in which the limit was exceeded. Upon completion of testing all 24 hourly calculated pond water volumes, step E is entered as shown in FIG. 13J where flags in VIOLFLAG are set as indicated in blocks 1322 and 1324, which are equivalenced to PONDVIOL, according to the values of variables IVFLAG1 and IVFLAG2. Step 1 is entered again in the loop as shown in FIG. 13A, and the next plant having a pond is evaluated. If all ponds have been evaluated as tested in block 1326, the PONDELEV file is written to the disc as indicated in block 1328 and control returns to the calling routine.

Returning to the test in block 1304 of HPOWER and SGLEPLNT, as shown in FIG. 13A, a false result is followed by a test of variable MANFLG which is set if a manual schedule is in effect as tested in block 1330. If true, step 40 is entered where a variable LOOKUP is made equal as indicated in block 1332 of FIG. 13K to the value of the HPOWER subscripted for the given hour and referred to the feed plant FEEDPLNT, i.e., that plant which feeds directly into the pond. If decision of block 1330 is false, the value of LOOKUP is made equal as is indicated by block 1334 to the value of LAMBDA for the current hour divided by the value of PENALYTF subscripted for the given hour and referred to the feed plant. At this point, it is known that water has been dispatched so that a LOCKUP value of power for the given feed plant may be calculated in block 1334. Following the calculation of LOOKUP, the value of LOOKUP is limit checked.

In the tests involving step 4 as shown in FIG. 13B, the value of LOOKUP is set in blocks 1338 and 1340 to be no greater than the maximum point X or less than the value of the minimum point Y, i.e., operating points on the incremental cost curve. In the tests involving steps 44 and 45 involving manually scheduled points, as shown in FIGS. 13C and K, the value of LOOKUP is set in blocks 1336 and 1342 respectively to be no greater than the value of the maximum power output XX or less than than the value of the minimum power output YY, as obtained from the increment cost curve.

With the limits tested and bounded, if necessary, step 5 is entered. Proceeding in step as shown in FIG. 13B, the inflow of water to the given pond is calculated for each hour. At step B, the variable R is made equal as indicated in block 1334 to the WORKGRPH subscripted on ISRCH, M1, M2, where ISRCH is an index to be incremented in the loop of step B, and M1 and M2 have been set depending on whether LOOKUP was calculated using LAMBDA or HPOWER. Upon completion of routine PONDCHEK, there is provided an indication of water flowing to and from each pond for each hour, and flags are set where limit conditions have not been met.

Numerous changes may be made in the above described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A hydro-thermal power generating system comprising:
   (a) a plurality of hydro plants disposed upon at least one river system, and a plurality of thermal units, operated so that a scheduled load for said hydro-thermal power generating system is met;
   (b) means for measuring the water released upon the one river system and the inflow and outflow of water into and out of said hydro plants on the one river system;
   (c) control means including sequencing means having the following components:
      (1) means responsive to the water measuring means for determining the water flowthroughs of each of said hydro plants,
      (2) means for selecting one of said hydro plants as a control plant and the remaining hydro plants on the one river system as dependent plants,
      (3) means for constructing artificial working curves for said dependent plants based upon the characteristic working curves of said control plant,
      (4) means for allocating the water flow through said control plant and said dependent plants by adjusting the working curves of said control plant for a first value of lambda for a selected period to utilize substantially the value of the released water supply,
      (5) means for deriving from the characteristic working curves of said control plant and the artificial working curves of said dependent plants, a first value of the total hydro generation of all of said hydro plants on the one river system,
      (6) means for substracting the first value of the total hydro generation from the scheduled load of said hydro-thermal power generating system to determine the thermal generation by said thermal units required to meet the scheduled load of said hydro-thermal power generating system,
      (7) means for dispatching said thermal units to calculate therefrom a second value of lambda for the selected period,
      (8) means for inserting the second value of lambda derived from the thermal dispatch into said allocating and control means to determine a second value of total hydro generation,
      (9) means for comparing the first and second values of hydro generation to determine whether the difference therebetween is within selected limits and closure is met;
   (d) means for applying output signals when closure is met, to selected of said hydro units to effect operation of said hydro units to generate hydro power in accordance with the released water supply; and
   (e) means for applying output signals to said thermal units to effect operation of said thermal units to generate the determined thermal generation.

2. The hydro-thermal power generating system as claimed in claim 1, wherein said control means further comprises means for calculating water allocation ratios for said dependent plants as the ratio of the water flowthrogh of said dependent plants to that of said control plant, and said constructing means operative to transfer the coordinates of the selected points on the characteristic working curves of said control plant, as modified by the corresponding allocation ratios to establish the values of the coordinates on the artificial working curves of said dependent plants.

3. The hydro-thermal power generating system as claimed in claim 1, wherein said control means comprises approximating means responsive to the condition when the first and second values of hydro generation do not fall within the selected limits, for approximating a second value of total hydro generation based upon the previous values of total hydro power generation.

4. The hydro-thermal power generating system as claimed in claim 3, wherein said approximating means approximates the second value of hydro generation in accordance with the sum of the maximum and minimum limits of hydro generation, divided by two.

5. The hydro-thermal power generating system as claimed in claim 4, wherein said approximating means further comprises means for comparing the calculated first value of hydro generation and the approximated second value of hydro generation with the current maximum limits of hydro generation, and means for determining when the first and second values of hydro generation are not within the maximum and minimum limits of hydro generation for resetting the exceeded limit to be equal approximately to said first or second value of hydro generation.

6. The hydro-thermal power generating system as claimed in claim 5, wherein said approximating means comprises means for deriving an average of each of the approximated second values of hydro generation, means for comparing the minimum and maximum limits of hydro generation with the average hydro generation to determine whether the average hydro generation falls within the maximum and minimum limits, and means for determining when the average hydro generation exceeds either of the maximum or minimum limits and for resetting the exceeded limit to include the average hydro generation.

7. The hydro-thermal power generating system as claimed in claim 1, wherein said control means comprises a programmed digital computer structure.

8. The hydro-thermal power generating system as claimed in claim 1, wherein said selecting means selects said control plant as that hydro plant with the greatest water flowthrough.

9. The hydro-thermal power generating system as claimed in claim 1, wherein there is included means for identifying the river system as one with transit time considerations, and said selecting means selects said control plant so that plant at the head of said river system.

10. The hydro-thermal power generating system as claimed in claim 1, wherein said control means comprises means for storing said working curves of said control plant including its characteristic incremental water rate curve, means for multiplying points on the flow/power hour axis of said incremental water rate curve of said control plant by an artificial variable gamma indicative of water cost for a given lambda for a period and selected to substantially utilize the water flowthrough of said control plant for said period.

11. The hydro-thermal power generating system as claimed in claim 1, wherein a selected one of said hydro plants has a plurality of sets of electrical signals indicative of the working curves dependent upon the height of the water head associated with said selected plant, and there is included means for measuring the water head associated with said selected hydro plant, and said control means comprises means for selecting that set of curves corresponding to said measured water head.

12. The hydro-thermal power generating system as claimed in claim 1, wherein said control means comprises means for storing said control plant's characteristic working curves including an incremental water rate curve, and means for manipulating the flow/power hour axis of said incremental water rate curve of said control plant by a variable artificial factor gamma related to a cost/flow for a given lambda corresponding to said period to utilize substantially said measured water volume released upon said river for said period.

13. The hydro-thermal power generating system as claimed in claim 12, wherein said manipulating means manipulates said incremental water rate curve of said control plant for a set of lambdas for a plurality of said periods to utilize substantially the water volumes released upon said river system during said corresponding periods.

14. The hydro-thermal power generating system as claimed in claim 12, wherein said river system includes at least one reservoir, said system further comprising means for measuring the water volume within said one reservoir, means for measuring the maximum and minimum values of water volume to be contained within said reservoir, and said control means further comprising means for determining a subsequent period of time a calculated value of the water volume within said reservoir based upon the flowthrough of associated hydro plants to determine whether said minimum or maximum values of water volume have been violated.

15. The hydro-thermal power generating system as claimed in claim 12, wherein said control means further comprises means for multiplying the coordinates of the flow/power hour axis of said artificial incremental water rate curves of said dependent plants by said factor gamma, and said deriving means deriving values indicative of hydro-power generation for said control and dependent plants from said multiplied incremental water rate curves of said control and dependent plants.

16. The hydro-thermal power generating system as claimed in claim 15, wherein there is included means for measuring the transit delay times of water flow from said control plants to each of said dependent plants, said control means including means for determining the power generated by said control plant and by said dependent plants with transit time considerations for a control period corresponding to that period in which water flows through said control plant, and means adjusting the power generations of said dependent plants as to their control hour to real time periods based on said corresponding transit delay times of said dependent plants.

17. The hydro-thermal power generating system as claimed in claim 15, wherein there is included means for identifying the parallel plant pairs on said river system, and said control means comprises means for providing composite working curves therefor, means responsive to the value of water flow through said parallel plant pair for determining the combined power generation thereof, and means for providing first and second values corresponding to the hydro generation to be generated by each plant of said parallel plant pair.

18. The hydro-thermal power generating system as claimed in claim 15, wherein said control means comprises means for storing the characteristic normal high and low limits, and capabilities of each of said hydro plants, means for determining the scheduled outage applicable to selected of said hydro plants, means for determining the working high limit as the lower of said normal high limit or said capability less scheduled outage, means for determining said working low limit as the lower of said normal low limit or said capability minus scheduled outage, and means comparing said calculated working high and low limits against the calculated value of hydro generation for said subject hydro plant.

19. The hydro-thermal power generating system as claimed in claim 18, wherein there is included means for identifying those river systems with transit time considerations and measuring the transit time delays for the flow of water from said control plant to each of said affected dependent plants, and said control means comprises means for determining said working high and low limits for the control period corresponding to the real time of power generation of said control plant, and means for adjusting said working high and low limits of said affected dependent plants to real time periods in accordance with the corresponding transit time delays for said affected dependent plants.

20. The hydro-thermal power generating system as claimed in claim 1, wherein said control means further comprises means for storing characteristic incremental water rate and input/output curves for said control plant, and characteristic input/output curves for said dependent plants, means for determining for each of said dependent plants an allocation ratio as the ratio of the water flowthrough of said dependent plant to the water flowthrough of said control plant, means for adjusting the coordinates of each of the flow axes of said input/output curves of said dependent plants by its corresponding allocation ratio, and said constructing means for constructing the artificial incremental water rate curve for each of said dependent plants by transferring the coordinates of a selected number of points on said incremental water rate curve of said control plant directly to a flow/power hour axis, and said allocation ratio to a power axis of said constructed curve of each of said dependent plants.

21. The hydro-thermal power generation system as claimed in claim 20, wherein said selecting means selects said control plant as that plant with the greatest water flowthrough, and there is further included means for measuring with respect to each plant on said river system an inflow of water through said plant not derived from that plant immediately above on said river system and of an outflow of water derived from said plant immediately above on said river system which does not flow through said plant, said control means further comprises means for determining said flowthrough of each hydro plant as the water released by said plant immediately above on said river system minus said water outflow plus said water inflow.

22. The hydro-thermal power generating system as claimed in claim 20, wherein said control means further comprises means for obtaining the ordinates and abscissas of said selected number of points on said incremental water rate curve of said control plants, means for transferring directly the values of said derived ordinates of said incremental water rate curve of said control plant to be superimposed upon said water/power hour axis of said artificial incremental water rate curve of said dependent plant, means for transferring said abscissas of said selected number of points on said incremental water rate curve of said control plant to be superimposed upon said power axis of said input/output curve of said control plant, means for deriving ordinates on a flow axis of said input/output curve of said control plant corresponding to said transferred ordinates, means for transferring and adjusting said ordinates on said flow axis of said input/output curve of said control plant by said allocation ratio of a dependent plant to be superimposed on a flow axis of said input/output curve of said dependent plant, means for deriving abscissas on a power axis of said input/output curves of said dependent plant corresponding to said transferred and adjusted ordinates, and means for transferring the abscissas on said power axis of said input/output curve of said dependent plant to be superimposed on said power axis of said incremental water rate curve of said corresponding dependent plant, whereby both of said abscissas and ordinates corresponding to said number of points are reconstructed upon said incremental water rate curve of said dependent plant.

23. A system for controlling a power generation system including a plurality of a first type of power generation units and a plurality of a second type of power generation units, said system comprising:
(a) means for providing a schedule of power to be generated by said entire system;
(b) control means including sequencing means having the following components:
(1) first means for deriving an initial value of power generation of all of the first-type units,
(2) second means for deriving from the initial value of power generation as determined above, the power generation for the second-type units required to meet the scheduled system power generation,
(3) means for dispatching the second-type units to calculate therefrom a first value of lambda,
(4) third means responsive to said first value of lambda for deriving a first value of total power generation of all of the first-type plants, and
(5) means for comparing said first and initial values of total generation of said first-type plants to determine whether the difference therebetween is within an acceptable range of closure tolerance; and
(c) means responsive to a difference within said closure tolerance for operating the first-type plants and second-type plants to generate power based upon said last calculated value of lambda to meet the scheduled power generation for the entire system.

24. The system for controlling power generation as claimed in claim 23, wherein said control means comprises a programmed digital computer structure.

25. The system for controlling power generation as claimed in claim 23, wherein the first-type unit comprises a hydro plant disposed on at least one river system and the second-type unit comprises a thermal unit, and there is included means for measuring the volume of water released upon the river system and said first deriving means is responsive to the measured volume of water released upon the river system for deriving the initial value of power generation for an initial value of lambda to utilize substantially fully the entire volume of water released upon the river system.

26. The system for controlling power generation as claimed in claim 25, wherein said control means further comprises means for storing the characteristic sets working curves of said hydro plants; means for selecting one of the hydro plants on said river system as a control plant and the remaining of the hydro plants on said river system as dependent plants; means for constructing artificial working curves for the dependent plants based upon the set of characteristic working curves of the control plant; and means for allocating the water flow through the control plant and the dependent plants by adjusting said set of working curves of the control plant by a variable gamma until a value of gamma is realized that utilizes the water volume released upon the river system for an initial, given value of lambda.

27. The system for controlling power as claimed in claim 26, wherein said control means further comprises means for adjusting the working curves of the control plant and said dependent plants by said realized value of gamma and calculating therefrom the hydro generation of all of the hydro plants.

28. The system for controlling power generation as claimed in claim 25, wherein said control means further comprises means for approximating a second value of hydro generation based upon the sum of the maximum and minimum bounds of hydro generation, divided by two.

29. The system for controlling power generation as claimed in claim 28, wherein said means for approximating said second value of hydro generation includes means for comparing said first and second values of hydro generation with said maximum and minimum bounds of hydro generation to reduce said maximum and minimum bounds of hydro generation if said first and second values of hydro generation are not within said bounds.

30. A system for controlling power generation as claimed in claim 28, wherein said means for approximating includes means for providing an average of said previous second values of hydro generation and comparing said average hydro generation with said maximum and minimum bounds of hydro generation and for resetting the appropriate maximum or minimum bound if one of said bounds is exceeded.

31. The system for controlling power generation as claimed in claim 25, wherein said control means comprises means for determining whether closure tolerance is met or not, means operative when closure is not met for approximating a second value of total hydro generation based upon the previous values of hydro generation, means for determining from said approximated second value of total hydro generation, a second value of thermal generation required to meet the scheduled load for said hydro-thermal system, means for dispatching said thermal units to calculate therefrom a second value of lambda for said selected period to meet said second value of thermal generation, and means for using said second value of lambda to provide a next, first value of total hydro generation.

32. The system for controlling power generation as claimed in claim 31, wherein said approximating means approximates said second value of hydro generation as the sum of the maximum and minimum bounds of total hydro generation, divided by two.

33. The system for controlling power generation as claimed in claim 32, wherein said control means comprises means for setting the initial values of said maximum and minimum bounds as said initial value of hydro generation and said first calculated value of hydro generation.

34. The system for controlling power generation as claimed in claim 32, wherein said control means comprises means for readjusting the exceeded bound by a given factor to dispose said average hydro generation within said readjusted bound.

35. The system for controlling power generation as claimed in claim 34, wherein said control means comprises means for providing a first signal if said first value of hydro generation is greater than said second value of hydro generation and a second signal if said first value of hydro generation is less than said second value of hydro generation, means for resetting in response to said first signal, the electrical signal indicative of said maximum bound to equal said first value of hydro generation, and means for determining whether said second value of hydro generation is greater than said minimum bound of hydro generation and if so, resetting said minimum bound to be equal to said second value of hydro generation.

36. The system for controlling power generation as claimed in claim 35, wherein said control means comprises means for resetting in response to said second signal said minimum bound to equal said first value of hydro generation, and means for determining whether said second value of hydro generation is less than said maximum bound and if so, resetting said maximum bound to be equal to said second value of hydro generation.

37. The system for controlling power generation as claimed in claim 31, wherein said control means comprises means for deriving an average of all approximated second values of total hydro generation, means for comparing said minimum and maximum bounds of hydro generation with said average hydro generation to provide a first signal if said hydro generation is within said minimum and maximum bounds and to provide a second signal if said average hydro generation is not within said minimum and maximum bounds, and means for readjusting in response to said first signal, the value of an exceeded bound of said maximum and minimum bounds to include said average hydro generation.

38. The system for controlling power generation as claimed in claim 31, wherein said control means comprises means for deriving an average of all approximated second values of total hydro generation, means for providing a first signal indicating that a maximum bound of hydro generation is less than said average hydro generation, means responsive to said first signal for adjusting the signal indicative of said maximum bound to equal substantially a product of a first factor and of said average hydro generation, means for approximating a new, second value of total hydro generation equal to the product of a second factor and of said average hydro generation, means for providing a second signal if a minimum bound of hydro generation is greater than said average hydro generation, and means responsive to said second signal, for adjusting said minimum boundary to be equal to a product of said average hydro generation and of said second factor, and means for approximating a new, second value of hydro generation equal to a product of said first factor and said average hydro generation.

* * * * *